US012286957B2

(12) United States Patent
Geene et al.

(10) Patent No.: US 12,286,957 B2
(45) Date of Patent: Apr. 29, 2025

(54) METHOD AND DEVICE FOR CONNECTING A BLADE OF A WIND TURBINE TO A HUB

(71) Applicant: Heerema Marine Contractors Nederland SE, Leiden (NL)

(72) Inventors: Paul Antonius Alphonsus Geene, Leiden (NL); Roland De Vos, Leiden (NL); Robert Marc Aarts, Leiden (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 152 days.

(21) Appl. No.: 17/779,683

(22) PCT Filed: Nov. 26, 2020

(86) PCT No.: PCT/EP2020/025543
§ 371 (c)(1),
(2) Date: May 25, 2022

(87) PCT Pub. No.: WO2021/104677
PCT Pub. Date: Jun. 3, 2021

(65) Prior Publication Data
US 2023/0228246 A1    Jul. 20, 2023

Related U.S. Application Data

(60) Provisional application No. 62/940,690, filed on Nov. 26, 2019.

(30) Foreign Application Priority Data

Mar. 25, 2020   (NL) ..................................... 2025208

(51) Int. Cl.
*F03D 13/10*   (2016.01)
*B66C 1/10*    (2006.01)
(Continued)

(52) U.S. Cl.
CPC .............. *F03D 13/10* (2016.05); *B66C 1/108* (2013.01); *B66C 13/085* (2013.01);
(Continued)

(58) Field of Classification Search
CPC ......... F03D 13/10; F03D 13/25; B66C 1/108; B66C 13/085; B66C 23/185; B66C 23/52;
(Continued)

(56) References Cited

U.S. PATENT DOCUMENTS 8,640,340 B2 * 2/2014 Foo ...................... B63B 35/003
                                                        29/897.3
9,410,528 B2 * 8/2016 Westergaard ........... F03D 13/40
(Continued)

FOREIGN PATENT DOCUMENTS

KR      101435376 B1    8/2014
WO      2013-093614 A1  6/2013

OTHER PUBLICATIONS

International Searh Report and Written Opinion dated Feb. 17, 2021 for PCT/EP2020/025543.
(Continued)

*Primary Examiner* — Ryan J. Walters
(74) *Attorney, Agent, or Firm* — Patterson + Sheridan, LLP

(57) ABSTRACT

The present invention relates to a blade positioning system configured for positioning wind turbine blades at a hub of a nacelle of a wind turbine from an installation vessel at an offshore location, the blade positioning system comprising: the installation vessel comprising: —at least one lifting device configured for lifting wind turbine components, and —an auxiliary support tower extending upwardly from the installation vessel, the auxiliary support tower comprising: o a nacelle support for supporting the nacelle, o a root end moving assembly defining a guide path which extends over (Continued)

a vertical distance, the root end moving assembly comprising a movable root end support base and a root end support configured for supporting and guiding the root end of the blade, the root end support being connected to the movable root end support base, the root end support being movable along the guide path, the root end moving assembly being configured for moving the root end of the blade along the guide path from the engagement position to an installation position, the at least one lifting device being configured for lifting the nacelle onto the auxiliary support tower, wherein the at least one lifting device and the root end moving assembly are configured to jointly support and jointly move the blade upwards towards the hub, wherein during the movement the root end is supported by the root end support and the lifting device carries a majority of the vertical loads on the blade.

16 Claims, 39 Drawing Sheets

(51) Int. Cl.
| | |
|---|---|
| *B66C 13/08* | (2006.01) |
| *B66C 23/18* | (2006.01) |
| *B66C 23/52* | (2006.01) |
| *F03D 13/25* | (2016.01) |

(52) U.S. Cl.
CPC ............ *B66C 23/185* (2013.01); *B66C 23/52* (2013.01); *F03D 13/25* (2016.05); *F05B 2230/6102* (2013.01); *Y02E 10/72* (2013.01); *Y02E 10/727* (2013.01)

(58) Field of Classification Search
CPC ............. B66C 13/08; F05B 2230/6102; F05B 2230/70; Y02E 10/72; Y02E 10/727; Y02P 70/50
See application file for complete search history.

(56) References Cited

U.S. PATENT DOCUMENTS

| | | | |
|---|---|---|---|
| 10,550,825 B2 * | 2/2020 | Borøy | ................... E04H 12/344 |
| 11,808,250 B2 * | 11/2023 | Garcia De La Pena | ...................... F03D 80/50 |
| 2010/0293781 A1 | 11/2010 | Foo et al. | |
| 2019/0186465 A1 | 6/2019 | Boroy et al. | |
| 2019/0219035 A1 | 7/2019 | Garcia De La Pena | |

OTHER PUBLICATIONS

Search Report and Written Opinion dated Nov. 24, 2020 for NL2025208.
International Preliminary Report on Patentability dated Mar. 18, 2022 for PCT/EP2020/025543.
International Preliminary Report on Patentability dated Mar. 1, 2022 for PCT/EP2020/025543.

* cited by examiner

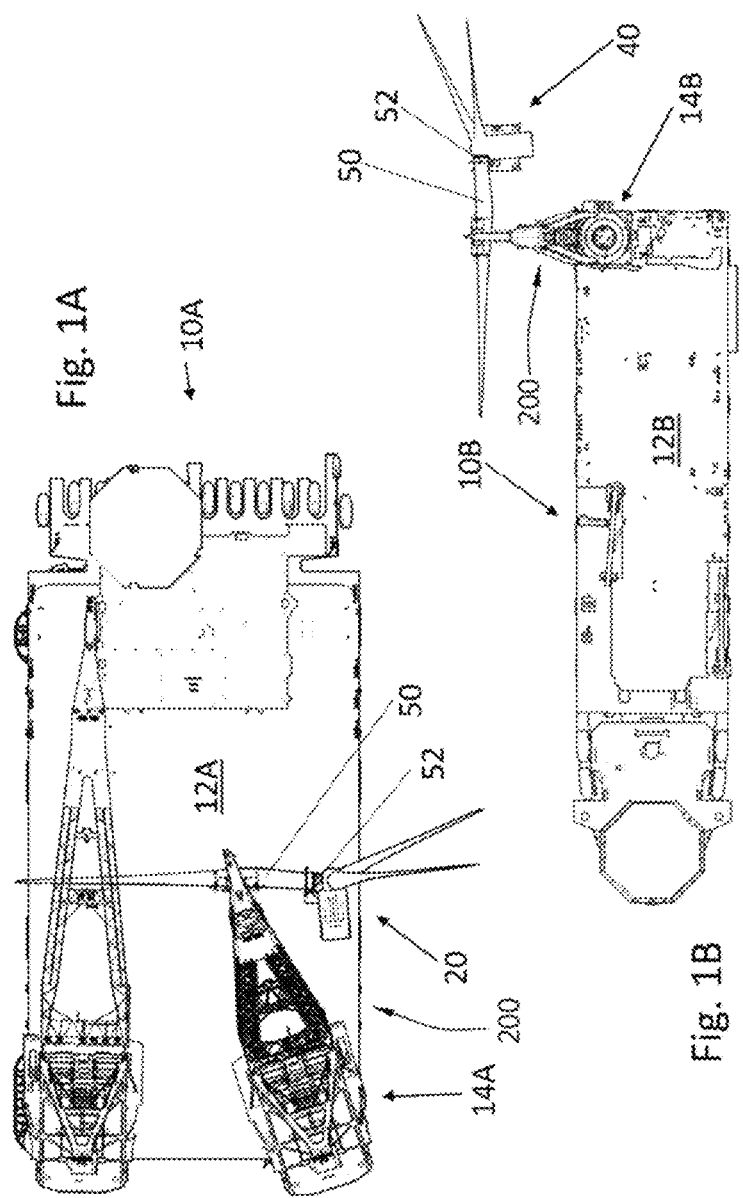

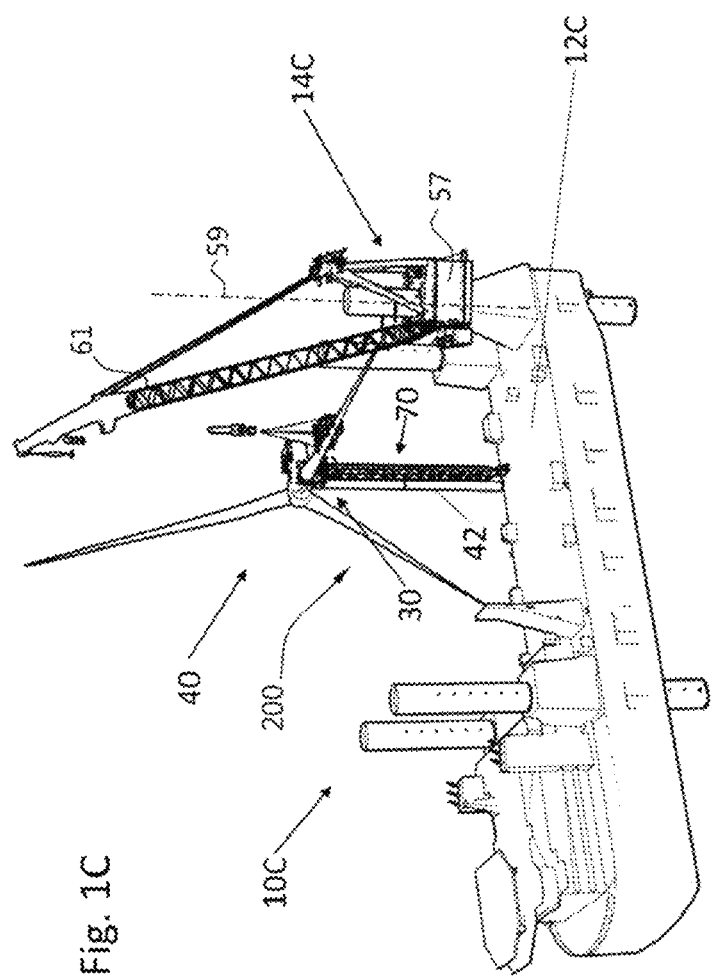

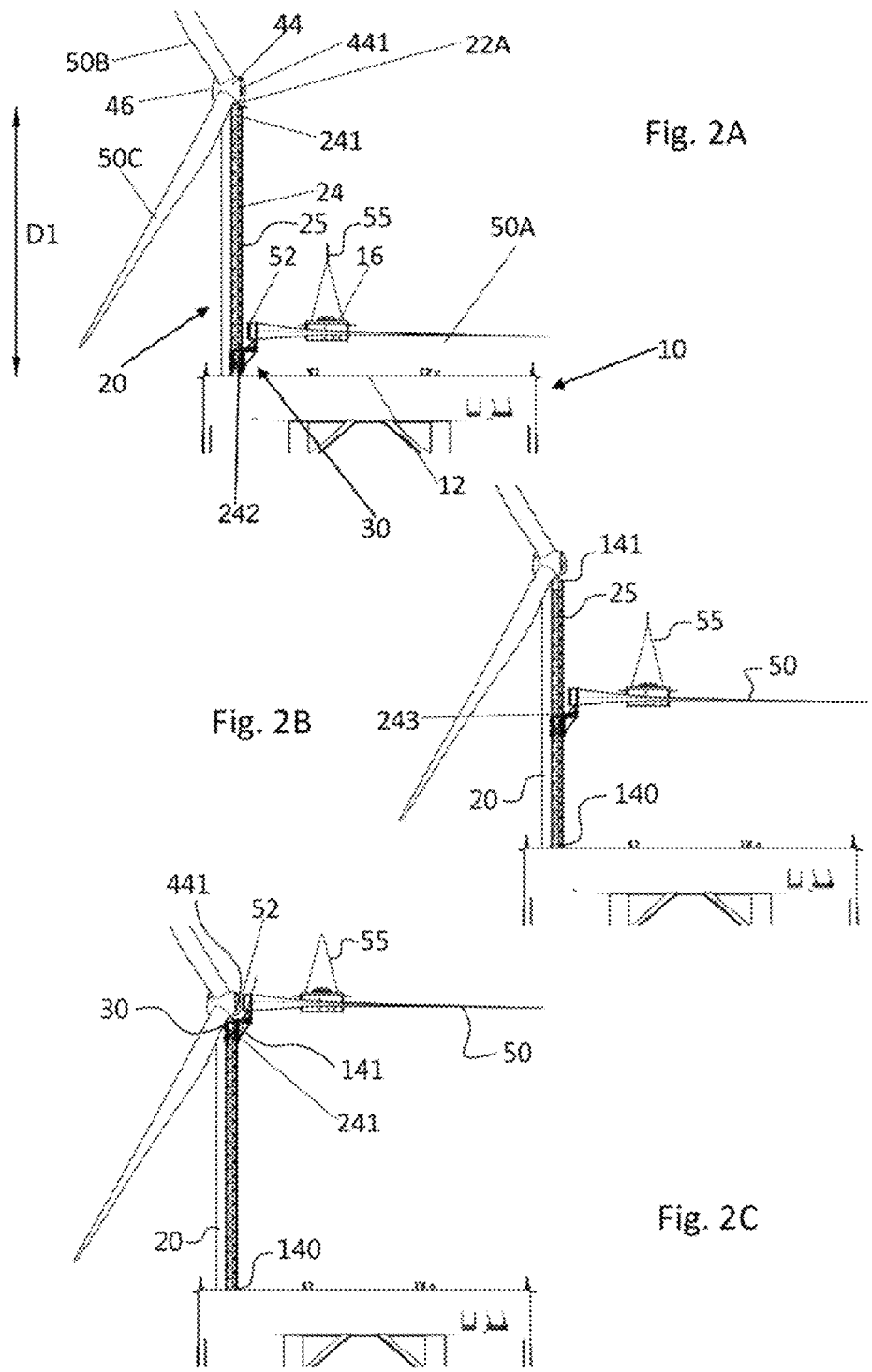

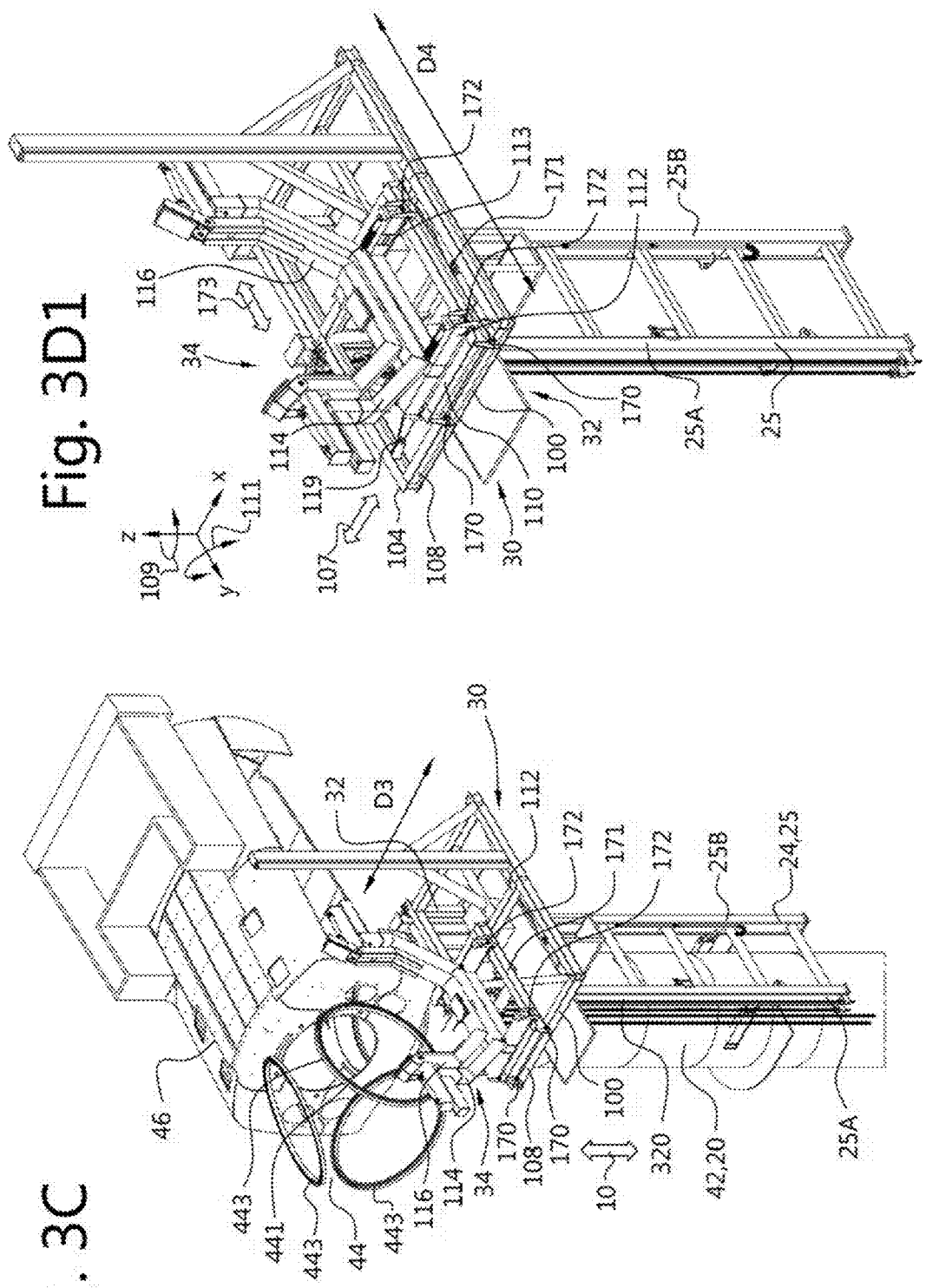

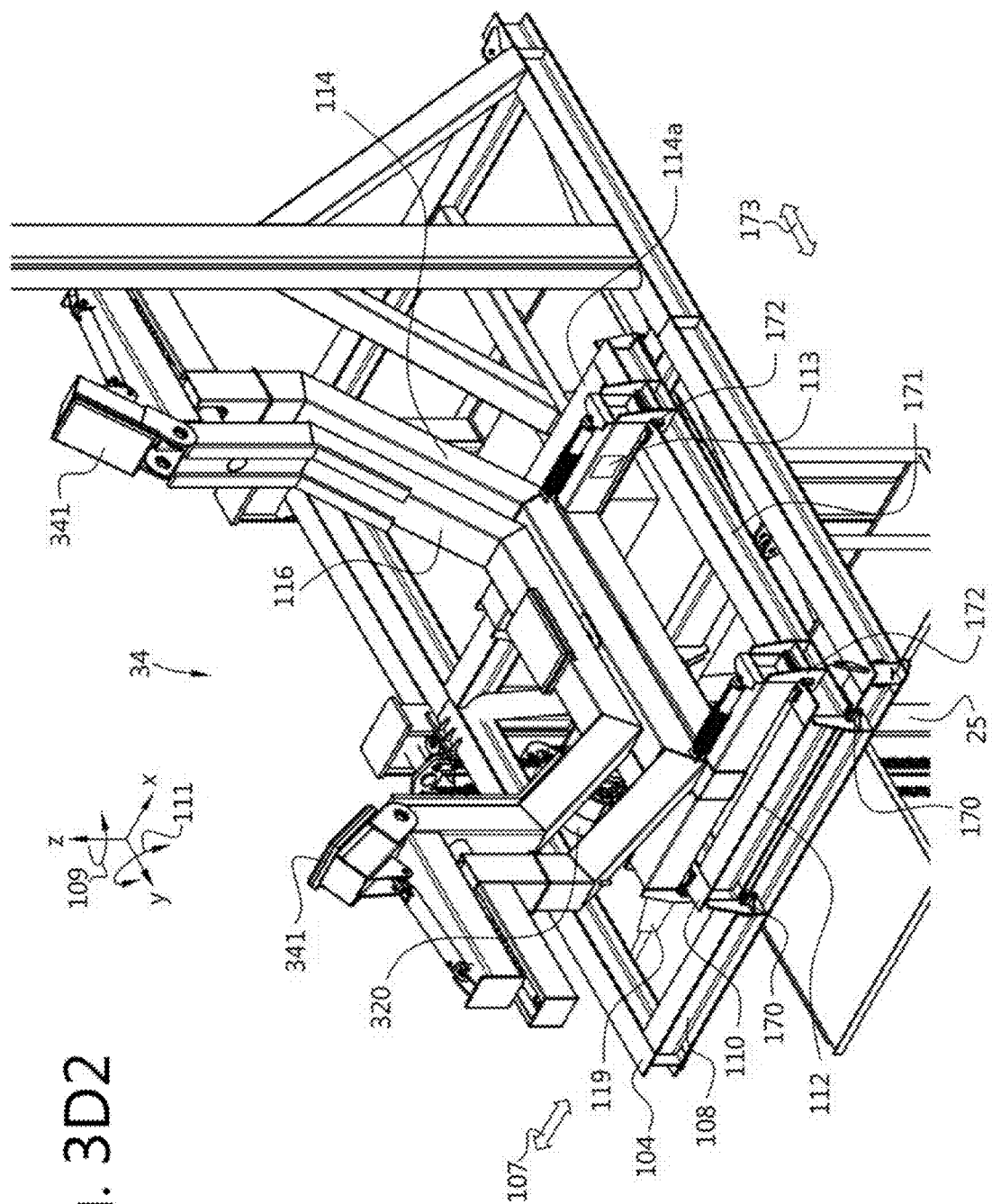
Fig. 3D2

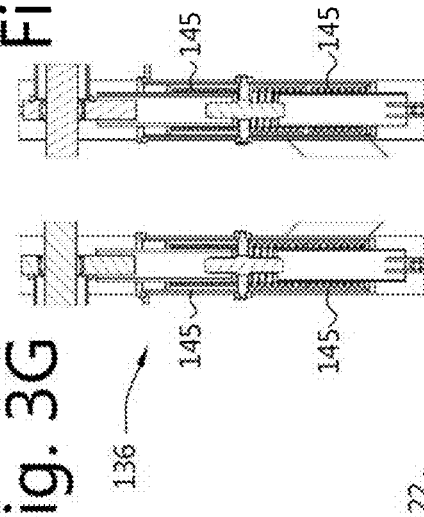
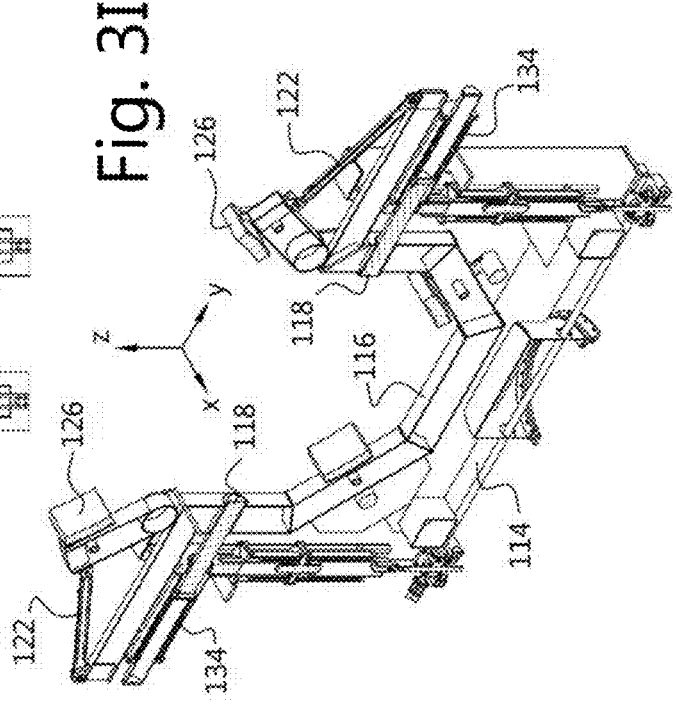
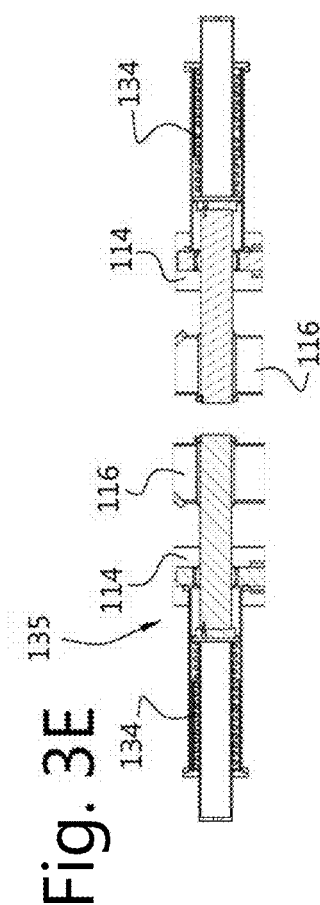
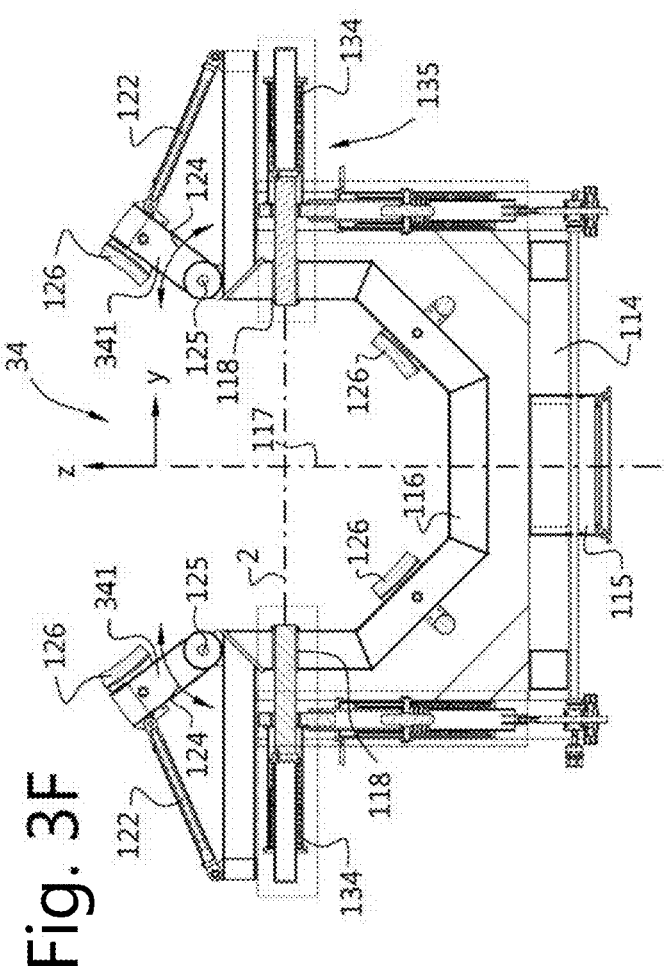

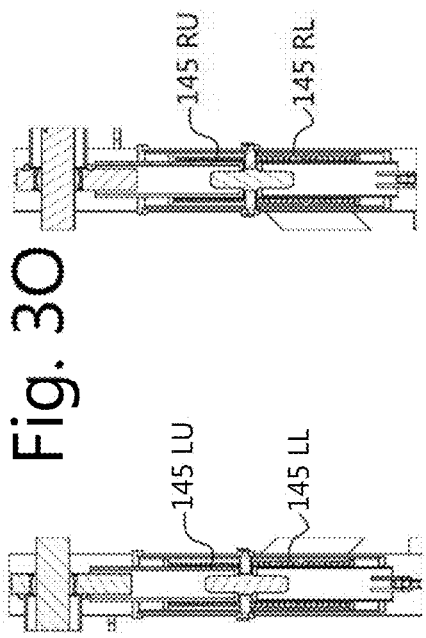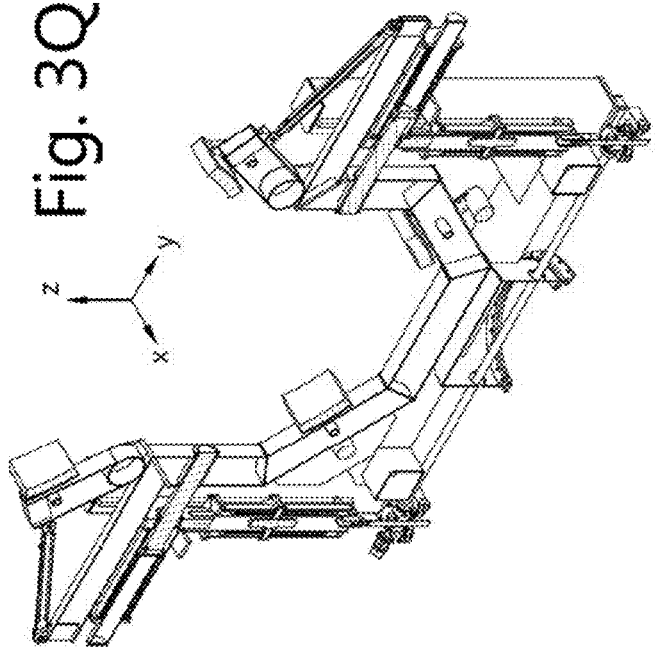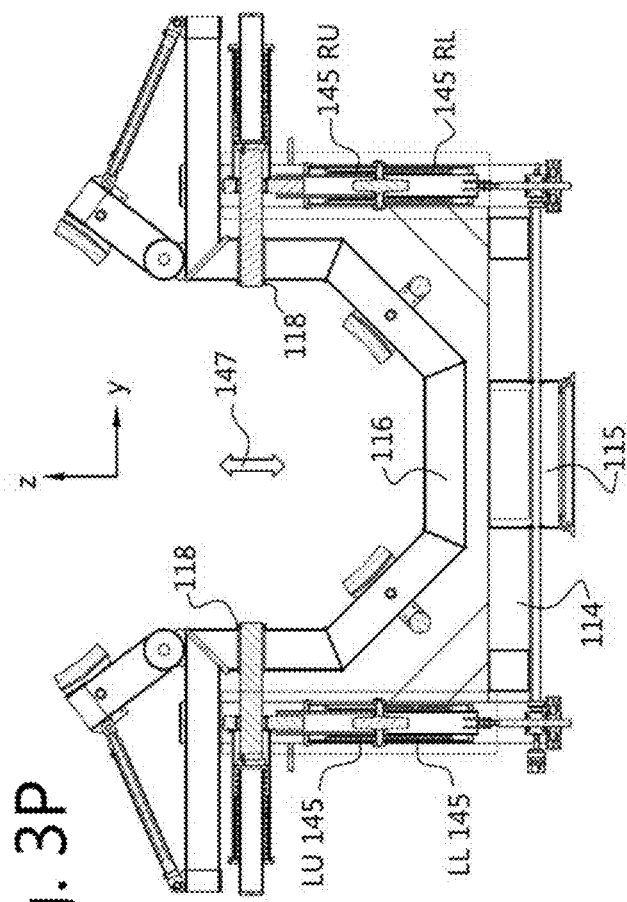

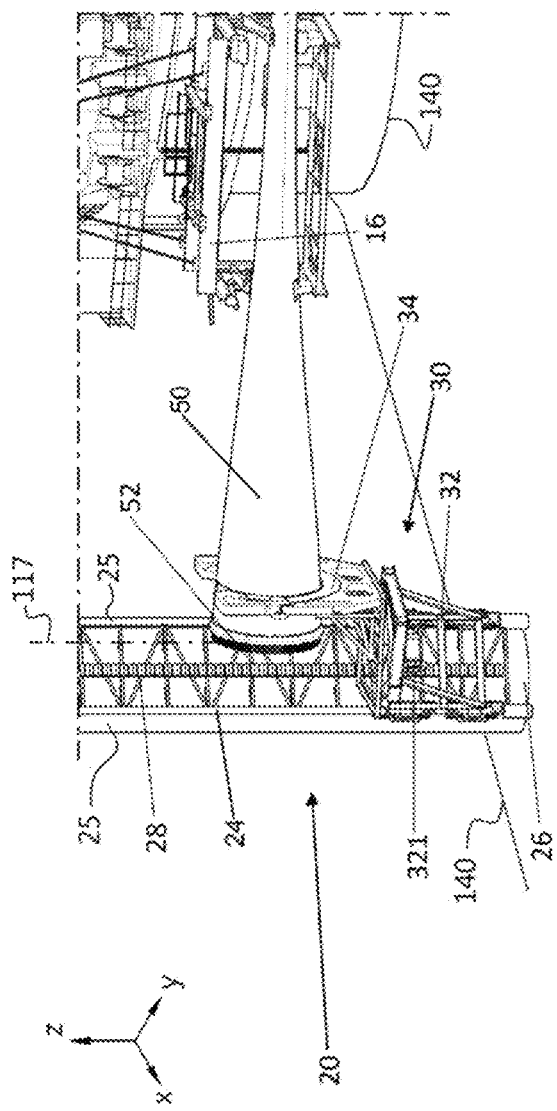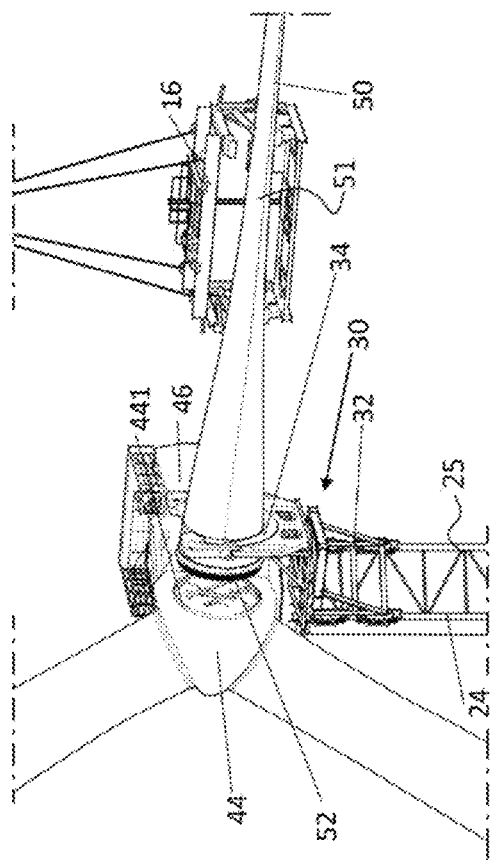

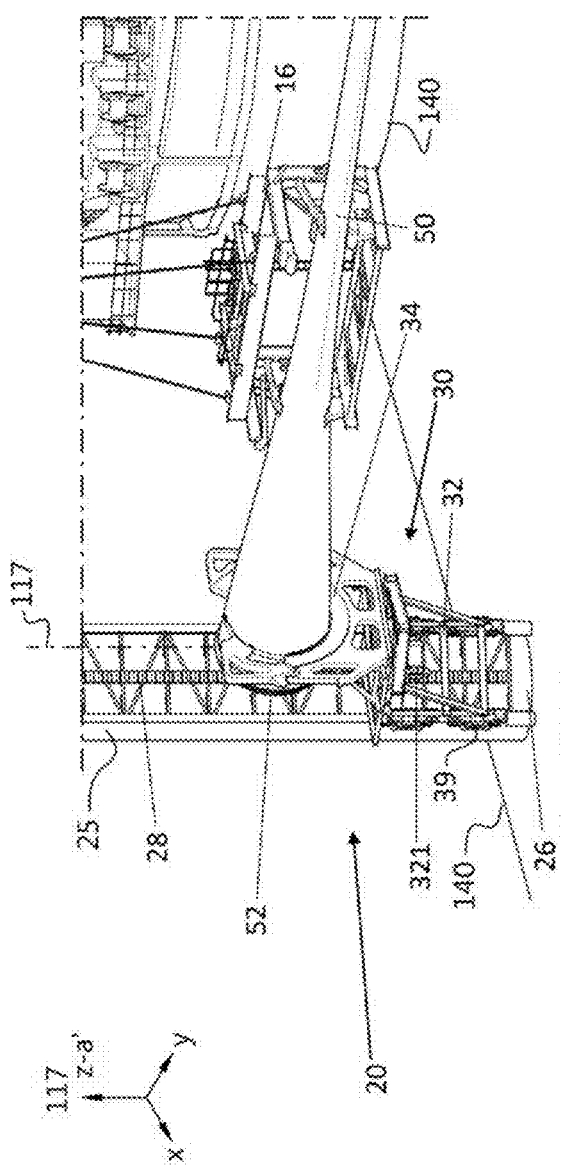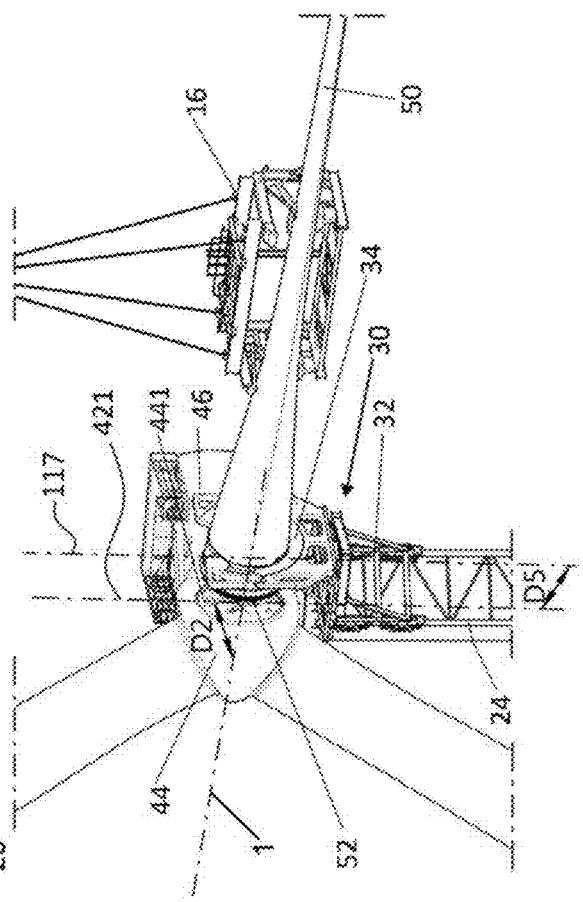

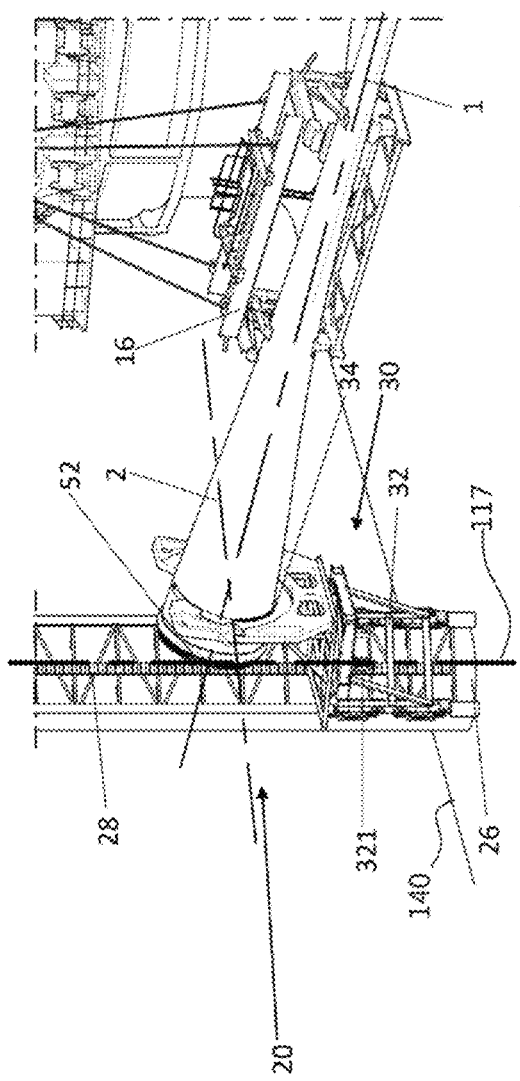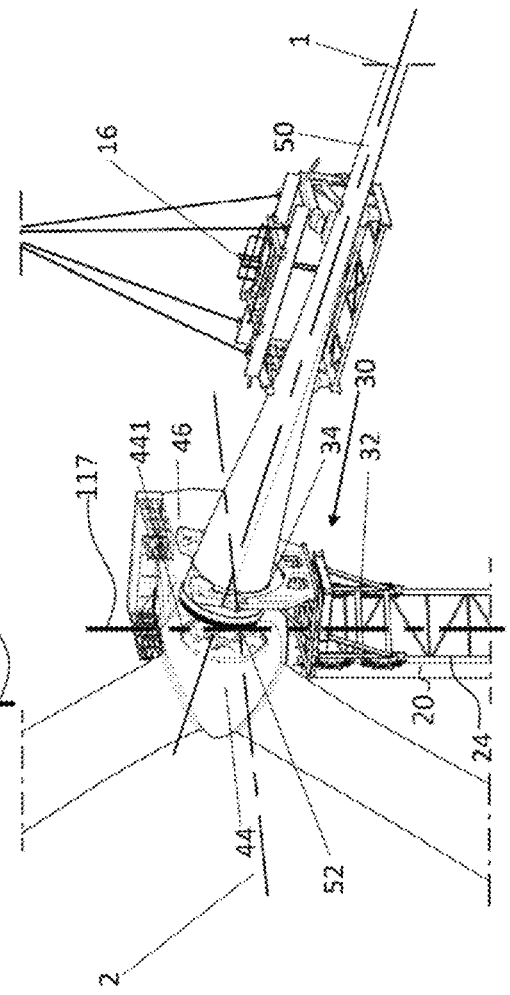

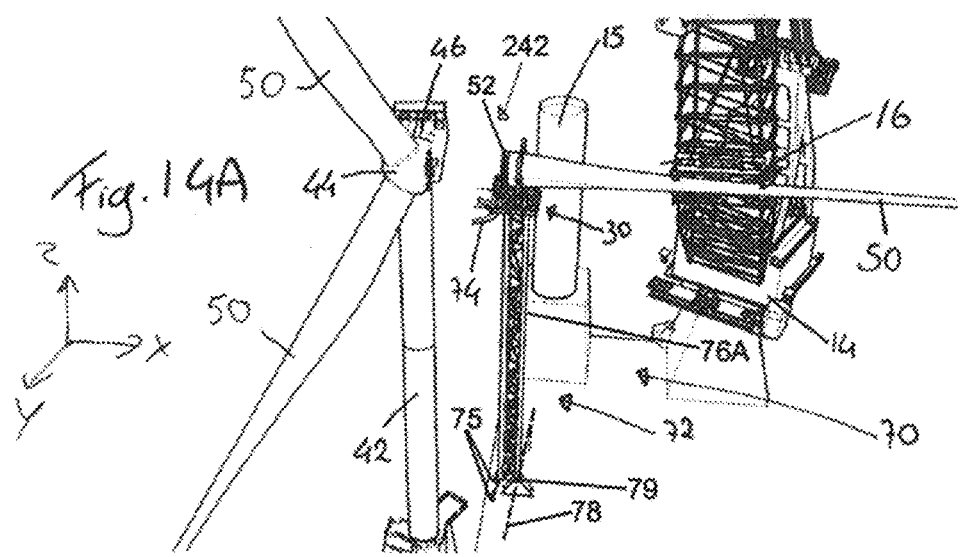
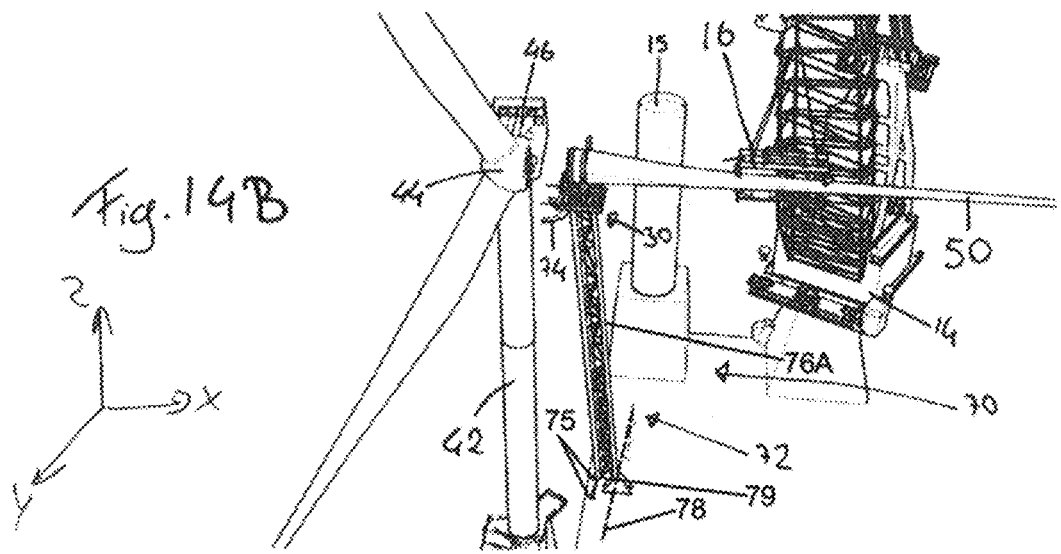
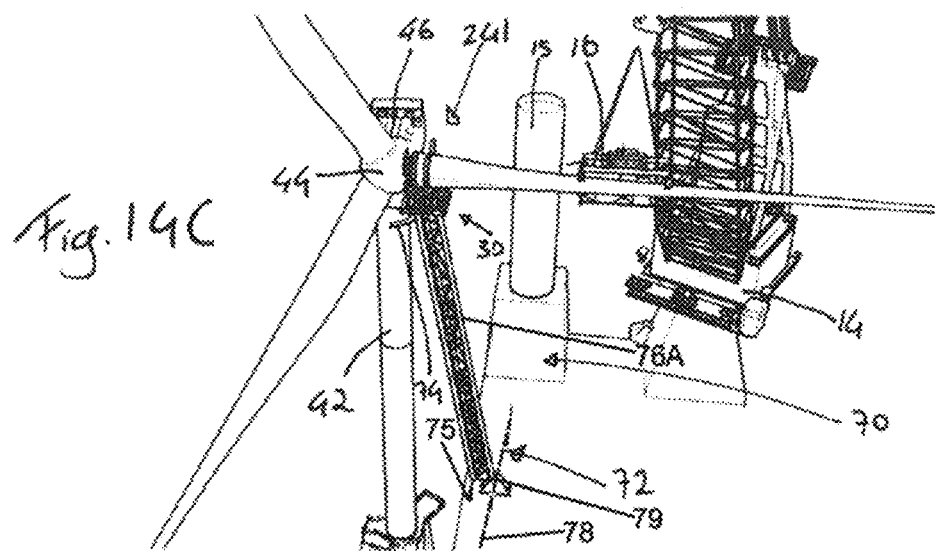

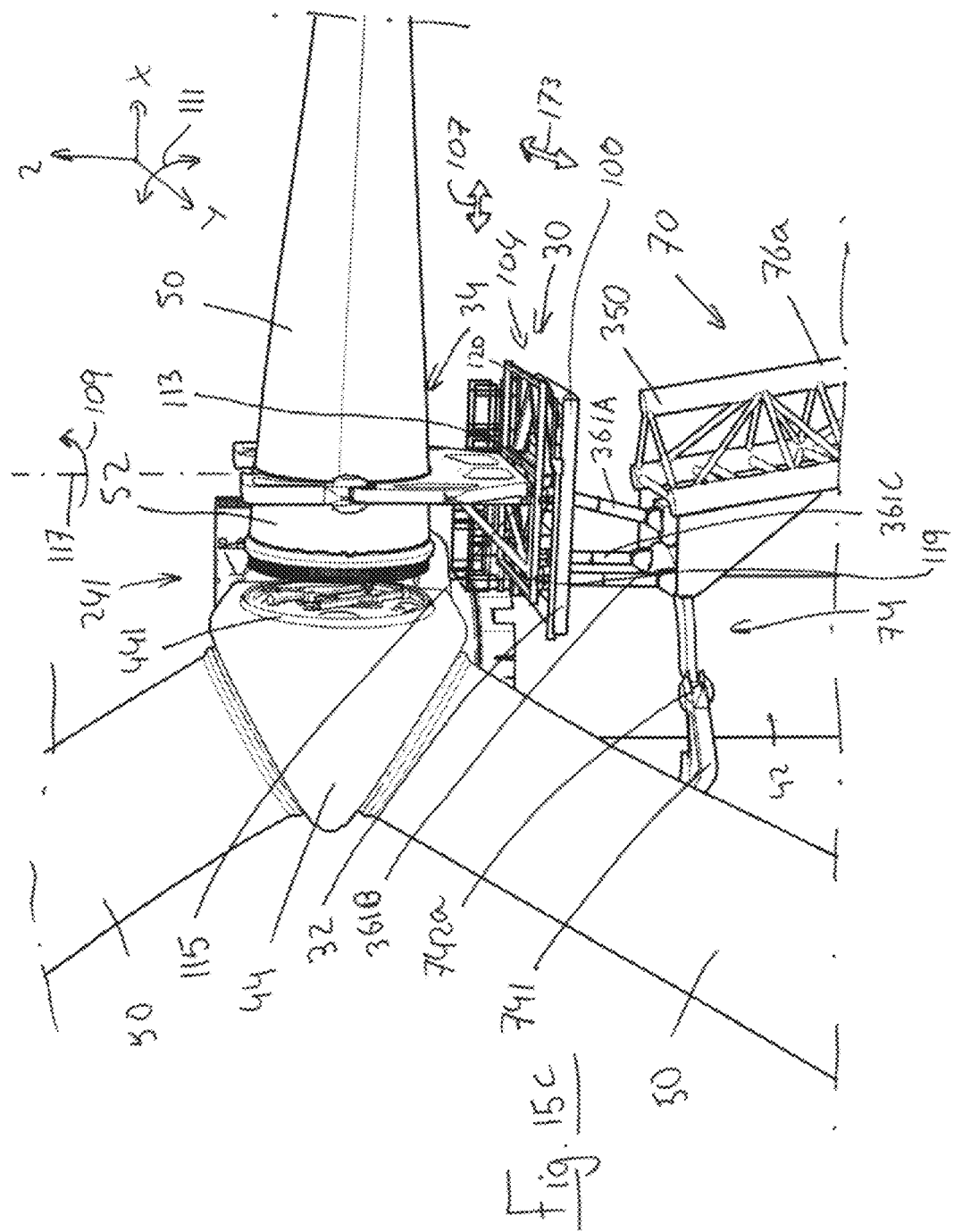

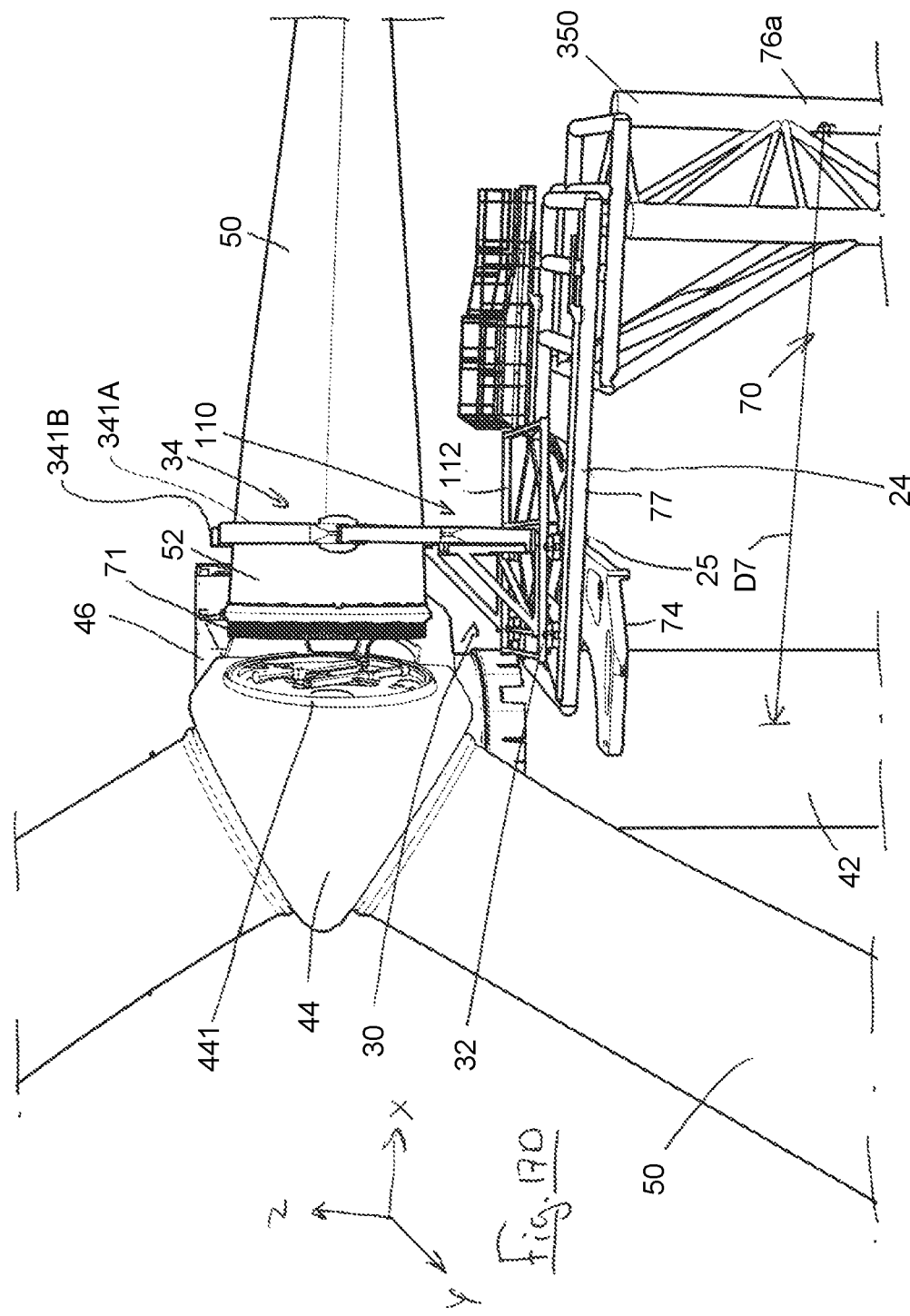

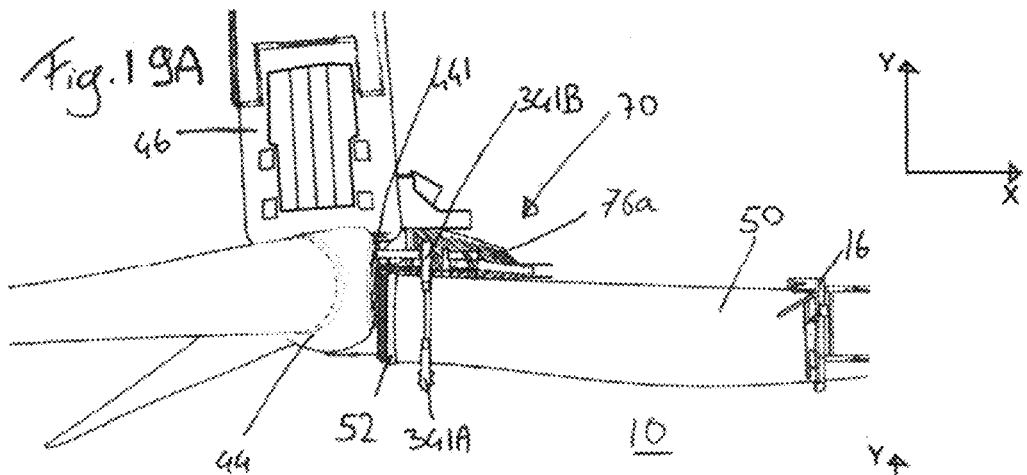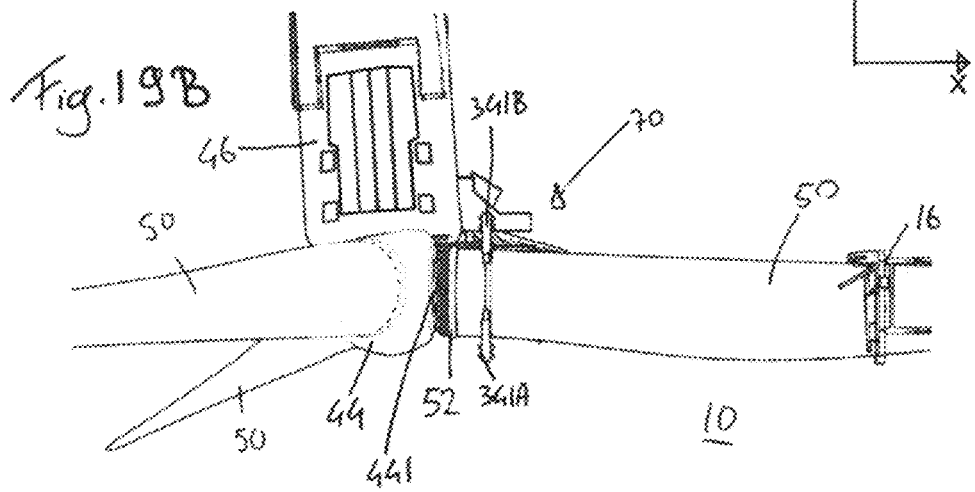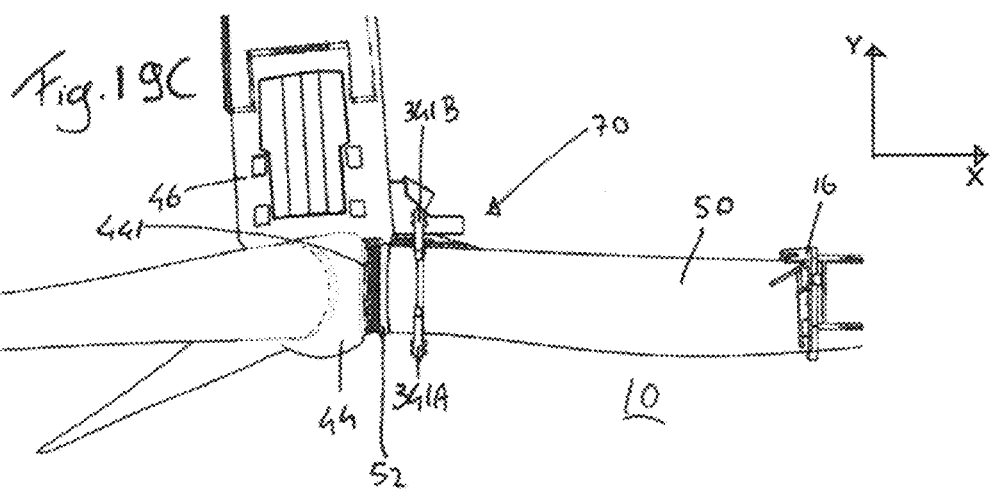

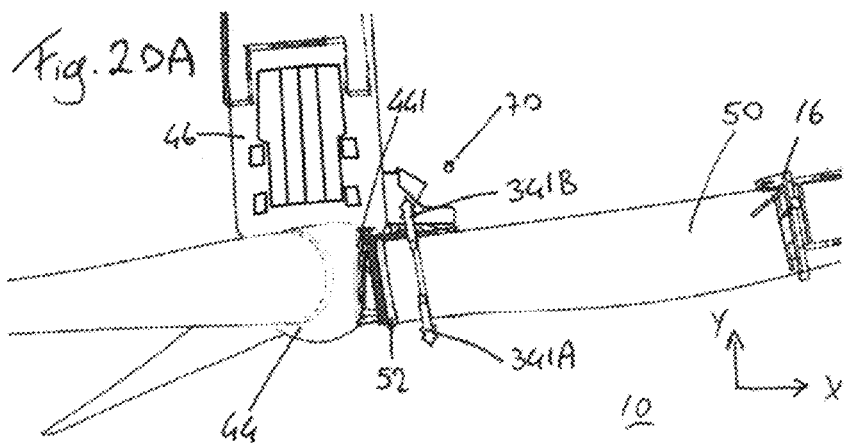
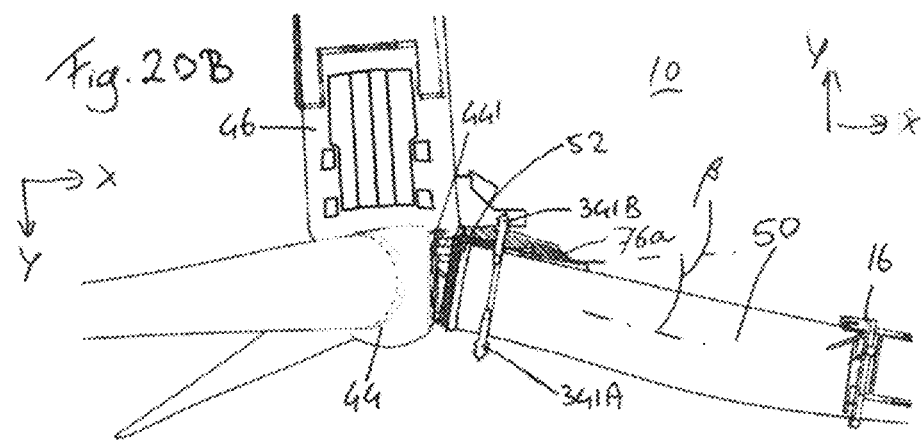
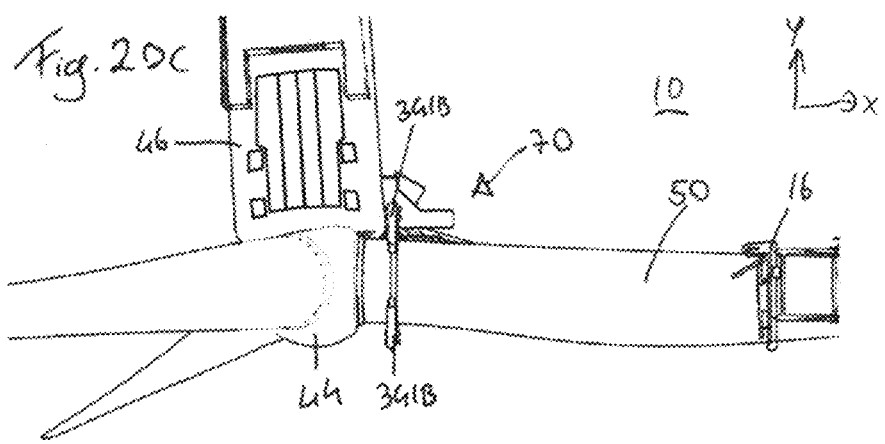

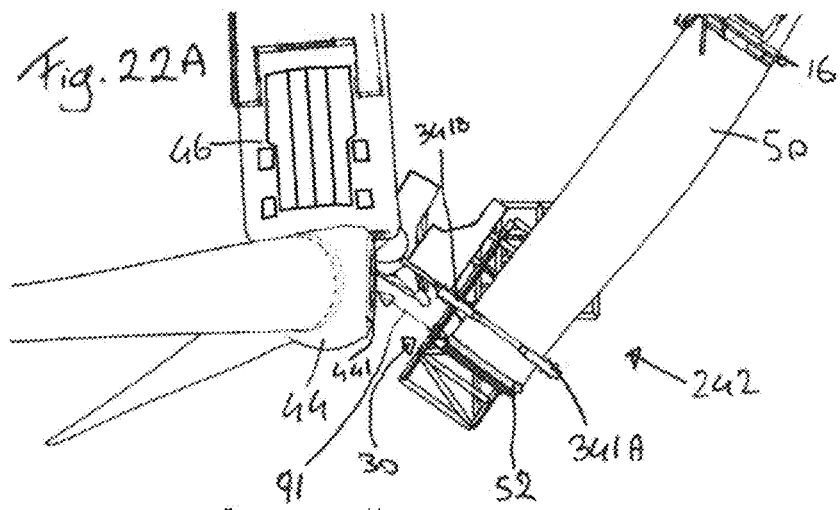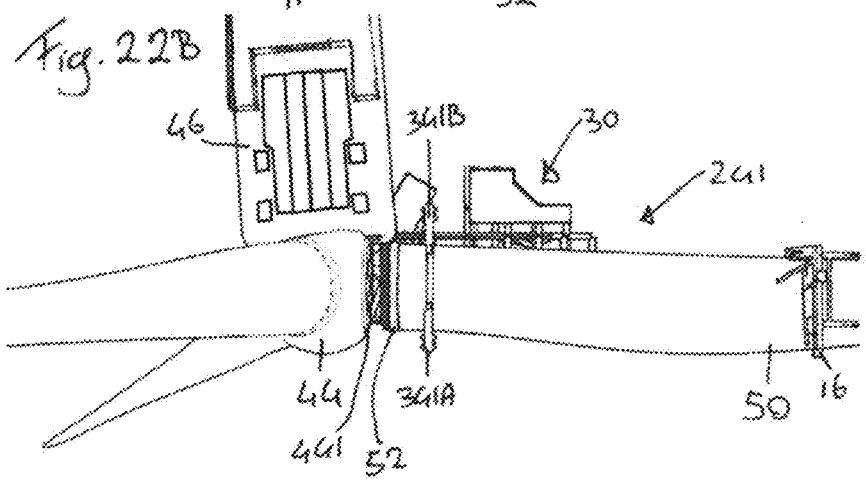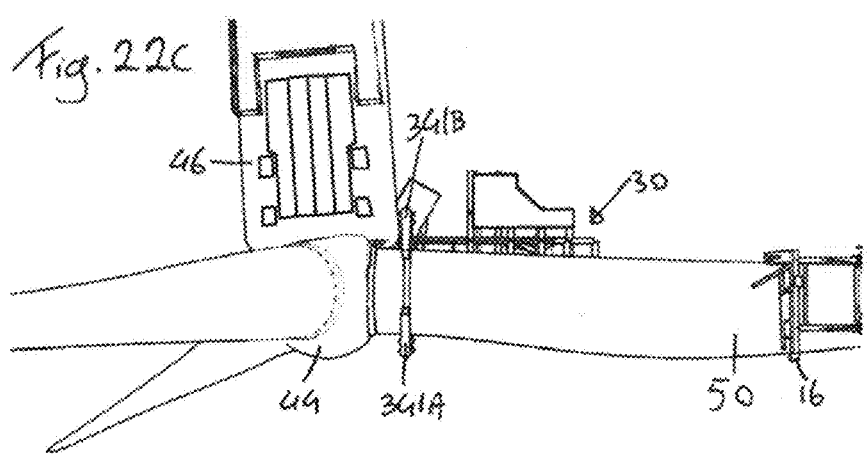

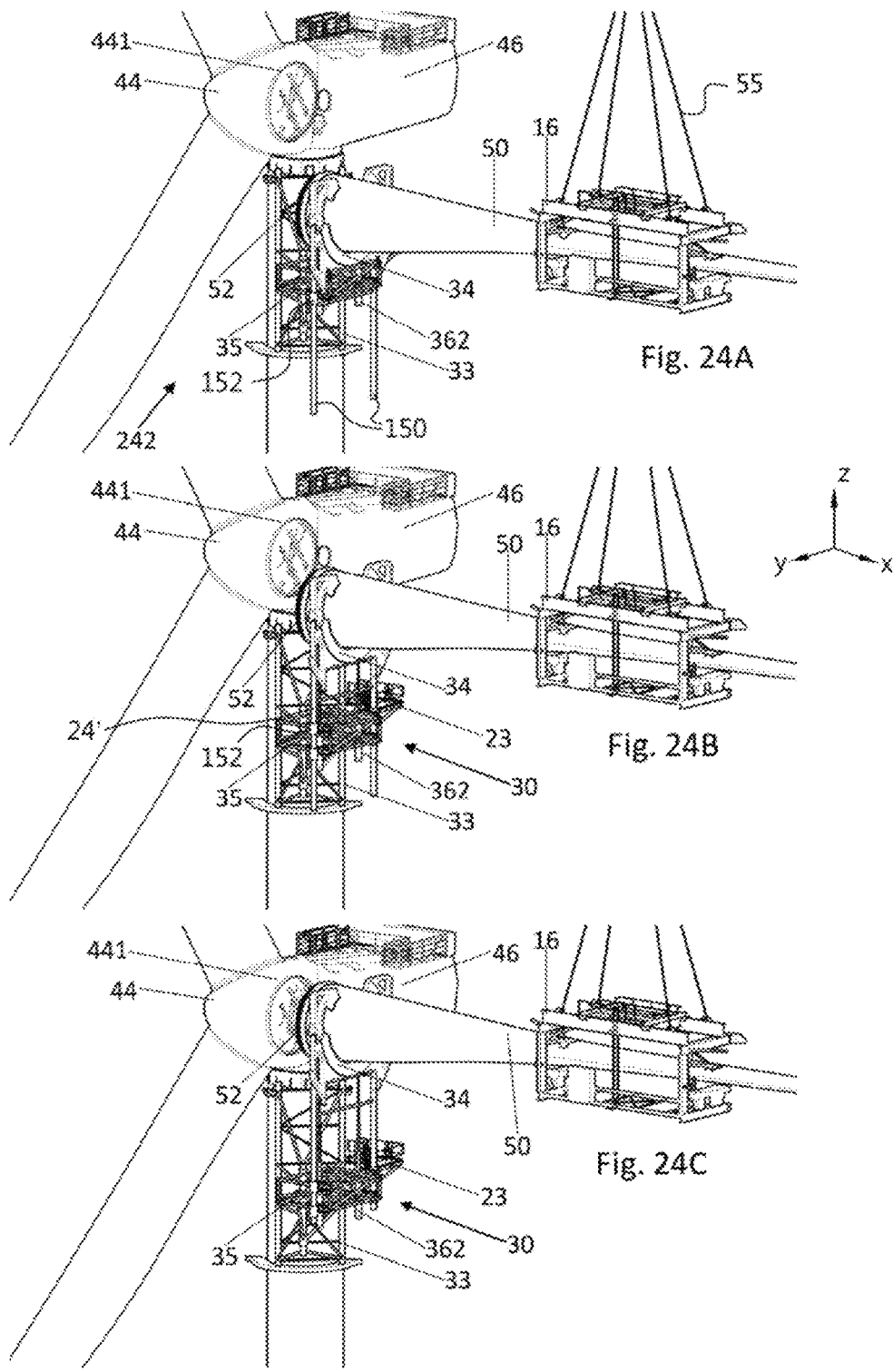

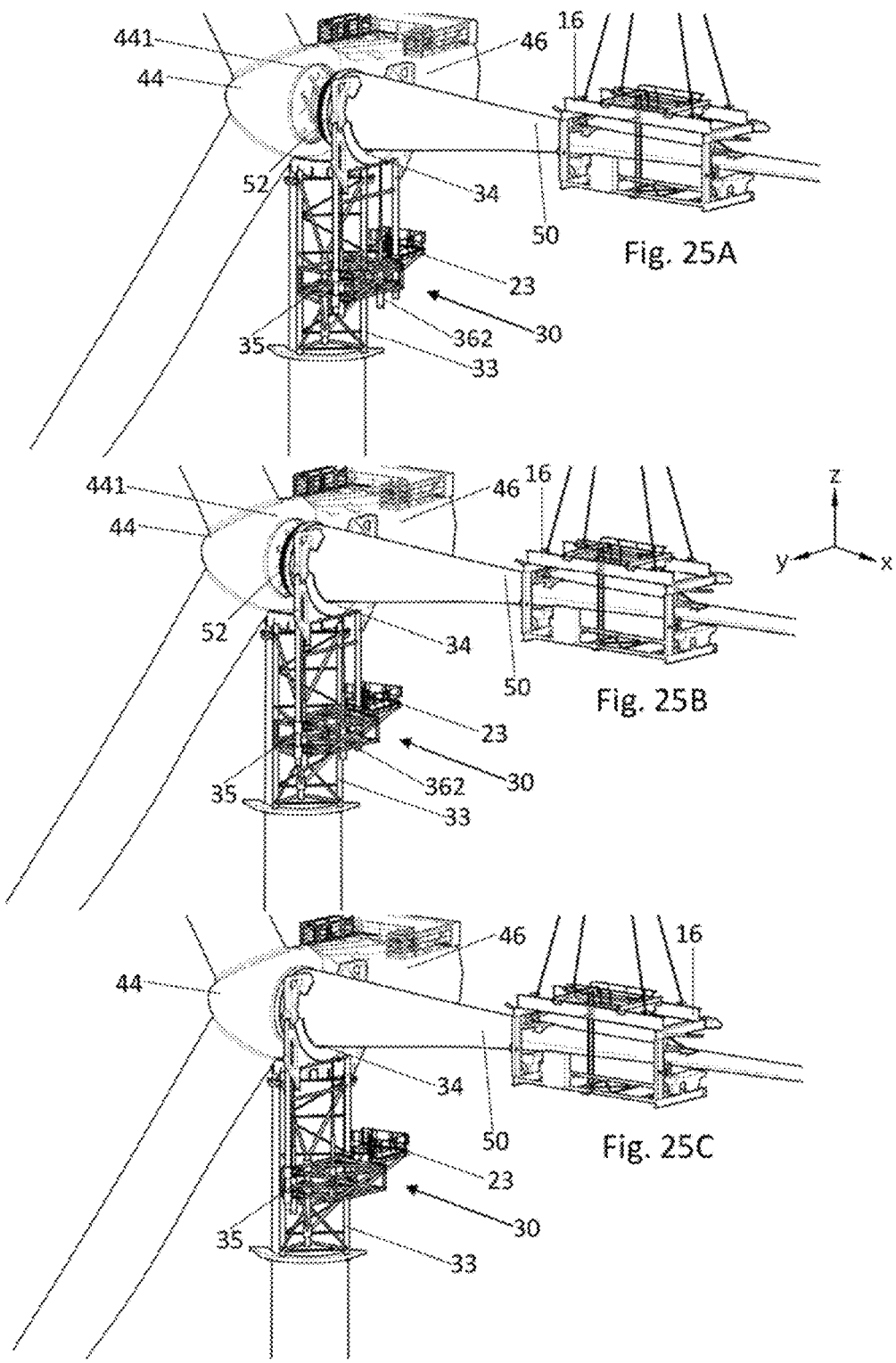

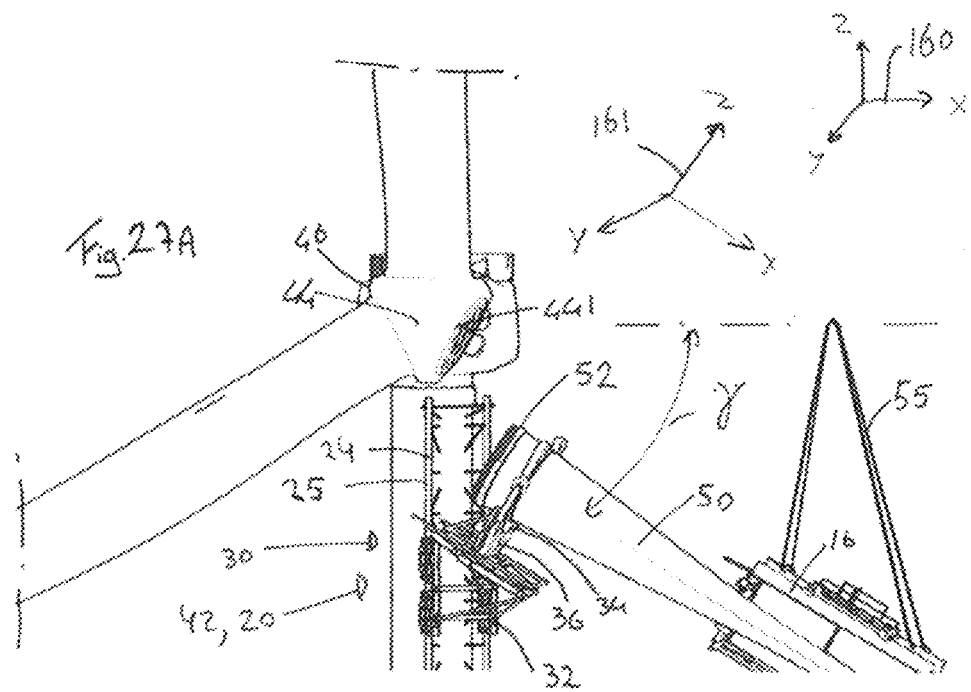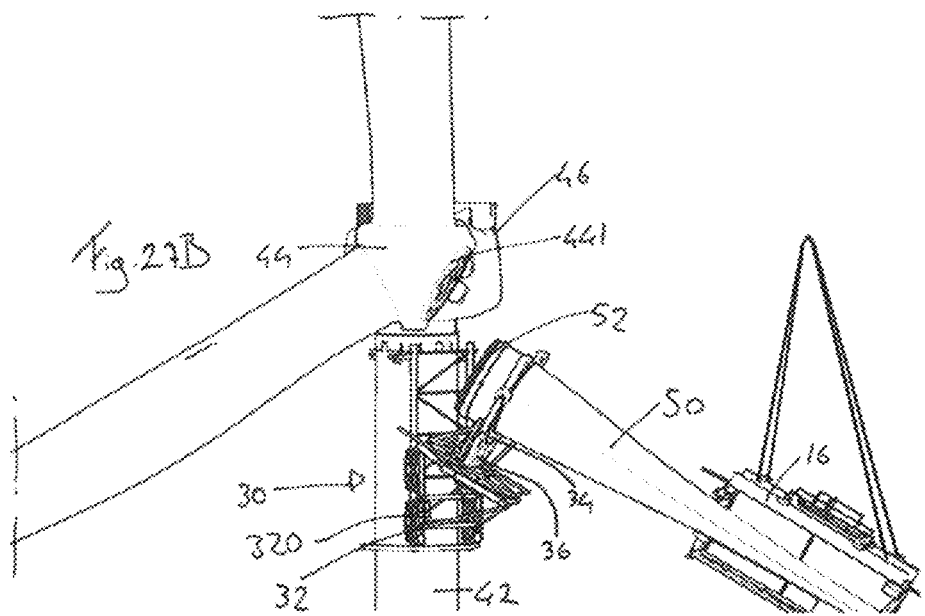

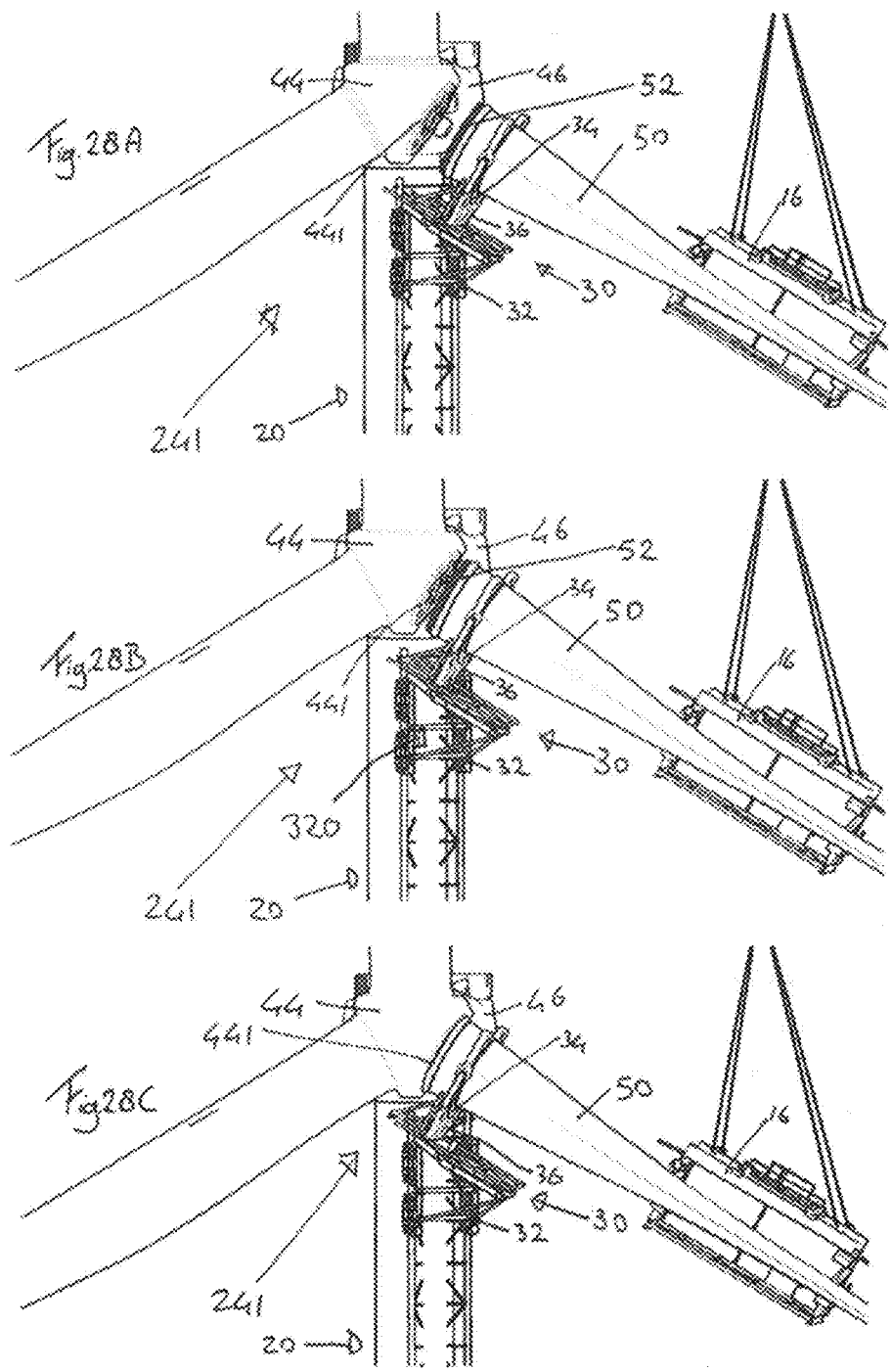

METHOD AND DEVICE FOR CONNECTING A BLADE OF A WIND TURBINE TO A HUB

FIELD OF THE INVENTION

The invention relates to the field of offshore wind turbine installation and in particular to a method and device for moving a wind turbine blade toward a hub of a nacelle, wherein the nacelle is positioned on a mast in an offshore environment, and wherein the blade is moved toward the hub with the help of a crane on an installation vessel.

BACKGROUND OF THE INVENTION

In the field of offshore wind turbine installation, various methods of connecting the blades to a nacelle exist.

Many requirements and considerations apply to methods of connecting blades to a nacelle offshore. For instance, the total installation time is an important factor in the cost of installation. Further, weather conditions may impede the installation, and for this reason the installation time should be short.

Furthermore, safety issues are important, offshore installation methods generally carry a certain risk for personnel, and this risk should be minimized.

Furthermore, during installation, many different steps need to be carried out. As a whole the installation of a wind turbine at sea is quite complex, and reducing this complexity can result in an increase of safety and a reduction of costs.

Furthermore, there is a general tendency that wind turbines are ever-increasing in size and thus installation occurs at high elevation. Additionally, this means that the blades of these turbines also increase in size, and currently may have a length greater than 100 m. With this increase in size, the handling becomes increasingly difficult.

Furthermore, there is a tendency to install wind turbines at increasing water depths. As jack-up rigs have limitations when it comes to water depth, an increase in water depth results in an increase in size of the jack-up rig. This in turn leads to an increase in jack-up time, resulting in higher costs.

An alternative to a jack-up rig is the use of a floating vessel. Although a floating vessel may be more adequate for large water depths, it is more susceptible to environmental conditions and more degrees of freedom are present which complicate the installation.

Furthermore, the environmental conditions at offshore wind turbine sites often involve high waves and strong winds. Preferably the installation method should allow for wind and waves and not be overly dependent on good weather.

Furthermore, the blades of wind turbines are quite vulnerable. They are susceptible to certain lifting restrictions. For instance the lifting points are prescribed and it is generally not acceptable to lift the blade at different lifting points. Furthermore they are susceptible to damage when excessive forces are exerted on the outer surface of the blade. The blades should be handled with significant care during installation.

Furthermore the blades generally have threaded ends at the root end. The threaded ends need to be accurately aligned with and inserted in holes on the hub. This requires precision. The prescribed lifting point(s) is/are generally located at a centre of gravity of the blade which is relatively far away from the threaded ends at the root end. This makes it difficult to accurately position and align the root end.

To make matters more complicated, the blades are specifically designed to catch wind. As a result, even a slight breeze may affect the positioning and the alignment of the blade with the root end connector on the hub.

Furthermore the blades need to be aerodynamic. Hence it is generally not allowed to have bulky mounting positions on the blade. This makes the blades difficult to handle.

All of these considerations make it difficult to create a method that is not only simple, fast and safe, but also cost efficient.

US2011/0056168A1 (hereinafter D1) discloses a method and device for the installation of a wind turbine, where the system consists of a hoisting platform and a carrier placed on a jack-up rig. The carrier is positionable along the hoisting platform and the hoisting platform is positionable along at least one of the jack-up rig's legs. The carrier can position a component for installation at a site where a foundation is present.

In one embodiment of D1, shown in FIGS. 20-24, a blade handler is connected to the carrier and a blade is positioned in the handler. Subsequently, the blade is positioned adjacent a nacelle and tower unit placed on a foundation for installation thereto.

Once the blade is in the vertical position, see FIG. 23, the carrier is moved along the hoisting platform such that the blade is horizontally aligned with the nacelle. The blade is then moved upwardly and connected to the nacelle. The nacelle may then be rotated, and the process is repeated for additional blades.

Although it appears that this method works, it was recognized in the present invention that this method has a number of drawbacks.

First, the location of the nacelle on top of the wind turbine tower means that the connecting of the blades to the nacelle must be carried out at a high elevation. This means that an operator situated on the deck of the vessel may not have a clear view of the root end connector of the blade. This may pose a problem when aligning the root end of the blade with the root end connector of the hub. This issue is emphasised due to the lack of a guidance system.

Furthermore, the blade needs to be rotated from a horizontal orientation to a vertical orientation during the lifting of the blade. In order not to damage the blade, significant care must be taken in order to avoid any collision with other objects situated on the deck.

In addition, the blade is not free to rotate about all three axes. This limits alignment options during the final step of installation. Where this is not a problem if the initial positioning in the blade handler is done right, it imposes a requirement on the quality of positioning and therefore will cost more time.

US2010/0293781A1 discloses an installation vessel and method for the installation of offshore wind turbines. In one embodiment, a cantilever mast is used to transfer components from a jack-up rig to an offshore installation site. In another embodiment, a crane is used in cooperation with a guide arm to transfer and guide components from an installation vessel to an offshore installation site.

In the first embodiment shown in FIG. 3, a nacelle comprising a hub is placed on a platform connected to a cantilever mast that is moveable about the deck of the installation vessel. The platform may translate in the vertical direction, along the cantilever mast. Subsequently, a blade is picked up by a blade handling crane and is positioned by that crane to be connected to the hub. Hereafter, the hub is rotated 120 degrees to allow installation of a subsequent blade. The nacelle is then positioned for assembly to the wind turbine tower by moving the cantilever tower to an adequate position.

In the second embodiment shown in FIG. 5, the blades are directly attached to a hub-nacelle assembly installed on the tower sections of the turbine, which in turn have been installed on the foundation of the turbine. A blade handling crane lifts a blade and places it in an elevator connected to the cantilever mast. This elevator then lifts the blade up to a desired height for the cantilever mast to move into position for the attachment of the blade to the hub. Hereafter, the hub is rotated 120 degrees to allow the installation of a subsequent blade.

FIGS. 7A-7E disclose a third embodiment in which a so-called tower trolley 730 is connected to the mast 15. The frame 730 is configured to support an RNA (Rotor Nacelle Assembly) The frame is configured to move the RNA upward to the top of the mast. See paragraphs 62-69.

It was recognized in the present invention that this method and its embodiments have several disadvantages. A first disadvantage relates to the first embodiment; the blade is solely handled by a blade handling crane. The fact that the assembly is performed only by a crane without any guidance system is difficult because the crane operator must position and align the blade at a significant distance from his own position.

Furthermore, in this first embodiment, the use of a jack-up rig is necessary with respect to the influence of environmental conditions.

A disadvantage of the second embodiment lies in the fact that the cantilever tower and the elevator connected to it may only translate. This limits the ease, and therefore the speed, with which a blade can be connected to a hub.

Furthermore, the fact that only translations are possible, limits the use of the invention to a jack-up rig. Use of the invention on a floating vessel would be impossible as any wave motion would be passed along into a motion of the cantilever tower, and with that the blade root end connector.

A disadvantage of the third embodiment is that the entire RNA needs to be transferred to the tower trolley by the crane on the jack-up rig. This results in a considerable risk of collision between the RNA and the tower, in particular with high winds, because the gap between the RNA and the tower is quite small and there is little control over the movements of the RNA. Perhaps this operation is possible from a jack-up rig, although it would be quite risky. It is believed to be very risky or even technically impossible to carry out such an operation from a floating installation vessel. It is important to note that blades of a wind turbine are light constructions which are designed to catch wind. Blades are therefore very sensitive to wind. This increases the risk of collision WO201393614A1 discloses an invention relating to the assembly of a wind turbine at sea. The discloses device comprises lifting means adapted to place components on a foundation present in the sea, wherein the device further comprises a robot arm with a tool for the supporting of components, at least during placing thereof. Likewise, the invention relates to a method for assembling a wind turbine at sea.

The invention makes use of a crane and a robot arm for the installation of the blades to a hub that is connected to a nacelle that is placed on a turbine tower placed on a foundation present in the sea. The blade is lifted by the crane and is supported by the robot arm. The robot arm is used for the alignment between the lifted blade and the nacelle placed on the turbine tower.

Although it appears that this method seems to work, it was recognized in the present invention that this method has a number of drawbacks.

First, while the use of a robot arm for the alignment of a blade to the nacelle is innovative, the size of the blade makes that an already expensive piece of equipment like a robot arm must be able to handle extremely large items, further increasing costs of installing such a blade.

Furthermore, the use of the invention is limited to a jack up rig; Use of the invention on a floating vessel would be extremely difficult as any wave motion would be passed along into a motion of the tower and should then be compensated by the robot arm.

US2019/0017495 discloses a method and system for installing blades onto the hub of a wind turbine. This system uses a forked frame which is mounted via a hinge to the nacelle via a hinge. The forked frame comprises a clamp. See FIG. 5. This document explicitly teaches away from the use of a crane, see paragraph 3.

EP2623768A1 discloses a method and system for installing a blade onto the hub of a wind turbine. The system comprises a lifting frame which is connected to the blade. The lifting frame comprises a subframe 5 which extends around the root end of the blade and which is configured to engage the hub for the root end itself engages the hub. See FIG. 1. It appears that the system still would have considerable risks of collisions and damage, in particular to the hub or nacelle. Also, because of the increasing size of wind turbines it appears to be rather difficult to install a wind turbine blade onto the opening of the hub when this opening is oriented upward as shown in FIG. 1. This would require a large crane and the operator could probably not see anything from below.

OBJECT OF THE INVENTION

It is an object of the invention to provide an installation method and an installation device for installing wind turbine blades to a nacelle at sea which is relatively fast, safe, structured, reliable and cost-effective.

SUMMARY OF THE INVENTION

In order to achieve the object, the present invention provides a method for connecting wind turbine blades to a hub of a nacelle of a wind turbine at or near an offshore target location, the method comprising the steps:

a) positioning an installation vessel at the target location, the installation vessel comprising a lifting device configured for lifting wind turbine components, wherein the installation vessel further comprises an auxiliary support tower extending upwardly from a hull or deck of the installation vessel, the auxiliary support tower comprising:
 a nacelle support for supporting the nacelle,
 a root end moving assembly defining a guide path which extends over a vertical distance, the root end moving assembly comprising a movable root end support base and a root end support configured for supporting and guiding the root end of the blade, the root end support being connected to the movable root end support base, the root end support being movable along the guide path, the root end support being configured for engaging the root end of the blade in an engagement position thereof, the root end moving assembly being configured for moving the root end of the blade upward along the guide path from the engagement position to an installation position of the blade, b) positioning a nacelle comprising a hub on the auxiliary support tower,
c) engaging a blade with the root end support at the engagement position and moving the blade upwards towards the hub from the engagement position to the installation position in a joint operation of the root end moving assembly and the lifting device, wherein the root end is supported and guided by the root end support and the lifting device carries a majority of the vertical loads on the blade,
d) connecting the root end of the first blade to the hub,
e) repeating steps c) and d) for at least one subsequent blade, and in particular all blades, thereby forming either a complete rotor nacelle assembly (RNA) or a partial (RNA).

The present invention advantageously allows the structured and safe assembly of turbine blades to a nacelle by making use of a relatively fast, safe and cost-effective procedure. Until now, such a procedure was not available. Given the ever increasing size of offshore wind turbine, the increasing depths at which those turbines are installed, and the difficulties accompanied by them, the present invention is a valuable contribution to this field of technology.

Here, a complete RNA means the nacelle, hub and all blades. A partial RNA means the nacelle, hub and only a portion of the blades.

The lifting device carries the majority of the vertical loads on the blade (forces in the Z-direction). The vertical loads may comprise the weight and vertical forces resulting from vertical accelerations.

The root end moving assembly may carry the majority of horizontal loads in the longitudinal direction of the blade (forces in the X-direction).

The forces in a horizontal direction in a Y-direction (orthogonal to the longitudinal direction of the blade) may be carried by a combination of the crane, possible tugger lines and also the root end moving assembly.

Moments about the X-axis, Y-axis and Z-axis may be carried by a combination of the lifting device, one or more tugger lines and the root end moving assembly.

The words "extending upwardly from a hull or deck of the installation vessel" are to be interpreted broad. The auxiliary support tower does not need to be connected directly to the hull or deck, as long as it rises upward from the hull or deck.

The invention comprises a support structure, wherein, in one embodiment, the support tower is a tower extending upwardly from the hull or deck of an installation vessel. A nacelle support connected to this support tower is configured to temporarily support a nacelle during the connecting of one or more blades thereto. This tower may be shorter than a turbine mast, with the result that installation may occur at low elevation.

In an embodiment the blade is held horizontally or substantially horizontally by the root end moving assembly and the lifting device during the lifting operation.

In an embodiment the blade is held horizontally or substantially horizontally by the root end moving assembly and the lifting device during the positioning operation In a further, independent aspect, the invention relates to a method for connecting wind turbine blades to a hub of a nacelle of a wind turbine at an offshore target location, the method comprises the steps:
a) positioning an installation vessel at a wind turbine mast assembly at the target location, the installation vessel or vessels comprising a lifting device configured for lifting wind turbine components,
the wind turbine mast assembly comprising:
a mast,
a nacelle support at an upper end of the mast,
a root end moving assembly defining a guide path which extends over a vertical distance, the root end moving assembly comprising a movable root end support base and a root end support configured for supporting and guiding the root end of the blade, the root end support being connected to the movable root end support base, the root end support being movable along the guide path, the root end support being configured for engaging the root end of the blade in an engagement position thereof, the root end moving assembly being configured for moving the root end of the blade upward along the guide path from the engagement position to an installation position of the blade,
b) positioning a nacelle comprising a hub on the mast,
c) engaging a blade with the root end support at the engagement position and moving the blade upwards towards the hub from the engagement position to the installation position in a joint operation of the root end moving assembly and the lifting device, wherein the root end is supported and guided by the root end support and the lifting device carries a majority of the vertical loads on the blade,
d) connecting the root end of the first blade to the hub,
e) repeating steps c) and d) for at least one subsequent blade, and in particular all blades, thereby forming either a complete rotor nacelle assembly (RNA) or a partial (RNA).

In yet a further, independent aspect, the invention relates to a method for connecting wind turbine blades to a hub of a nacelle of a wind turbine at an offshore location, the method comprises the steps:
a) positioning an installation vessel at a wind turbine mast assembly at the target location, the installation vessel comprising a lifting device configured for lifting wind turbine components, wherein the installation vessel further comprises an auxiliary support structure connected to a hull or deck of the installation vessel, the auxiliary support structure comprising:
a positioning assembly,
a root end moving assembly comprising a movable root end support base and a root end support configured for supporting and guiding the root end of the blade, the root end support being connected to the movable root end support base, the root end support being configured for engaging the root end of the blade in an engagement position thereof, the root end moving assembly being configured for moving the root end of the blade from the engagement position to an installation position of the blade,
wherein the root end moving assembly is connected to the positioning assembly and the positioning assembly allows the movement of the root end moving assembly. the wind turbine mast assembly comprising:
a mast,
a nacelle support at an upper end of the mast,
b) positioning a nacelle comprising a hub on the mast,
c) engaging a root end of the blade with the root end support at the engagement position and moving the blade towards the hub from the engagement position to the installation position in a joint operation of the auxiliary support structure and the lifting device, wherein the root end is supported and guided by the root end support and the lifting device carries a majority of the vertical loads on the blade, d) connecting the root end of the first blade to the hub, e) repeating steps c) and d) for at least one subsequent blade, and in particular all blades, thereby forming either a complete rotor nacelle assembly (RNA) or a partial (RNA).\

This embodiment can be particularly useful when the installation vessel is a non-floating device, in particular a jack-up rig. This embodiment can also be used on a floating vessel.

When used on a floating device, the floating device can be a semi-submersible vessel that comprises a dynamical position system in order to remain at substantially the same position. Alternatively, the floating vessel can be physically moored in order to remain at substantially the same position. The auxiliary support structure can then offer one or more degrees of freedom to uncouple the movement of the mast from the movement of the installation vessel.

In this embodiment, the root end moving assembly may comprise a mast stop configured to engage the mast or the nacelle in the installation position and that can be uncoupled from the movement of the installation vessel together with the root end moving assembly.

The installation position can be located outboard of the installation vessel.

The positioning assembly can comprise an elongated member, wherein the elongated member is connected to the hull or deck of the installation device via a hinge located at one extremity of the elongated member and wherein the root end moving assembly is connected to the opposite extremity of the elongated member.

The positioning assembly may extend at least partially upwards from the deck or hull of the installation vessel.

In the embodiment wherein the root end moving assembly comprises a mast stop, the mast stop may comprise a mast gripper configured to engage the mast and to connect the root end moving assembly to the mast, wherein the positioning assembly comprises at least of degree of freedom allowing the relative motion of the root end moving assembly and mast with respect to the installation vessel.

More specifically, the positioning assembly comprises three degrees of freedom.

The nacelle can be placed on the wind turbine mast which is already placed on its foundation. This can be a fixed foundation (jacket/monopole) or a floating foundation. A nacelle support forms the interface between nacelle and mast. The nacelle support is configured to support the nacelle during the operational life of the wind turbine.

In some embodiments, the guide path of the blade moving system comprises of a loading rail, having one end at the nacelle support, and having another end, further away from the nacelle support.

The wind turbine mast assembly may have been pre-installed by the same installation vessel or by a different installation vessel. The installation of the wind turbine assembly may be a sub-procedure part of step a) and be carried out prior to step b).

Along this loading rail, a movable root end support base may roll or slide between a pickup location and an installation position. Herein, a root end support is directly or indirectly mounted to the movable root end support base and is moved by the combination of the movable root end support base and a drive system. This drive system may be embodied by the use of winches. However, the skilled person will note that a variety of drive systems is possible.

This root end support may then engage the root end of a blade and may then move together with the movable root end support base, moving the root end of the blade along a guide path to the root end connector of the nacelle.

In order to minimise the load on the root end moving assembly, part of the blade is engaged by a lifting device, in particular near the centre of gravity of the blade, more in particular at the centre of the gravity. The crane lifts the blade in cooperation with the root end moving assembly. If the blade is engaged near the centre of gravity, the root end moving assembly carries a small portion of the weight of the blade. If the blade is engaged in the centre of gravity, the root end moving assembly only guides the root end of the blade. The pickup orientation of the blade may vary, however, it is preferable that the blade be in horizontal orientation.

In one embodiment, the joint operation of the lifting device and upward movement of the root end moving assembly leads to the maintaining of the horizontal orientation of the blade during the blade movement from an engagement position to an installation position.

To reduce loads on the blade due to a potential mismatch in velocity or position of the crane and root end moving assembly, in one embodiment, the rotation around the Y and Z direction is fully released between the root end support and the movable root end support base.

In another embodiment, the rotation around the Y and Z direction is partially released in the connection between the root end support and the movable root end support base to reduce loads on the blade. The partial release may be done by using actuators or springs or any other obvious device.

Using this freedom in rotation, when the root end support has been moved into position, the crane may be used to pivot the blade around the Y and Z direction. By doing so, the plane of root end of the blade may be aligned with the plane of the root end connector of the hub of the nacelle.

The connection between the movable root end support base and the root end support may comprise actuators, the final alignment and positioning of the root end of the blade may use these actuators. These actuators may translate the blade in X, Y, and Z direction or rotate the blade about any of these directions. This is particularly useful for the alignment of the multiple threaded ends of the blade root end to the holes of the root end connector.

To oversee and control the assembly process during the lifting of the blade and during the installation process, the loads on the blade are monitored by use of sensors. In addition, the orientation of the blade with respect to a fixed coordinate system is also monitored by use of sensors.

The operator of the lifting device also operates the auxiliary support structure or the root end moving assembly. Herein, the operator can be provided with means to monitor the orientation of the blade with respect to a fixed coordinate system and to monitor the loads on the blade moving system as a result of the orientation of the blade.

The lifting device and the auxiliary support structure or the root end moving assembly can be coupled via a control unit and the control unit can be used to move the lifting device and the root end moving assembly in tandem, wherein input data for the control unit comprises the vertical position of both the root end moving assembly and the connection point of the lifting device to the blade and wherein said input data is used to calculate relative locations and/or speeds of the connection point of the lifting device to the blade and of the root end support.

In yet another independent aspect, the invention relates to a method for disconnecting wind turbine blades from a hub of a nacelle of a wind turbine at or near an offshore location is also provided, wherein the wind turbine comprises a mast and a nacelle support at the upper end of the mast, the method comprising the steps:
- a) positioning an installation vessel at the target location, the installation vessel comprising a lifting device configured for lifting wind turbine components, and
- b) positioning a root end moving assembly on the mast, the root end moving assembly defining a guide path which extends over a vertical distance, the root end moving assembly comprising a movable root end support base and a root end support for supporting a root end of the blade, the root end support being connected to the movable root end support base, the movable root end support being moveable over a vertical distance,
- c) supporting a blade jointly with the root end moving assembly and the lifting device at a de-installation position of the blade, and
- d) disconnecting the root end of a first blade from the hub, and
- e) supporting and/or guiding the blade jointly with the root end moving assembly and the lifting device and moving the blade downwards towards a disengagement position in a joint operation of the root end moving assembly and the lifting device, wherein the root end is supported by the root end support of the root end moving assembly and the lifting device carries the majority of the vertical loads on the blade, and
- f) disengaging the root end from the root end support and removing the blade from the root end moving assembly, and
- g) repeating the steps c) to f) for at least one subsequent blade.

In an even further, independent aspect, the invention relates to a method for disconnecting blades from a hub of a nacelle of a wind turbine at or near an offshore location, wherein the wind turbine comprises a mast and a nacelle support at the upper end of the mast, the method comprises the steps:
- a) positioning a blade positioning system according to claim 42 comprising an installation vessel, the installation vessel comprising a lifting device configured for lifting wind turbine components, and
- b) positioning the root end moving assembly at a de-installation position of the blade,
- c) supporting a blade jointly with the auxiliary support structure and the lifting device at the de-installation position of the blade, and
- d) disconnecting the root end of a first blade from the hub, and
- e) supporting and/or guiding the blade jointly with the auxiliary support structure and the lifting device and moving the blade downwards towards a disengagement position in a joint operation of the auxiliary support structure and the lifting device, wherein the root end is supported by the root end support of the root end moving assembly and the lifting device carries the majority of the vertical loads on the blade, and
- f) disengaging the root end from the root end support and removing the blade from the root end moving assembly, and
- g) repeating the steps c) to f) for at least one subsequent blade.

The blade moving system is positioned near the side of the installation vessel to minimise lift time and lift distance when a blade or nacelle is being transferred.

The present invention further relates to a blade positioning system configured for positioning wind turbine blades at a hub of a nacelle of a wind turbine from an installation vessel at an offshore target location, wherein the blade positioning system comprises:
the installation vessel comprising:
- at least one lifting device configured for lifting wind turbine components, and
- an auxiliary support tower extending upwardly from a hull or deck of the installation vessel, the auxiliary support tower comprising:
  - a nacelle support for supporting the nacelle,
  - a root end moving assembly defining a guide path which extends over a vertical distance, the root end moving assembly comprising a movable root end support base and a root end support configured for supporting and guiding the root end of the blade, the root end support being connected to the movable root end support base, the root end support being movable along the guide path, the root end support being configured for engaging the root end of the blade in an engagement position thereof, the root end moving assembly being configured for moving the root end of the blade upward along the guide path from the engagement position to an installation position of the blade,
wherein at least one lifting device is configured for lifting the nacelle onto the auxiliary support tower,
wherein at least one lifting device and the root end moving assembly are configured to jointly support a blade and jointly move the blade upwards towards the hub, wherein during the upward movement the root end is supported by the root end support of the root end moving assembly and the lifting device carries a majority of the vertical loads on the blade.

The present invention further relates to a blade positioning system configured for positioning wind turbine blades at a hub of a nacelle of a wind turbine from an installation vessel at an offshore target location, the nacelle being positioned on a wind turbine mast assembly comprising a mast and a nacelle support located at an upper end of the mast, the wind turbine mast assembly being positioned at the target location adjacent the installation vessel, wherein the blade positioning system comprises:
the installation vessel comprising at least one lifting device configured for lifting wind turbine components, and
a root end moving assembly which is configured to be connected to the wind turbine mast assembly (40), the root end moving assembly (30) and defining a guide path which extends over a vertical distance, the root end moving assembly comprising a movable root end support base and a root end support configured for supporting and guiding the root end of the blade, the root end support being connected to the movable root end support base, the root end support being movable along the guide path, the root end support being configured for engaging the root end of the blade in an engagement position thereof, the root end moving assembly being configured for moving the root end of the blade upward along the guide path from the engagement position to an installation position of the blade,
wherein the at least one lifting device is configured for lifting the nacelle onto the wind turbine mast,
wherein the at least one lifting device and the root end moving assembly are configured to jointly support a blade and jointly move the blade upwards towards the hub, wherein during the upward movement the root end is supported by the root end support of the root end moving assembly and the lifting device carries a majority of the vertical loads on the blade.

The present invention also relates to a blade positioning system configured for positioning wind turbine blades at a hub of a nacelle of a wind turbine from an installation vessel at an offshore target location, wherein said wind turbine comprises:
- a wind turbine mast assembly comprising:
  - a mast,
  - a nacelle support at an upper end of the mast, and wherein the blade positioning system comprises:
- the installation vessel comprising:
  - at least one lifting device configured for lifting wind turbine components, and
  - an auxiliary support structure comprising
    - a positioning assembly comprising an elongated member,
    - a root end moving assembly positioned at an upper end of the elongated member and comprising a movable root end support base and a root end support configured for supporting and guiding the root end of the blade, the root end support being connected to the movable root end support base, the root end support being configured for engaging the root end of the blade in an engagement position thereof, the root end moving assembly being configured for moving the root end of the blade from the engagement position to an installation position of the blade, wherein the at least one lifting device is configured for lifting the nacelle onto the wind turbine mast, and wherein the at least one lifting device and the root end moving assembly are configured to jointly support a blade and jointly move the blade upwards towards the hub, wherein during the upward movement the root end is supported by the root end support of the root end moving assembly and the lifting device carries a majority of the vertical loads on the blade.

In one embodiment, the installation device comprises a loading rail and a movable root end support base that moves along the loading rail. This loading rail is connected to the nacelle support structure having a one end at the nacelle support, and another end further away from the nacelle support. This loading rail defines a guide path along which the movable root end support base moves. This loading rail extends over a vertical distance and may be exactly vertical.

In the engagement position of the root end support, the root end support may engage a root end of a blade which is in a horizontal or substantially horizontal position.

The root end support is connected to the movable root end support base in a manner so that the blade may rotate with respect to the movable root end support base. This rotation may be free in one embodiment, while in another embodiment it is partially braked and/or dampened.

In one embodiment, the connection between the root end support and the root end support base may not only rotate, but may also be actuated to move the root end (and the blade) in six degrees of freedom.

In order to reduce the complexity and improve the safety of the instalment of the blades to the nacelle, several sensors may be present. In one embodiment, the installation device is equipped with sensors to measure the load on the blade. In another embodiment, the installation device is equipped with sensors to observe the orientation of the blade relative to a fixed coordinate system.

The present invention further relates to a root end moving assembly according to claim 77 and to a wind turbine mast assembly according to claim 78.

Further advantageous features are defined in the dependent claims.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

FIGS. 1A and 1B depict the top view of two embodiments of the invention on two different ships. FIG. 1C depicts a third embodiment of the invention.

FIGS. 2A-2C depict the process of transporting a blade between an engagement and an installation position along an auxiliary tower.

FIGS. 4A, 4B depict a root end supported by a blade loader rotated around the vertical axis and towards the nacelle.

FIGS. 5A, 5B depict a root end supported by a blade loader rotated around the vertical axis and away from the nacelle.

FIGS. 7A, 7B depict a root end supported by a blade loader rotated around a horizontal axis with the crane block at a lower position than the root end support.

FIGS. 14A-C depict another embodiment of the invention comprising an auxiliary support structure at an engagement position, and intermediate position and an installation position.

FIGS. 15A, 15B and 15C depict a further embodiment of the invention comprising an auxiliary support structure.

FIGS. 17A-D depict another embodiment of the auxiliary support structure being moved between an engagement position and an installation position.

FIGS. 19A-19C depict a root end supported by a blade loader at the installation position. The blade is shown in an extreme position furthest away from the nacelle, in a position closer to the nacelle, and in an extreme position closest to the nacelle.

FIGS. 20A-20C depict a root end of a blade being supported by a blade loader. The blade being rotated counter clockwise with respect to an aligned position, being rotated clockwise with respect to an aligned position and being in an aligned position.

FIGS. 22A-22C depict the root end of a blade being supported by a blade loader in a position relatively far away from a hub, in a position closer to a hub and in a position connected to a hub.

FIG. 24A-24C depict a root end supported by a blade positioning system being moved in a vertical direction.

FIGS. 25A-25C depict a root end supported by a blade loader at the installation position. The blade is shown in an extreme position furthest away from the nacelle, in a central position, and in an extreme position closest to the nacelle.

FIGS. 27A-27B depict two embodiments for which a blade is loaded and attached to a hub under an angle.

FIGS. 28A-28C depicts the process of moving a blade in the direction orthogonal to the X- and Y-direction.

DETAILED DESCRIPTION OF THE FIGURES

Introduction

Figure 3A:
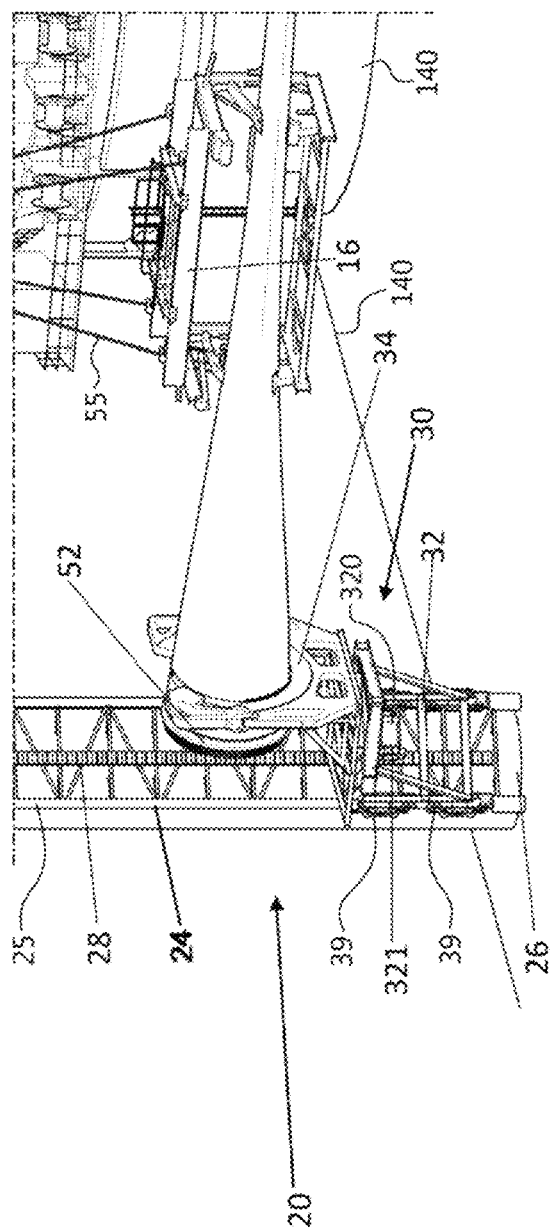
FIGS. 3A, 3B depict a root end supported by a blade positioning system at an engagement position.

Turning to FIGS. 1A, 1B, and 1C three embodiments of a blade positioning system 200 comprising an installation vessel 10A, 10B, 10C (commonly denoted with 10) positioned at an offshore target location are shown. The embodiment of FIG. 1A uses an auxiliary support tower positioned on the installation vessel 10A. The embodiment of FIG. 1B uses a mast of the wind turbine itself for the installation. The embodiment of FIG. 1C represents a separate invention that is closely related to the two embodiments in FIGS. 1A and 1B. This embodiment uses an auxiliary support structure 70 with which blades are installed on a hub of a nacelle.

On the decks 12A, 12B, 12C of the installation vessels lifting devices 14A, 14B, 14C are shown. In these embodiments, the lifting device is a crane. This lifting device is configured to lift wind turbine components. The crane comprises a crane base 57 which is rotatable about vertical axis 59. The crane comprises a boom 61 which has an adjustable boom angle.

Overview of First Embodiment

With reference to FIGS. 1A and 2A-2C, an auxiliary support tower 20 extends upwardly from a deck 12A of the installation vessel 10A. The installation vessel 10A may be a semi-sub but also a regular vessel or a jack-up rig. The auxiliary support tower may also be connected to the hull, for instance on the side thereof, and rise upwardly from the hull. The auxiliary support tower comprises a nacelle support 22A for supporting the nacelle.

A guide path 24 is located adjacent the auxiliary support tower. A root end moving assembly 30 is provided which is movable along the guide path. In this embodiment, the guide path comprises a (loading) rail 25. The rail 25 has a lower end 140 and an upper end 141. The guide path extends over a vertical distance D1. The guide path may be vertical. The root end moving assembly 30 is configured for moving the root end 52 of the blade upward along the guide path from an engagement position 242 to an installation position 241 of the blade. The installation position is at the nacelle support 22A. The engagement position 242 is located at a distance below the installation position. The root end moving assembly 30 is connected to the auxiliary support tower 20. For de-installation, the opposite trajectory is followed.

Overview of Second Embodiment

Figure 13A:
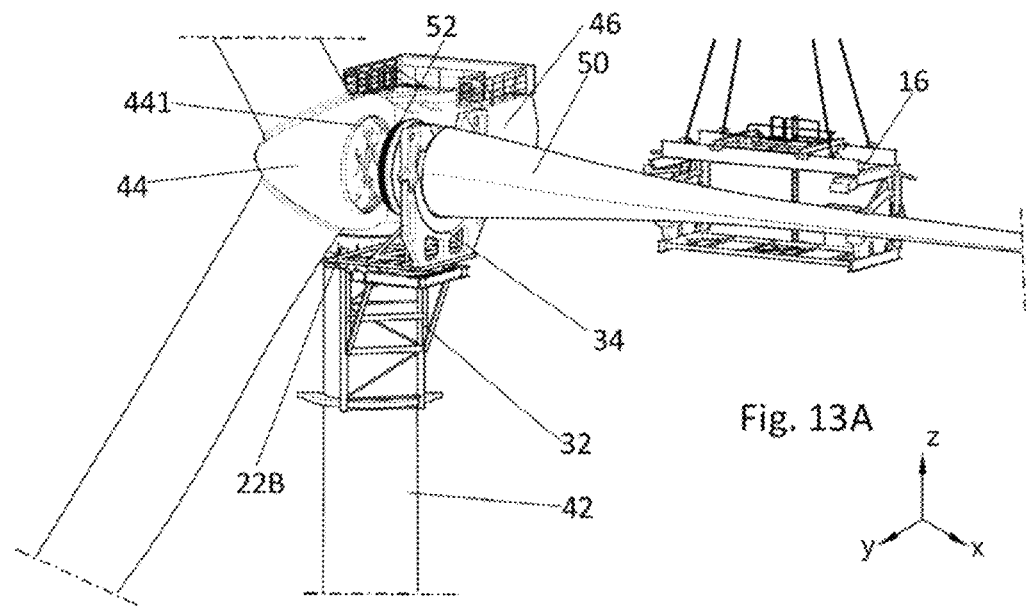
FIGS. 13A, 13B depict two embodiments of the blade positioning system as used on a mast of a wind turbine.
Figure 13B:
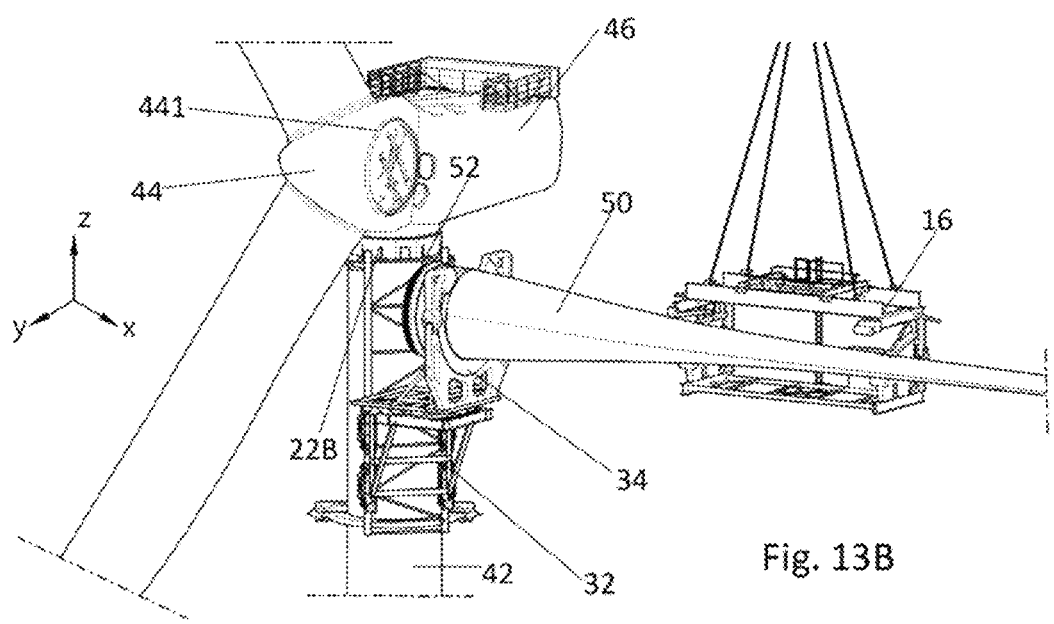

In the second embodiment, depicted in FIGS. 1B and 13B, the installation vessel 10B may be a semi-sub but also a regular vessel or a jack-up rig. A wind turbine mast assembly 40 has been installed at an offshore location and comprises a mast 42, a nacelle support 22B at an upper end of the mast, and a guide path 24 extending over a vertical distance, the guide path being defined between an installation position 241 at the nacelle support and an engagement position 242 which is located below the installation position. The second embodiment is similar to the first embodiment in many ways, but instead of the auxiliary support tower 20 the mast 42 of the actual wind turbine is used. This is a more direct method. In this embodiment, the rail 25 may be permanently or temporarily connected to the mast 42.

The root end moving assembly 30 comprises a movable root end support base 32 and a root end support 34 which is configured for supporting and guiding the root end 52 of the blade 50. The root end support is connected to the movable root end support base.

Overview of Third Embodiment

In the separate, but related invention depicted in FIG. 1C, a wind turbine mast assembly 40 has been installed at an offshore location and comprises a mast 42 and a nacelle support at an upper end of the mast. The installation vessel 12C is shown comprising an auxiliary support structure 70 which comprises a positioning assembly 72 and a root end moving assembly 30. The root end moving assembly 30 is provided comprising a movable root end support base and a root end support which is configured for supporting and guiding the root end of the blade. The root end support is connected to the movable root end support base.

In the invention depicted in FIG. 1C, the installation vessel 12C is shown to be a jack-up rig. This embodiment, is applicable for a floating vessel such a semi-sub or a regular vessel and for a jack-up rig.

Details of First Embodiment

Returning to FIGS. 2A, 2B and 2C, the method for connecting a wind turbine blade to a hub 44 of a nacelle 46 of a wind turbine is shown. The auxiliary support tower 20 extends upwardly from a deck 12 of the installation vessel 10. The nacelle with a hub has been placed on the auxiliary tower. Two blades 50B, 50C have already been connected to the hub. The hub 44 has been oriented for a root end connector 441 to be available to engage the root end 52 of a blade 50A.

In FIG. 2A, a blade 50A is supported by a lifting frame 16 connected to a lifting device 14A or 14B (commonly denoted as 14 and not shown in these figures) via one or more cables 55. The root end 52 of the blade is supported by the root end moving assembly 30. The root end support 34 is positioned at a distance below the installation position 241. The root end support is in particular positioned at the engagement position 242. The root end support base 32 is connected to a guide path 24.

In FIG. 2B, by a joint operation of the root end moving assembly 30 and lifting device 14, the blade 50 has been moved upwardly away from an engagement position 242 to an intermediate position 243. The intermediate position lies in between the engagement position 242 and the installation position 241.

In FIG. 2C, the root end moving assembly 30 is at an installation position 241. Here, the root end 52 of the blade is positioned in the vicinity of the root end connector 441 of the hub 44. At this location, the blade may be connected to the hub, thus forming (part of) a rotor nacelle assembly.

The skilled person will understand that the general principle described above and depicted in FIGS. 2A-2C is also applicable for a guide path extending along an installed wind turbine mast as shown in FIG. 13B.

Also, in the embodiment shown in FIG. 2A-2C, the blade may be oriented horizontally during every step of the process. The angle between the blade and the horizon may also be larger or smaller than zero degrees, i.e. the blade may be inclined.

Figure 3B:
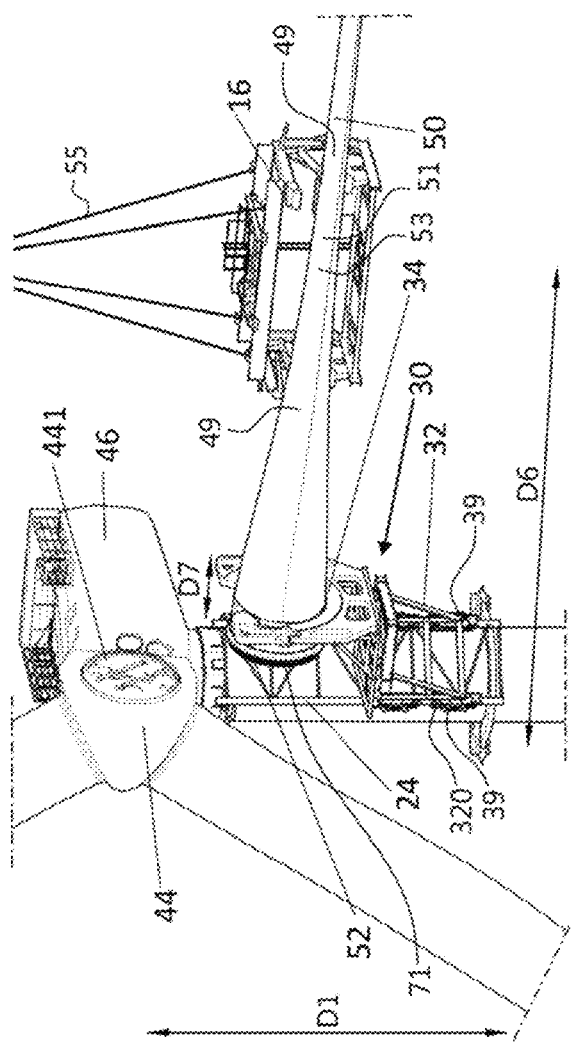

Turning to FIGS. 3A and 3B, the root end support 34 is shown at a lower end of the guide path 24. The movable root end support base 32 of the root end moving assembly 30 is shown and is connected to the guide path 24. The root end support is connected to the movable root end support base 32 and extends outwardly from the guide path. The root end 52 of the blade is supported by the root end support 34.

The blade 50 is connected to the lifting device 14 via the lifting frame 16. FIG. 3A shows the root end moving assembly at the base 26 of the auxiliary tower 20. The movable root end support base 32 comprises wheels 39 or sliding members which allow the movable root end support base 32 to move upward and downward along the rail 25. The movable root end support base 32 can be a trolley.

FIG. 3B shows the root end moving assembly at the lower position of the guide path 24 in an embodiment where the guide path doesn't extend over the entire length of the auxiliary tower or over the entire length of a turbine mast. The guide path extends over only a portion of the height of the turbine mast, and in particular has a length which is 1-10 times the diameter of the mast 42 or 1-10 times the diameter of the root end 52 of the blade. The lifting frame is connected to a central portion 51 of the blade. The lifting frame 16 is connected close to, and more in particular at, the centre of gravity 53 of the blade 50. The lifting frame 16 supports the blade at at least two locations 49 on either side of the c.o.g. 53.

In FIGS. 3A and 3B the auxiliary tower 20 is shown with the guide path 24 being embodied by a rail 25. In the middle of this rail, a possible embodiment of a drive system is shown. Here, the drive system comprises a rack 28 that may extend over the entire length of the guide path 24. In this embodiment, a pinion 321 connected to the root end moving assembly 30 engages the rack 28 and permits the root end moving assembly 30 to move along the guide path 24. The pinion 321 is driven by a drive 320.

It will be understood that this rack 28 and pinion 321 may be used to align the root end 52 of the blade 50 with the root end connector 441 of the hub 44 in the Z-direction.

Details of Embodiment of Root End Moving Assembly

Figure 3K:
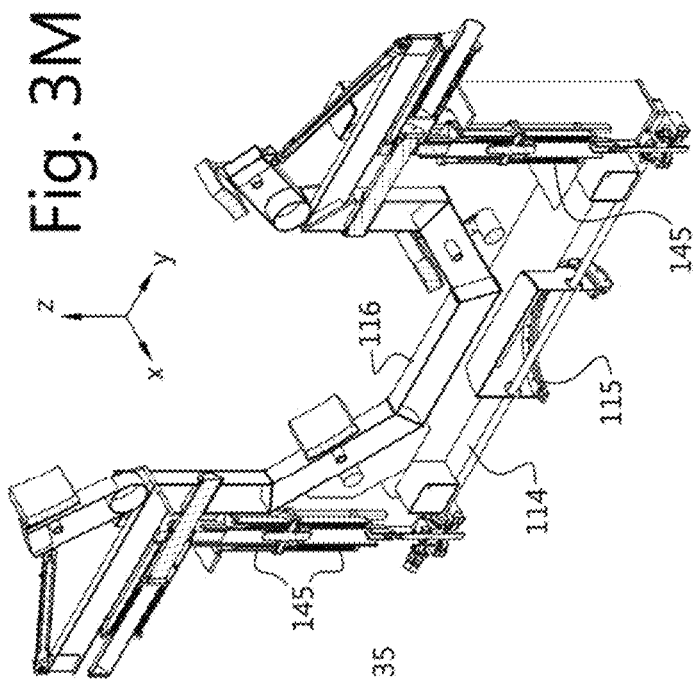
FIGS. 3C-3T show further details of a root end support.
Figure 3L:
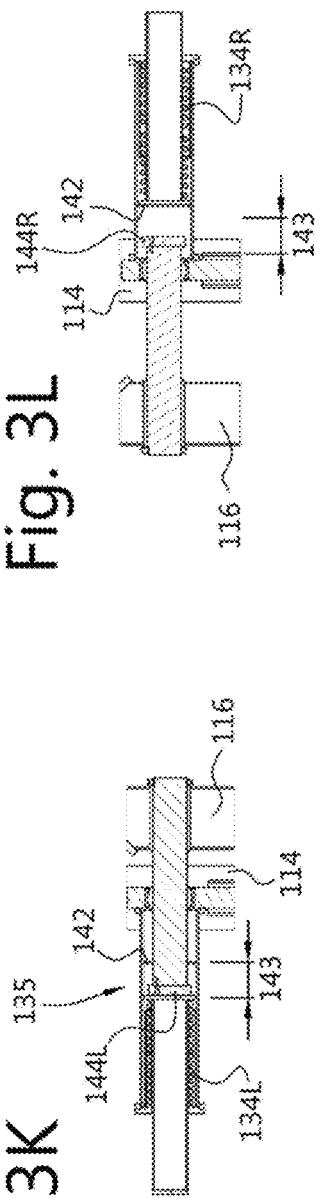
Figure 3J:
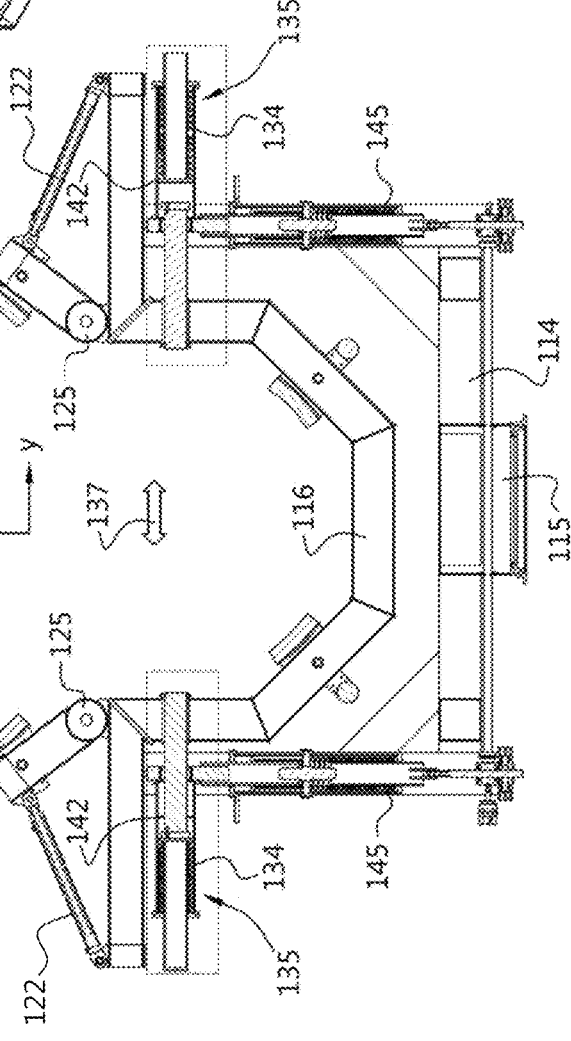
Figure 3M:
Figure 3R:
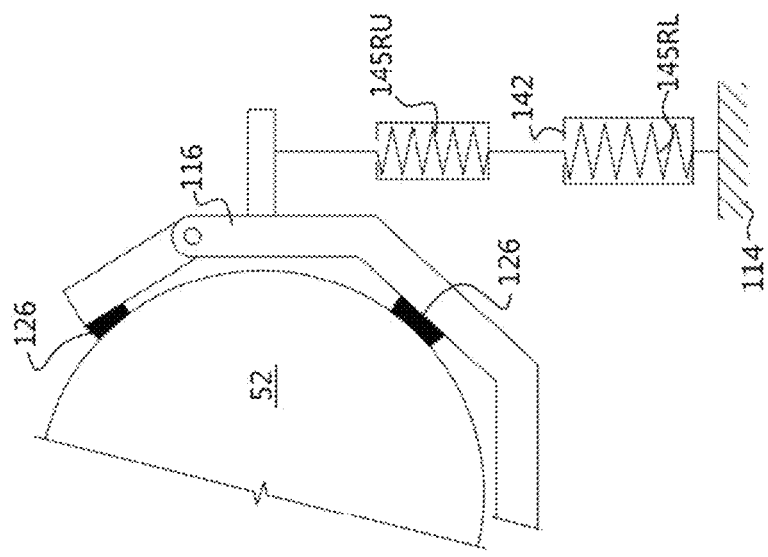
Figure 3S:
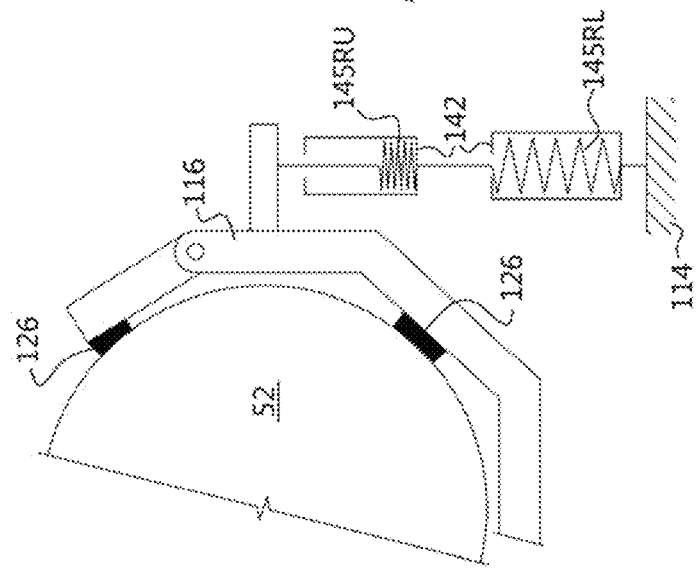
Figure 3T:
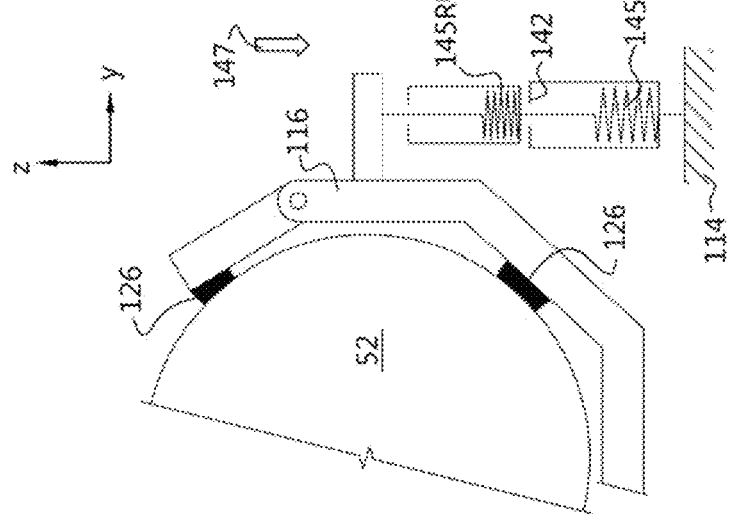

Turning to FIGS. 3C-3T, details of another embodiment of the root end moving assembly 30 including the movable root end support base 32 and the root end support 34 are shown. The movable root end support base 32 comprises a base frame 100 which extends outwardly from the rail 25 over a horizontal distance D3 in the X-direction and over a distance D4 in the Y-direction. The base frame 100 is connected to the rails 25 via wheels 39 or sliding members. The rails 25 in turn is/are connected to the mast 42 or to the auxiliary support tower 20, for instance via bolts or via a different connection.

The base frame 100 forms a platform 104 which has a length and width in the X-direction and Y-direction. The base frame 100 comprises X-direction rails 108 which extend in the X-direction. The root end support 34 comprises a carriage 110 which travels in the X-direction along the X-direction rails 108 of the base frame 100 as indicated with arrow 107. One or more drives or actuators 119 are provided on the carriage 110 to move the carriage 110 in X-direction 107. FIGS. 3C and 3D show the carriage 110 in different positions.

The carriage 110 comprises a carriage base frame 112 and an upstanding carriage frame 114. The carriage 110 comprises rails 171 which extend in the Y-direction. The upstanding base frame 114 comprises a horizontal frame section 114a and wheels 172 or sliders which allow the upstanding base frame move in the Y-direction relative to the carriage base frame 112. A drive or actuator 113 is provided to move the upstanding carriage frame 114 in the Y-direction 173. Given the relatively short stroke in the X-direction and Y-direction, a cylinder may be preferable for both the X-direction drive 119 and the Y-direction drive 173.

The upstanding carriage frame 114 is connected via a Z-hinge 115 to the carriage base frame 112. The Z-hinge 115 allows the upstanding carriage frame 114 to pivot about the Z-axis 117 relative to the carriage base frame 112 as indicated by arrow 109. See FIGS. 3F and 3I for the Z-hinge 115. The upstanding carriage frame 114 defines a U-shape. A root end saddle 116 is rotatably connected to the upstanding carriage frame 114 via one or more Y-hinges 118 which allow the root end saddle 116 to pivot relative to the upstanding carriage frame 114 about a Y-axis 2 as indicated by arrow 111. The root end saddle defines a root end space 138 which can accommodate the root end 52.

The root end saddle 116 further comprises clamping members 341 (also called projections) which are actuated by actuators 122 and which allow the clamping members to pivot about hinges 125 as indicated by arrows 124. In this way the root end 52 can be gripped by the root end support 34. The root end saddle 116 of the root end support 134 is fitted with various support pads 126 which are rounded to enable gripping of the root end without damaging the root end. In use the root end 52 is lowered from above into the root end saddle 116 as indicated by arrow 139 (FIG. 3J), for instance by the lifting device or in another way. Subsequently, the clamping members 341 rotate and engage the root end to hold the root end in the required position with the support pads 126.

In this way, the root end support 34 and the root end 52 which is held by it can be moved in five degrees of freedom relative to the hub 44 and the designated root end connector 441 in the hub.

It is noted that for the rotations about the Y-axis and Z-axis, the lifting device will generally rotate the blade possibly with the help of via one or more tugger lines 140 acting on the lifting frame 16. Hence the root end saddle 116, the blade 50 including the root end 52 may follow the movements of the lifting frame 16. For the translations in the X-direction, Y direction and Z-direction, the various actuators/drives 113, 119, 320 in the root end moving assembly 30 are used to position the root end. This allows movements of the blade 50 relative to the tower 20 or mast 42 during the lifting operation.

For the rotation about the X-axis, the connector 441 may be rotated about the X-axis. To this end the root end connector comprises a rotatable ring 443. See FIG. 3C which shows the rings 443 of the hub and in which the rest of the hub has been left out. The rotatable ring 443 generally comprises the holes into which the threaded ends on the root end are inserted. This degree of freedom about the X-axis is available in the hub 44 anyway because the pitch angle (angle of incidence) of the blades 50 is adjustable to allow tuning and weathervaning of the blades when the wind turbine is operational. In this way the blade can be moved relative to the connector 441 in six degrees of freedom.

It is noted that other constructions of the root end moving assembly 30 which achieve the required degrees of freedom (in particular five degrees) are possible.

Maintain Target Position Until Threshold Force is Exceeded

Turning to FIGS. 3E-3T, the root end support 34 further comprises springs 134, 145 which are configured to hold the root end 52 in a target position, but which allow some movement of the root end 52 in the X-direction and Y-direction. In this embodiment the springs 134, 145 are provided between the upstanding carriage frame 114 and the root end saddle 116. The springs are pretensioned against a stop. In this way, there is no movement in the root end saddle 116 until the force on the spring exceeds the pretension.

The root end support 34 comprises two sets of springs 134, one Y-set 135 for the Y-direction and one Z-set 136 for the springs 145 in the Z-direction.

Turning to FIGS. 3E, 3F, 3G, 3J, 3K, 3L, the Y-set 135 is shown. The Y set allows a movement of the root end saddle 116 in the Y-direction as indicated by arrow 137. In this embodiment, the springs 134 of the Y-set are compression springs which are pretensioned against Y-stops 142. The pretension ensures that no movement occurs in the Y-direction until the force in the Y-direction exceeds the pretension. In case the lifting frame 16 of the crane moves the central portion 51 of the blade in the Y-direction, the root end saddle 116 will maintain the position of the root end 52 in the target position. However, because the distance D6 (see FIG. 3B) from the central portion 51 to the root end 52 will be significantly larger than the distance D7 from the root end saddle 116 to the very end of the root end where the threaded ends 71 are located, the root end saddle 116 will need to exert a much greater force on the root end 52 than the lifting frame 16 if a counter moment is to be exerted which prevents the root end (the threaded ends 71) from moving. The root end saddle 116 is not constructed to do this and more importantly, the forces exerted by the root end saddle 116 on the root end would become so great that the blade 50 would be become damaged at the root end 52. In order to avoid damage, the pretension and the stops ensure that the root end saddle gives way and starts to move in the Y-direction 137 when the forces become too great and before damage occurs. The pretension and the stops form a force limiting system 210 which limits the forces on the root end to a certain threshold in the Y-direction.

FIG. 3K shows a spring 134L on the left side of the root end saddle 116 which has been compressed to the left over a distance 143 away from the stop 142. FIG. 3L shows the opposite spring 134R on the right side of the saddle frame which does not extend further than the stop 142. A right abutment member 144R is provided which in FIG. 3L has disengaged from the spring 134R and moved over a distance 143 away from the spring. This allows the root end saddle 116 to move to the left because in this situation the force to the left has exceeded the threshold force defined by the pretension of the spring 134L. In case the force acts to the right, the mirror situation would occur. The spring 134R would compress and the left abutment member 144L would disengage from the left spring 134L.

A similar force limiting system (called a Z force-limiting-system 211) exists in the Z-direction. See FIGS. 3N and 3O. Springs 145LL (left lower), 145LU (left upper), 145RL (right lower) and 145RU (right upper) are provided on the upstanding carriage frame 114 on the left and right side of the root end saddle 116. Each of the four springs acts against a stop 142 and is pretensioned against the stop. The root end saddle 116 will move up or down as indicated by arrow 147 when the force exerted by the root end 52 on the root end saddle 116 exceeds the threshold force defined by the pretension. In FIG. 3P the root end saddle 116 has moved downward relative to the upstanding carriage frame 114.

Turning to FIGS. 3R, 3S and 3T a diagrammatic representation of the Z-system is provided. FIG. 3S shows the target position. When the lifting frame 16 is moved downwards, the root end saddle 116 will initially maintain its vertical position due to the pretension of spring 145RL. However at a certain point the vertical force will become so great that spring 145RL will compress and disengage from the stop 142. As a result, the roots and saddle 116 moves downwards. For the upper spring 145RU the situation is slightly different although the function is the same. The spring 145RU is fully compressed to the extent that it cannot be compressed any further and the force exerted on spring 145RU is greater than required to reach the full compression. For instance, full compression may be reached at 5 kN but the actual force may be 10 kN. Hence there is an overload of 5 kN. When the lifting frame 16 which carries the central portion of the blade is moved upwards, the overload gradually decreases, but the spring 145RU remains in the fully compressed state. Only when the overload becomes zero, the spring 145RU starts to expand. In this way it is ensured that the root end 52 stays in the target Z-position and only moves upwards or downwards after a threshold force has been exceeded.

In this embodiment the force limiting systems are not configured to prevent rotation of the blade 50 relative to the root end support 34 about the Y-axis and Z-axis. In other words, such rotations are allowed via hinges 115 and 118.

This embodiment does not comprise a force limiting system in the X-direction. In the X-direction the position of the root end saddle 116 is controlled by the X-drive 119. However, it is possible to implement such a system as well for the X-direction.

The root end moving assembly as described in FIGS. 3A-3T can be used both for the embodiment with the auxiliary tower 20 on board the installation vessel as for the embodiment in which the blades are mounted to the hub/nacelle on the mast 42.

Movements and Orientations of First Embodiment

Turning to FIGS. 4A and 4B, an embodiment of the root end moving assembly which is similar to the one of FIGS. 3A and 3B is shown. In FIG. 4, the blade has a different orientation than in FIGS. 3A and 3B and is rotated counter-clockwise about a vertical axis 117. FIG. 4A shows this rotation with respect to the situation in FIG. 3A at the lower end of the guide path. FIG. 4B shows this rotation with respect to the situation in FIG. 3B at the upper end of a guide path. It can easily be understood that this rotation is also possible at any intermediate position 243 between the engagement position 242 and the installation position 241. The rail 25 may be permanently connected to the tower 20.

Turning to FIGS. 5A and 5B, similar situations to FIG. 3 are shown. In FIG. 5, the blade is rotated clockwise with respect to the vertical axis 117. FIG. 5A shows this rotation with respect to the situation in FIG. 3A at the lower end of the guide path. FIG. 5B shows this rotation with respect to the situation in FIG. 3B at the upper end of a guide path. It can easily be understood that this rotation is also possible at any intermediate position between the engagement position 242 and the installation position 241.

The rotation of the blade around the Z-axis is allowed through the pivotal connection of the root end support 34 to the movable root end support base 32. In one embodiment, at the installation position 241 of the root end moving assembly 30, a pivot point 38 (as shown in FIG. 6) around which the root end support pivots, is the intersection of the z-axis 117 defined by the hinge 115 and the horizontal axis 2. The z-axis 117 is offset from the vertical axis 421 of the tower (and in other embodiments of the mast 42) over a distance D5.

The pivot point 38 may lie in the plane of the root end connector 441 of the hub 44 and coincide with the X-axis 1, which is the longitudinal axis of the blade 50. The X-axis 1 does not intersect a vertical mast/tower axis 421 of the auxiliary support tower or mast but instead extends at a horizontal distance D2 from the vertical mast/tower axis which horizontal distance corresponds to a hub projection distance over which the hub projects forward from the vertical mast/tower axis when the nacelle is positioned on the nacelle support. In doing so the movement relative to the root end connector remains as small as possible.

Figure 6A:
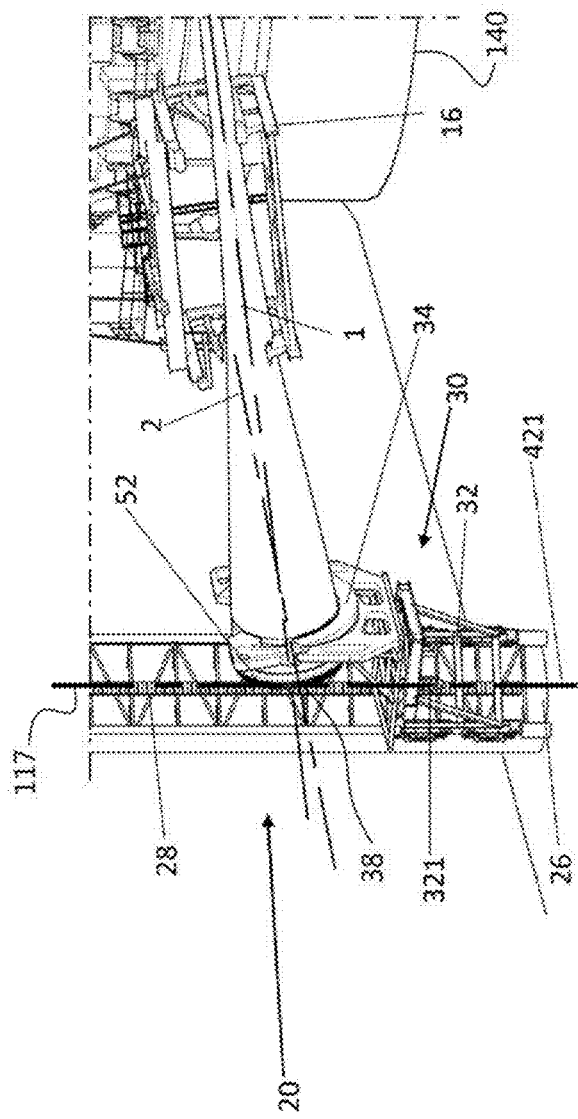
FIGS. 6A, 6B depict a root end supported by a blade loader rotated around a horizontal axis with the crane block at a higher position than the root end support.
Figure 6B:
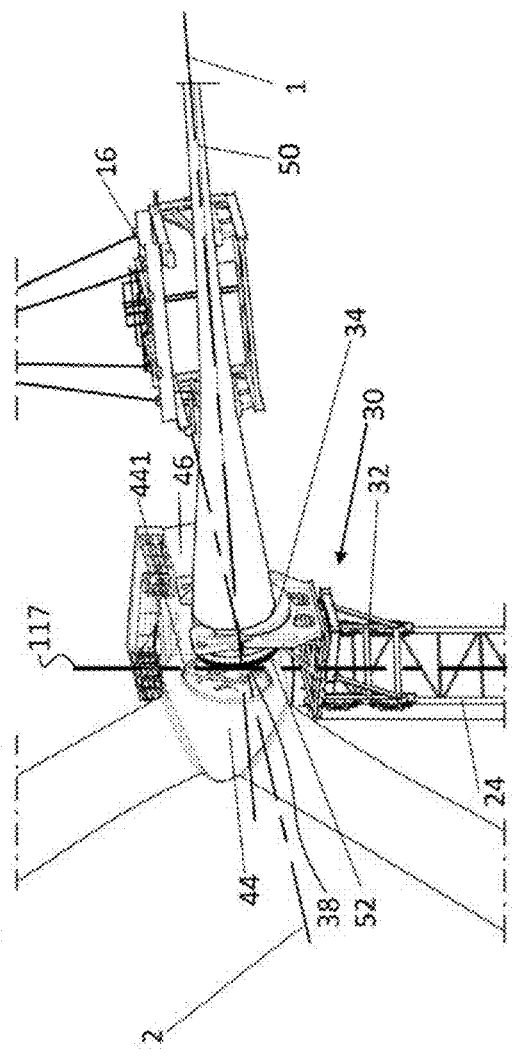

Turning to FIGS. 6A-6B, further relative movements are shown. In FIG. 6, the blade 50 is rotated upwards with respect to the Y-axis 2. The Y-axis 2 is defined by being orthogonal to the longitudinal direction 1 of the blade 50 and by being in the horizontal plane. FIG. 6A shows this rotation with respect to the situation in FIG. 3A at the lower end of the guide path. FIG. 6B shows this rotation with respect to the situation in FIG. 3B at the upper end of a guide path. It can easily be understood that this rotation is also possible at any intermediate position between the engagement position 242 and the installation position 241.

Turning to FIGS. 7A-7B, similar situations to FIG. 3 are shown. In FIG. 7, the blade is rotated downwards about to the Y-axis 2. The Y-axis 2 is defined by being orthogonal to the longitudinal direction 1 of the blade 50 and by being in the horizontal plane. FIG. 7A shows this rotation with respect to the situation in FIG. 3A at the lower end of the guide path. FIG. 7B shows this rotation with respect to the situation in FIG. 3B at the upper end of a guide path. It can easily be understood that this rotation is also possible at any intermediate position between the engagement position 242 and the installation position 241.

The rotation of the blade around the Y-axis 2 is allowed by the pivotable connection of the root end support 34 via hinges 118 to the upstanding carriage frame 114 and to the movable root end support base 32.

In one embodiment, the rotation of the blade around the Z-axis 117 by the pivotal connection 115 of the upstanding carriage frame 114 to carriage base frame 112 and to the movable root end support base 32. In one embodiment, at the installation position 241 of the root end moving assembly, the pivot point 38 around which the root end support pivots, lies in the plane of the root end connector 441 of the hub 44 and coincides with the longitudinal axis 1 of the blade 50.

In one embodiment, the rotation about the Y-axis 2 and the vertical Z-axis 117 is free and unhindered. In another embodiment, the rotation about the Y-axis 2 and the vertical Z-axis may be braked by brakes and/or dampened by dampeners and/or springs. This freedom in rotation may be used to compensate for a potential mismatch in displacement of the connection of the lifting device to the blade with respect to the root end moving assembly.

In one embodiment, the rotation about the Y-axis 2 and the vertical Z-axis 117 is realised by the movement of the blade 50 by the lifting device 14 with respect to the root end moving assembly 30. This can be achieved by moving the connection of the lifting device to the blade up and down to rotate the blade over the Y-axis 2. To achieve the rotation about the vertical Z-axis 117, the connection of the lifting device to the blade may be moved in a direction parallel to the Y-axis 2.

In one embodiment, this rotation around the Y-axis and the Z-axis may be used to align the root end 52 of the blade 50 with the root end connector 441 of the hub 44 during the aligning and connecting of the blade to the hub when the root end moving assembly 30 is in the installation position 241.

Engaging the Root End

Figure 8A:
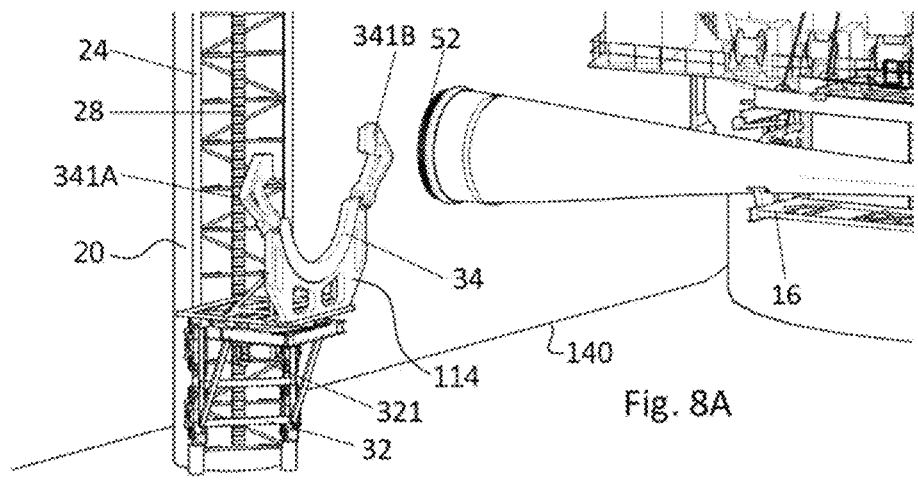
FIGS. 8A-8C depict a blade engaging a root end support.
Figure 8B:
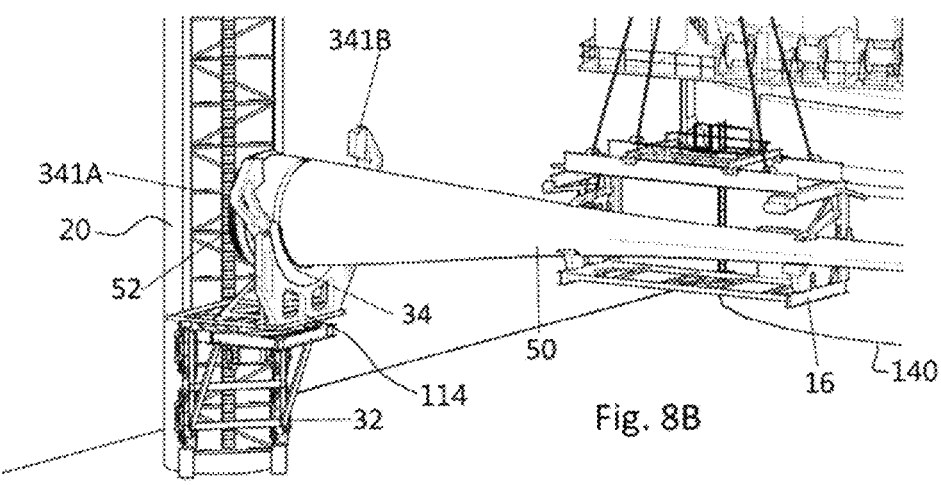
Figure 8C:
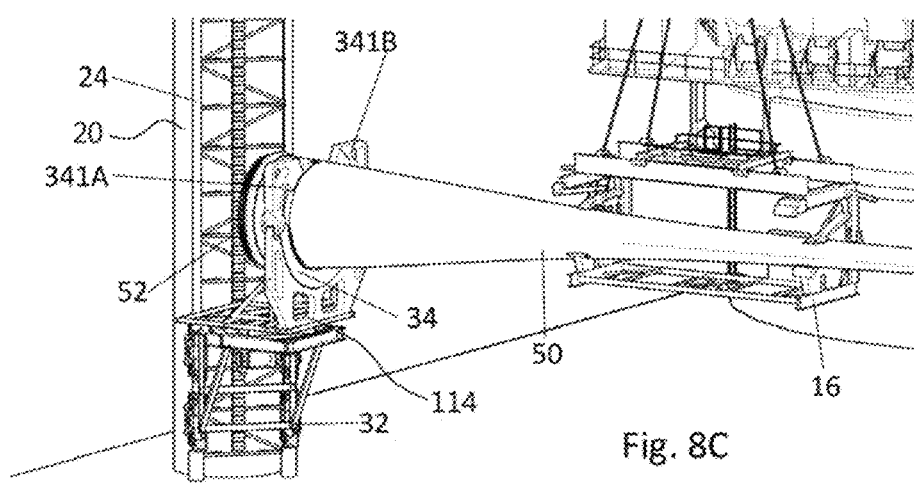

Turning to FIGS. 8A-8C, the process of engaging the root end 52 of the blade 50 by the root end support 34 is depicted at the engagement position. In FIG. 8A, the projections (also called clamping members) 341A, 341B are in the open position ready to receive the root end 52 of the blade 50. Moving to FIG. 8B, the root end 52 of the blade has been positioned on (or in) the root end support 34 and is still supported by the lifting device 14 through the lifting frame 16. Moving to FIG. 8C, the projections 341A, 341B have been closed and grip the root end 52 of the blade 50.

Final Installation of Root End

Figure 9A:
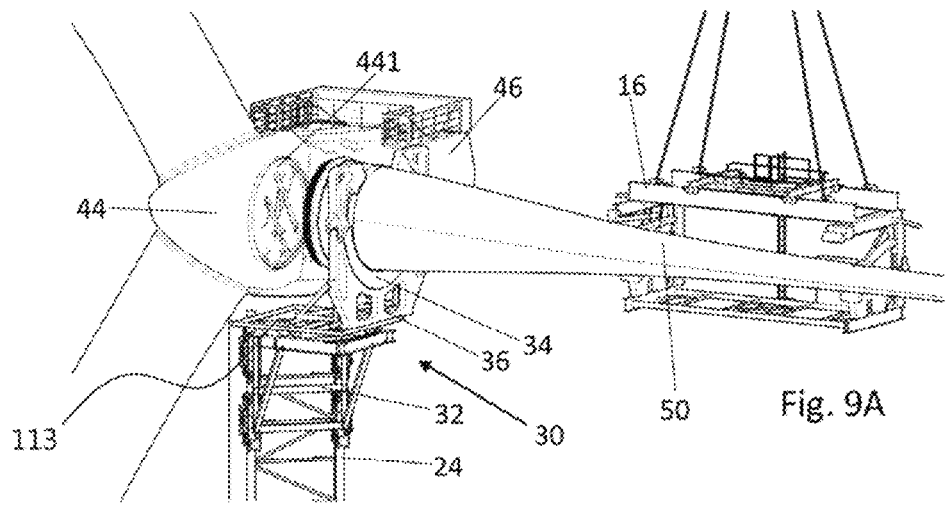
FIGS. 9A-9C depicts a root end supported by a blade loader at the installation position. The blade is shown in an extreme position furthest away from the nacelle, in a central position, and in an extreme position closest to the nacelle.
Figure 9B:
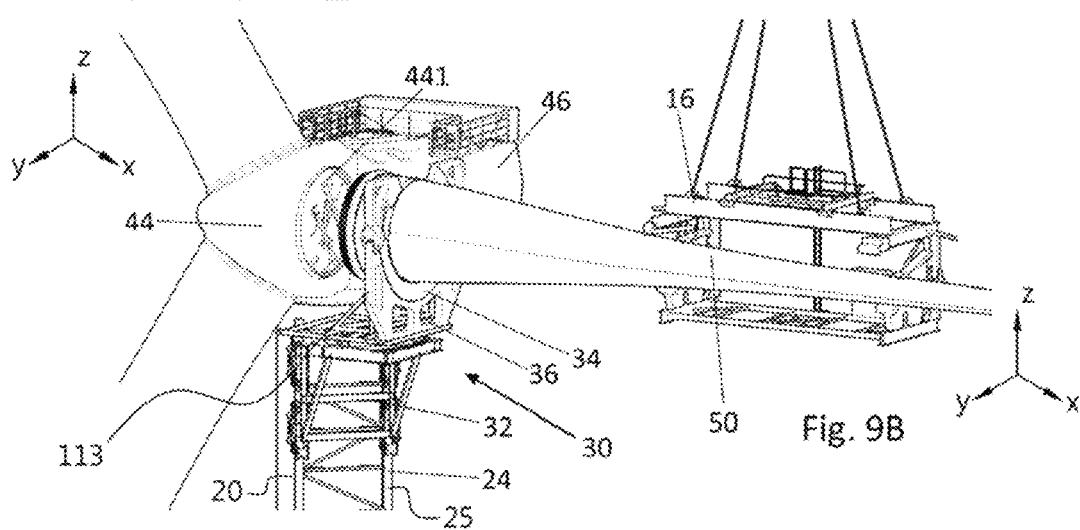
Figure 9C:
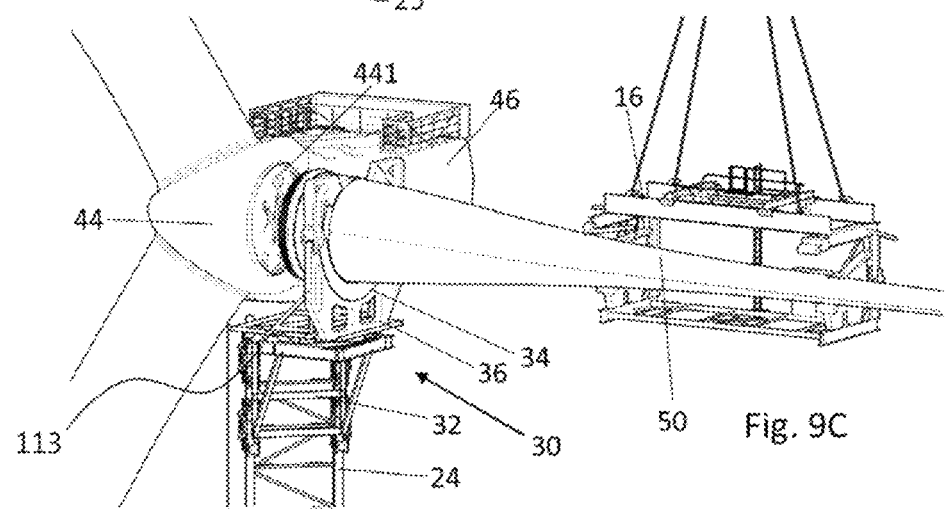

Turning to FIGS. 9A-9C, the root end moving assembly 30 is depicted at the installation position 241. In this embodiment, the root end support 34 is moveably connected to the movable root end support base 32. In FIG. 9A, an actuator 113 has moved the root end support 34 towards the nacelle 46 along the Y-direction. FIG. 9B depicts the middle position of the root end support. FIG. 9C shows the situation where the actuator 113 has moved the root end support away from the nacelle along the Y-direction. The movement of the root end support 34 with respect to the movable root end support base 32 may be used to align the root end 52 of the blade 50 with the root end connector 441 of the hub 44 along the Y-direction.

Figure 10A:
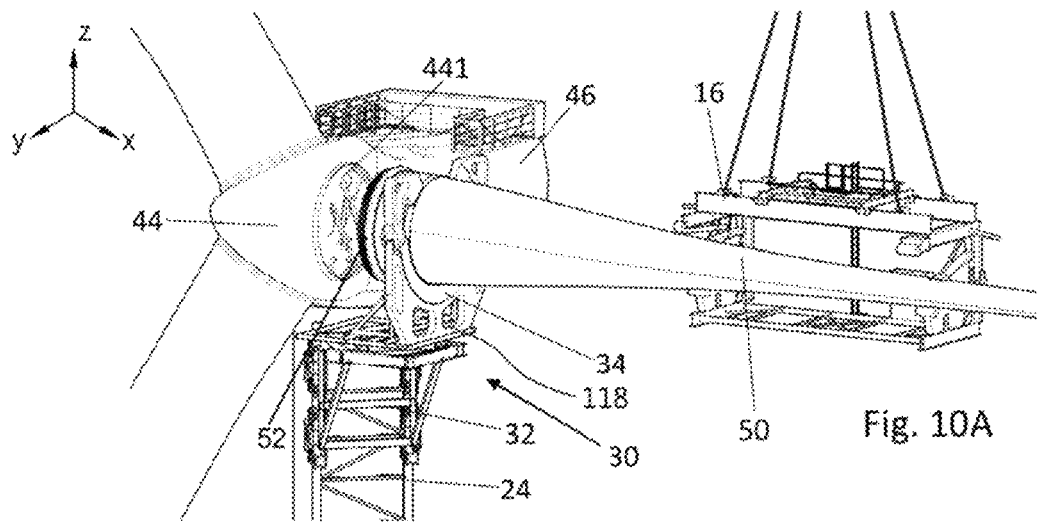
FIGS. 10A-10C depicts a root end supported by a blade loader at the installation position. The blade is shown at various positions along the X-direction along the longitudinal direction of the blade, during the installation process.
Figure 10B:
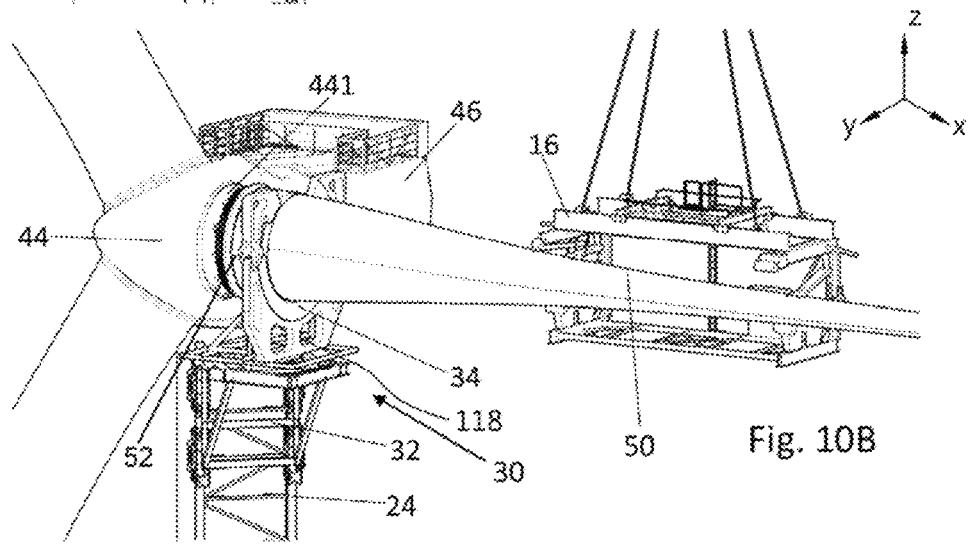
Figure 10C:
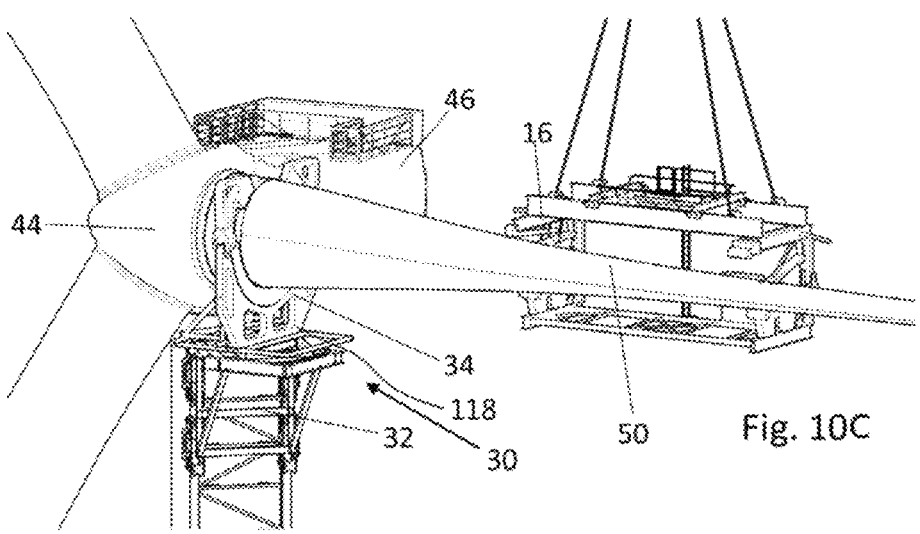

Turning to FIGS. 10A-10C, the root end moving assembly 30 is depicted at the installation position 241. In FIG. 10A, the root end support 34 is located furthest away from the hub 44 of the nacelle 46 as possible. FIG. 10B shows the root end support having been moved away from the position in FIG. 10A towards the hub of the nacelle. FIG. 10C shows the root end support 34 being moved towards the hub of the nacelle even further. In the position of FIG. 10C, the root end of the blade and the root end connector have been aligned and may be connected.

Figure 11A:
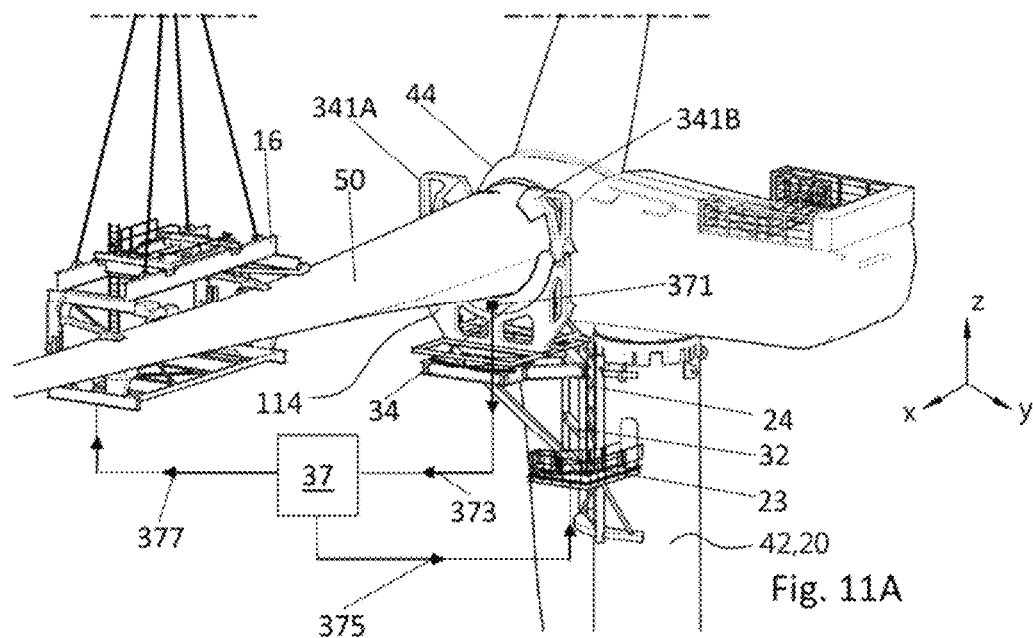
FIGS. 11A, 11B depict a further embodiment of the invention.

Turning to FIG. 11A the embodiment is shown with the guide path 24 extending along an upper portion of the mast 42 of the wind turbine but this may also be an upper portion of the auxiliary support tower 20. The root end moving assembly 30 is shown together with a personnel support platform 23. In FIG. 11A, the root end moving assembly 30 is shown at the installation position 241. In this representation, the root end 52 has been aligned and connected to the root end connector 441 of the hub 44. At a lower elevation than the installation position 241, a personnel support platform 23 is shown. This personnel support platform 23, providing access to the root end moving assembly, is used by people to assist the blade positioning system and it is used for maintenance purposes.

One or more sensors 371 are provided on the root end support 34. The sensor is 371 registered the X, Y and Z position and the angle about the Y-axis and the Z axis of the root end support 34. A control unit 37 receives the data from the one or more sensors 371 via control line 373. The control unit sends control data to the lifting device 14 via control line 377 and sends control data to the actuators on the root end moving assembly 30 via control line 375.

Figure 11B:
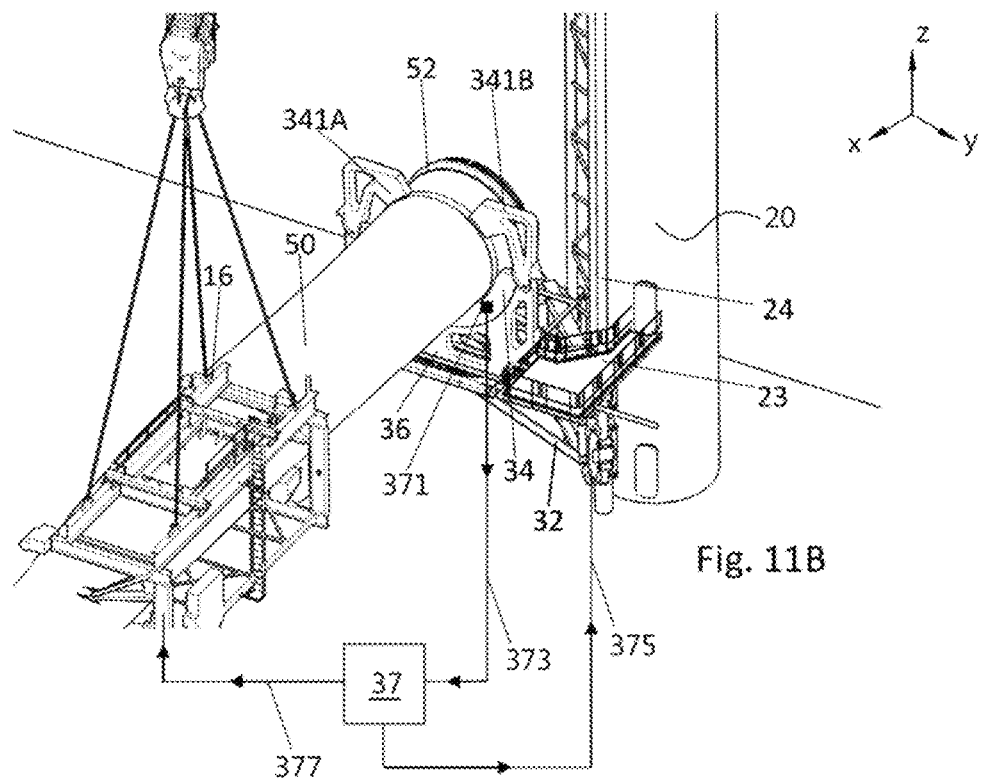

FIG. 11B shows the embodiment with the auxiliary support tower 20. The root end moving assembly 30 is shown positioned at the lower end of the guide path 24. The blade 50 has been engaged by the root end support 34. A personnel support platform 23 provides access to the root end moving assembly and is used to assist the blade positioning system and for maintenance purposes.

Figure 12A:
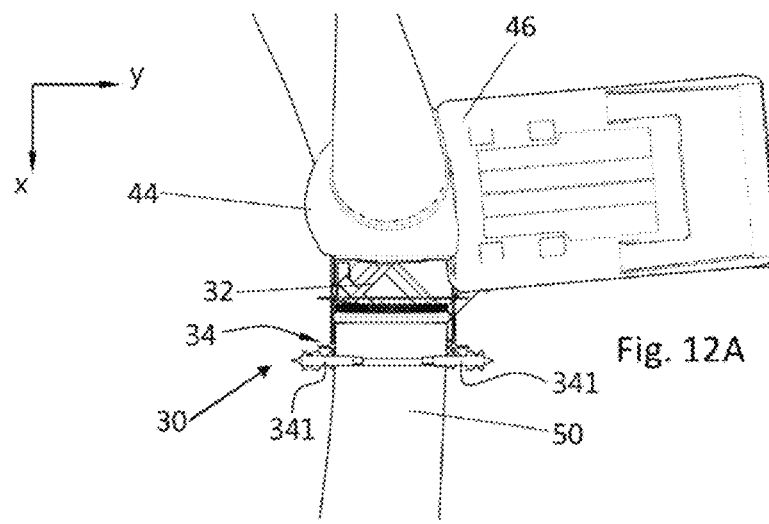
FIGS. 12A, 12B, 12C depict three top views of the nacelle, root end support, and blade.
Figure 12B:
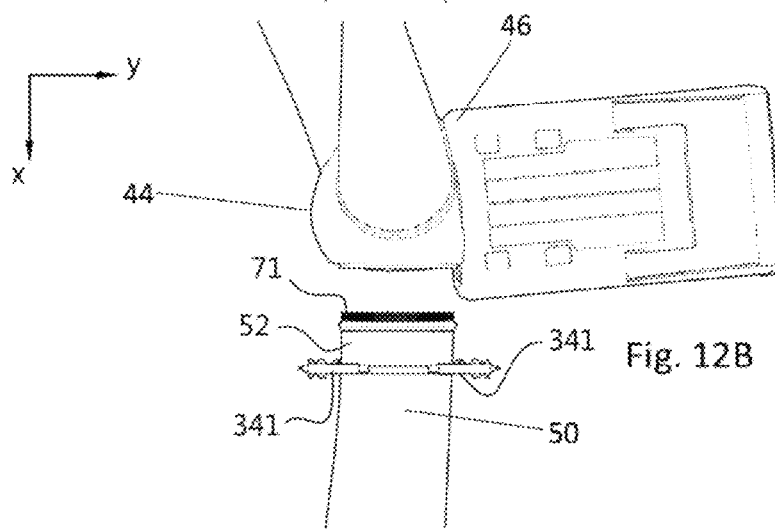
Figure 12C:
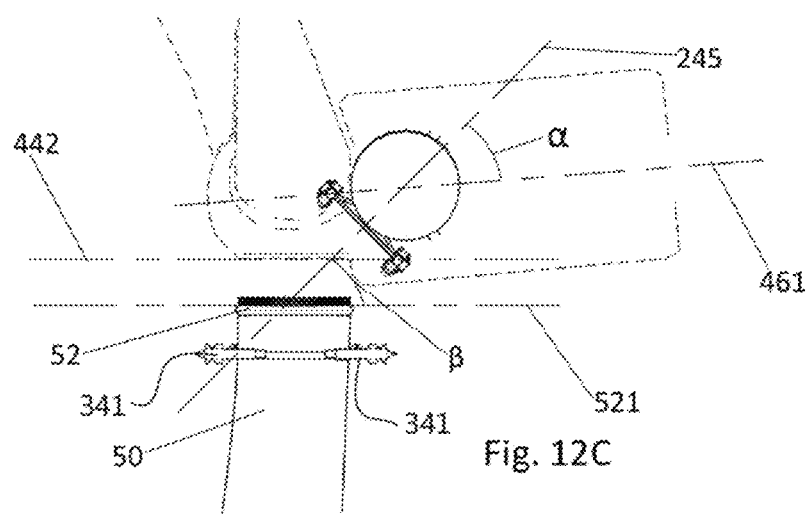

Turning to FIGS. 12A-12C, a top view of the nacelle 46, the hub 44, the blade 50, and the root end moving assembly 30 is shown in three different ways. In FIG. 12A, a top view is shown of the movable root end support base 32 and the root end support 34, which are left out in FIGS. 12B and 12C. FIGS. 12A-12C show the threaded ends 71 at the root end 52.

In FIG. 12C, various axes and planes are depicted; the longitudinal axis 461 of the nacelle, the centre axis 245 of the guide path, the plane of the root end 52 of the blade 50, the plane 442 of the root end connector 441 of the hub 44.

In FIG. 13A, a different embodiment is shown of the blade positioning system wherein the movable root end support base is not moveable along a guide path. In other words, the installation position 241 and the engagement position 242 coincide.

Second Embodiment—Installation Directly on the Mast

FIGS. 13A and 13B show a mast 42 of a wind turbine instead of an auxiliary support tower 20 and relates to a further embodiment of the method in which the connecting of the blades 50 to the hub 44 takes place when the nacelle including the hub are already placed on the mast 42.

FIG. 13A shows an embodiment wherein the movable root end support base is not able to move along any guide path. FIG. 13B shows an embodiment comprising a guide path 24 that does not extend along the full length of the tower.

Most of the features of the first embodiment also apply to the second embodiment, at least to the variant of FIG. 13B. The relative movements between the installation vessel 14B and the mast 42 may result in a more challenging procedure, possible with a smaller weather window. However, the first embodiment requires a transfer of the completed RNA with the blades which can be quite challenging. The second embodiment does not have this transfer because the blades are installed on the nacelle/hub which is already on the final mast 42.

For the second embodiment as disclosed in FIG. 13B, the guide path 24 comprising the rail 25 may also extend over the full height of the mast 42 or only over an upper portion. The root end moving assembly can be as described with reference to FIG. 3C-3T.

Third Embodiment—Auxiliary Support Structure

In FIGS. 14A-14C, an embodiment of the invention is shown wherein the installation vessel is a jack-up rig with jack-up legs 15 (as shown in FIG. 1C) and comprises an auxiliary support structure 70. The auxiliary support structure 70 has some common features with the auxiliary re-support tower 20, but it is not fixed to the vessel. Instead, the auxiliary support structure 70 is moveable relative to the vessel. This mobility creates a degree of freedom which is used for the installation of the blades 50.

The auxiliary support structure 70 comprises an elongated member 76A which can pivot about a rotation axis 78A via a hinge 79A and a positioning assembly 72 that is connected to the deck of the installation vessel at one extremity. The positioning assembly 72 comprises one or more actuators constructed to move the elongated member 76A. The root end moving assembly 30 is located at the upper extremity of the elongated member 76A. The auxiliary support structure 70 comprises a mast stop 74 which is configured to connect an upper end of the auxiliary support structure to the mast 42 by engaging the mast and/or gripping the mast. The auxiliary support structure 70 comprises the root end moving assembly 30 which is positioned at the upper end of the auxiliary support structure 70.

In FIG. 14A, the auxiliary support structure 70 is shown with the root end moving assembly 30 in the engagement position 242. The nacelle 46 with a hub 44 has been placed on the turbine mast 42. Two blades 50 have already been connected to the hub. The hub 44 has been oriented for a root end connector to be available to engage the root end of a blade 50.

In FIG. 14A, a blade 50 is supported by a lifting frame 16 connected to a lifting device 14 via one or more cables. The root end 52 of the blade is supported by the root end moving assembly 30. The blade 50 has been connected to the root end moving assembly 30 in the engagement position 242.

From a stored position on deck (not shown in this figure) the long blade 50 is lifted by the lifting device 14 which is connected close to, and more in particular at, the centre of gravity of the blade 50. The blade 50 is carefully lifted upwards and positioned above the root end moving assembly before engaging it in the root end moving assembly 30. This process may be quite challenging because wind may act on the movement of the blade and the blades are designed to catch wind. In FIGS. 21A-21E, the engagement of a blade 50 by the root end moving assembly 30 is further depicted in detail.

The majority of the vertical loads on the blade 50 are carried by the lifting device 14 through the lifting frame 16.

In FIG. 14B, the positioning assembly 72 has pivoted about an axis 78A via a hinge 79A located at the lower extremity that is connected to the deck and by actuators 75 that are also connected to the deck. In doing so, the root end moving assembly 30 has been positioned closer to the hub 44 that is connected to the nacelle 46, which is supported by the mast 42. In FIG. 14C, the positioning assembly 72 has been pivoted even further so that the mast stop 74 engages the mast 42.

Figure 15A:
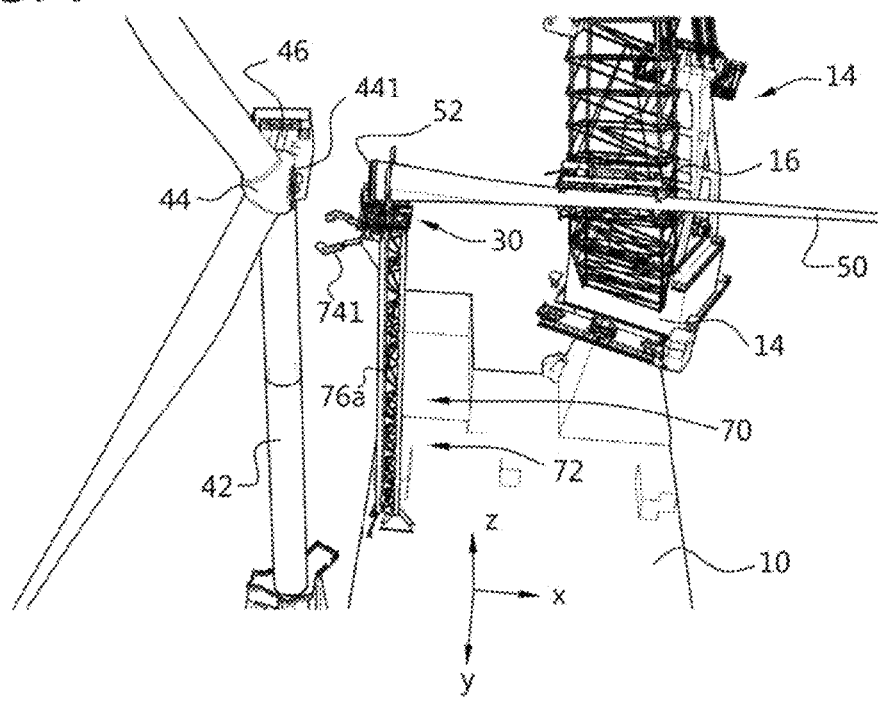
Figure 15B:
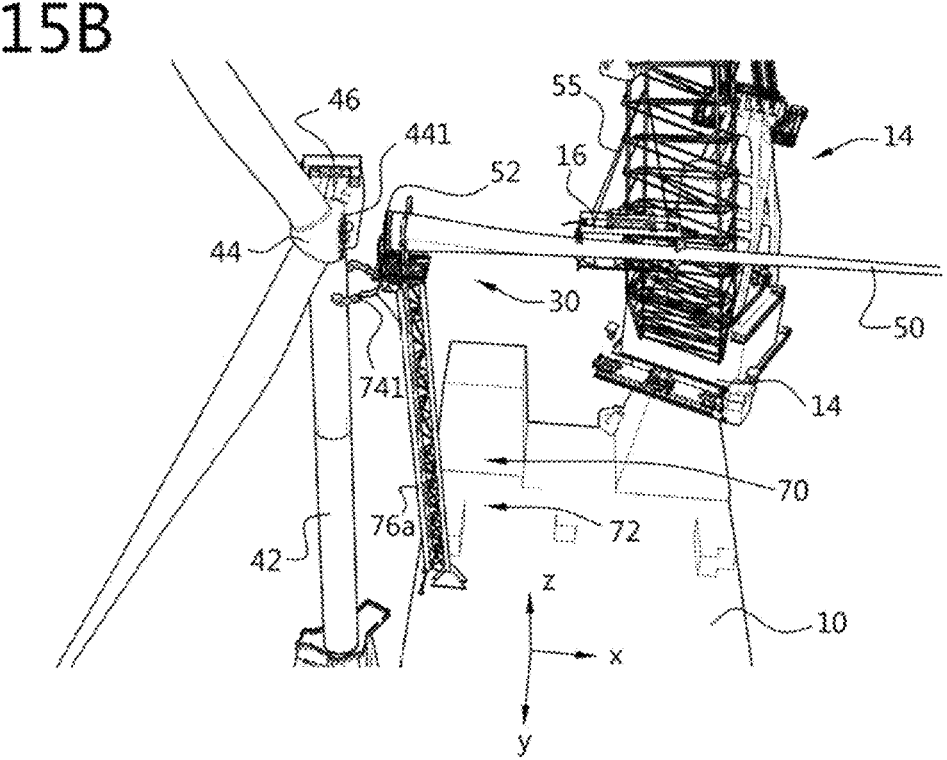

Turning to FIGS. 15A-15B, the positioning assembly 72 is shown with the mast stop 74. The mast stop comprises a mast gripper 741 comprising two projections that may act as a jaw. These projections are used to grip the mast in order to reduce or take away the relative motion between the root end moving assembly 30 and the top of the mast where the nacelle 46 is located.

If the installation vessel is a jack-up rig, there will be very little relative motions between the jack-up rig and the upper end of the mast 42. If the installation vessel is a semi sub, there will be limited motions between the semi sub and the upper end of the mast 42. If the installation vessel is a regular ship-shaped vessel, the relative motions will be greater.

In one embodiment, the mast stop 74 will slide vertically along the mast 42 during the installation. The root end moving assembly 30 will then counter this movement with the Z-actuator 320. The mast grippers 741 will grip the mast in order to prevent movements in the radial direction, but will allow movements of the mast stop 74 and the root end moving assembly 30 in the Z-direction and in the circumferential direction, i.e a rotation about the longitudinal axis of the mast 42 itself.

FIG. 15A depicts the engagement position of the root end moving assembly 30 and FIG. 15B shows the positioning assembly 72 being rotated towards the mast 42.

FIG. 15C shows the configuration in more detail. If there are relative motions between the vessel and the mast, the mast stop 74 with the mast grippers 741 will take away the horizontal relative motions between an upper end 350 of the elongated member 76*a* and the mast 42. However, vertical relative motions between the upper end 350 of the elongated member 76*a* and the mast 42 will remain. Also, in an embodiment circumferential movements may remain, i.e. a rotation of the mast stop 74 about the mast 42.

Horizontal motions between the installation vessel and the mast 42 will be converted into vertical relative motions between the upper end 350 and the mast due to the mast stop. If the angle of the elongated member 76*a* is relatively steep, greater than 70 degrees to the horizontal and more in particular greater than 80 degrees, then horizontal motions between the installation vessel and the mast 42 will result in only small vertical motions between the upper end 350 and the mast 42.

Actuators 361A, 361B and 361C are provided between the upper end 350 of the elongated member 76*a* and the root end support base 32 which comprises a base frame 100 which forms a platform 104. Three actuators 361 may be used. The actuators may be cylinders. In an alternative embodiment, six actuators can be used. The actuators 361 are configured to move the root end support base 32 and the platform 104 which it forms relative to the upper end 350. In other words the actuators may control three degrees of freedom of the root end support base 32 including the platform 104: 1) Z-position 2) rotation about X-axis and 3) rotation about Y-axis. In an embodiment, the actuators maintain the root end support base 32 in the target Z-position and maintain the root end support base 32 in a horizontal orientation. The platform 104 will then remain at the target elevation and remain horizontal, but may move in the X-direction and Y-direction as a result of a rotation of the mast stop 74 about the mast 42 which may occur as a result of movements of the installation vessel.

This embodiment may also be used for an inclined installation of the blade 50. In such an embodiment the target orientation of the root end support base 32 will not be horizontal but for instance at an angle of 30 degrees to the horizontal or a different angle.

Actuators 113, 119 are provided on the root end moving assembly 30 to move the root end support 34 relative to the root end support 32 in the X-direction 107 and Y-direction 173 in order to align the root end 52 with the root end connector 441. These actuators 113, 119 may be similar to the actuators described in connection with FIGS. 3C-3T. For this embodiment the other details of the construction of the root end support 34 may also be similar to the embodiment of the root end support 34 as described in connection with FIGS. 3C-3T. A Z-hinge 115 may be provided to allow a rotation 109 of the root end support 34 relative to the root end support base 32 about the Z-axis 117. A Y-hinge 118 may be provided to allow a rotation 111 of the root end support 34 relative to the root end support base 32 about the Y-axis. The lifting device can then be used to orient the blade including the root end in the target orientation about the Z-axis and Y-axis.

It is noted that in another embodiment, five or six actuators 361, in particular cylinders, can be provided between the platform 104 and the upper end 350 of the elongated member. These five or six actuators will then create five or six degrees of freedom of the root end support 34 relative to the root end support base 32. In such an embodiment, the actuators 113, 119 may be left out. Other configurations of actuators are also possible.

Figure 16A:
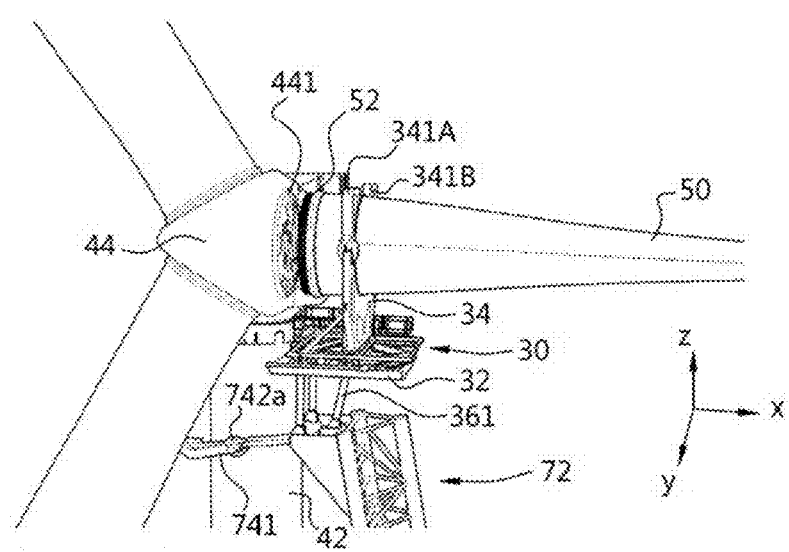
FIGS. 16A-C depict an embodiment wherein the mast stop engages the mast.
Figure 16B:
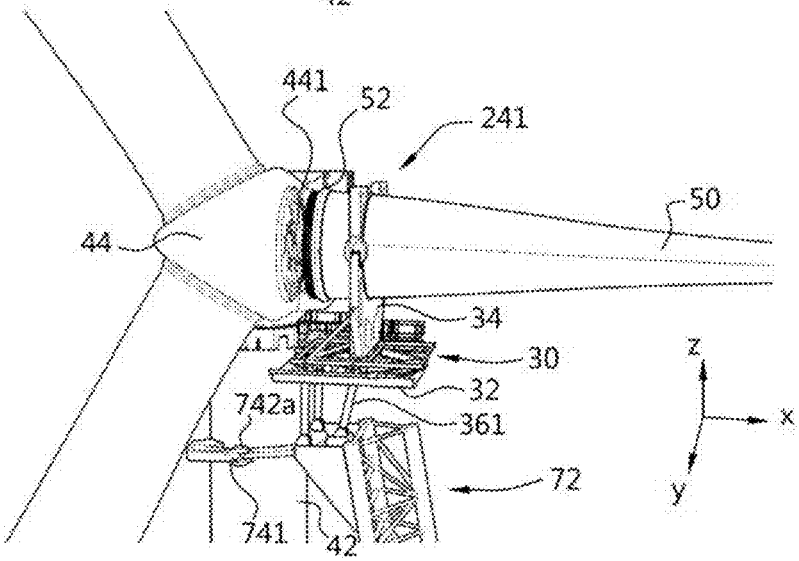
Figure 16C:
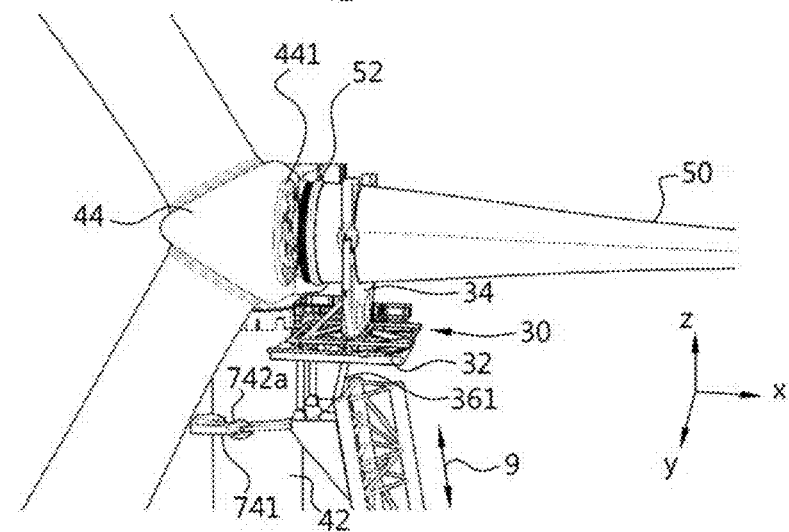

Turning to FIGS. 16A-16C, the process of gripping the mast is shown. In FIG. 16A, the mast stop 74 has engaged the mast 42 through the rotation of the elongated member 76A which is actuated by the positioning assembly 72. The blade 50 is supported by the root end support 34 which is connected to the movable root end support base 32. In FIG. 16B, the mast gripper 741 has closed as a result of the actuation of actuators 742*a*, 742*b* (742*b* is not shown in the figure) and grips the mast 42. In FIG. 16C, the mast gripper 741 grips the mast 42 and a degree of freedom in the vertical direction remains, but in the horizontal directions X and Y the mast stop and the upper end 350 are fixed relative to the mast 42.

The positioning assembly 72 creates one degree of freedom in direction 9 which allows the relative motion of the mast 42 with the root end moving assembly 30 with respect to the installation vessel 10C (the installation vessel is not shown in FIG. 16). In another embodiment, the positioning assembly may create multiple degrees of freedom in directions other than direction 9. An example of such a degree of freedom may be the rotation around a horizontal axis of the root end moving assembly with respect to the elongated members. Further details of possible degrees of freedom that are created by the positioning assembly are depicted in FIGS. 29A-C and 30A-C.

In FIGS. 17A-17D, another embodiment of the auxiliary support structure 70 is shown, wherein the positioning assembly 72 comprises the elongated member 76A extending upwardly from the deck of the installation vessel. On the upper extremity of the elongated member, the positioning assembly 72 comprises a lateral element 77 relative to which the movable root end support base 32 may move. The lateral element extends over a distance D7, in particular orthogonal to the elongated element 76*a*. The lateral element defines a guide path 24 and comprises a rail 25. Hence in this embodiment the guide path 24 is not vertical along the mast and may be essentially horizontal.

Figure 17A:
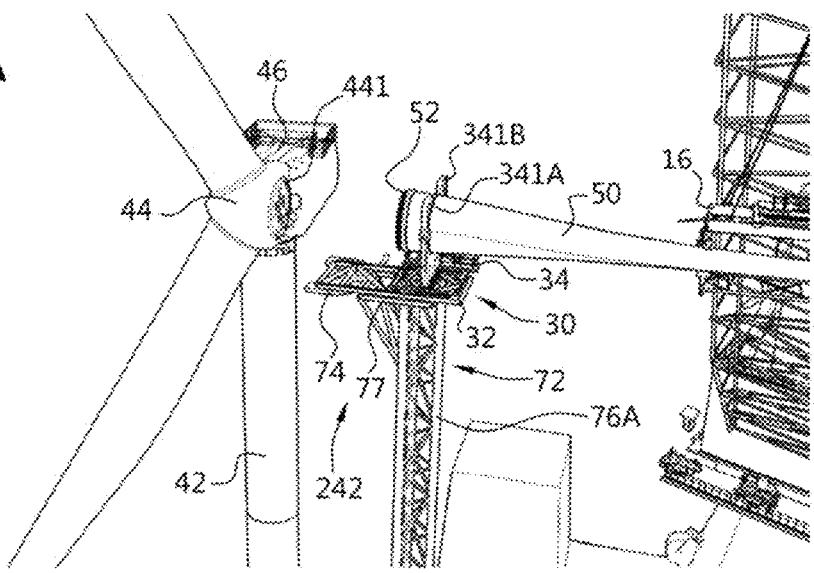
Figure 17B:
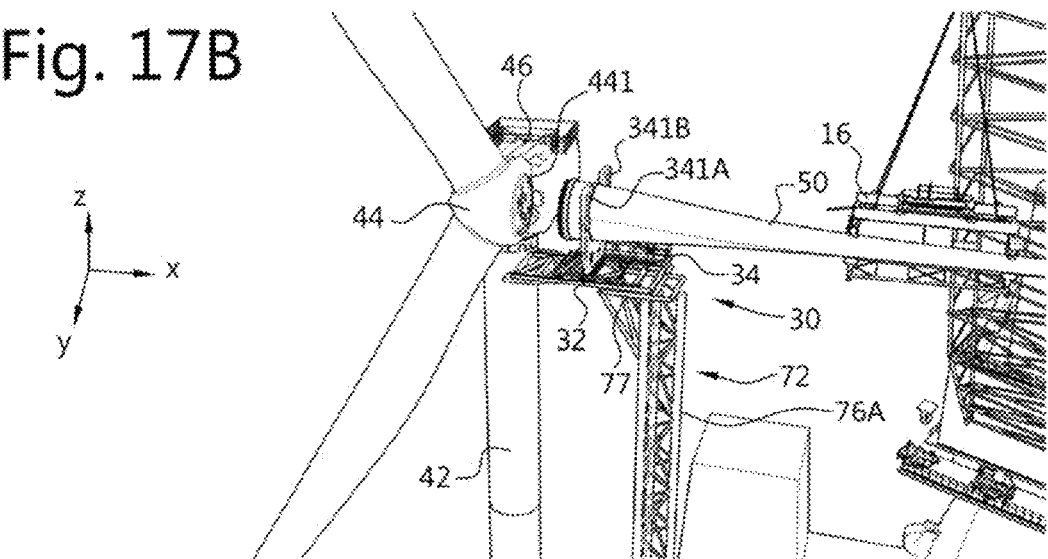
Figure 17C:
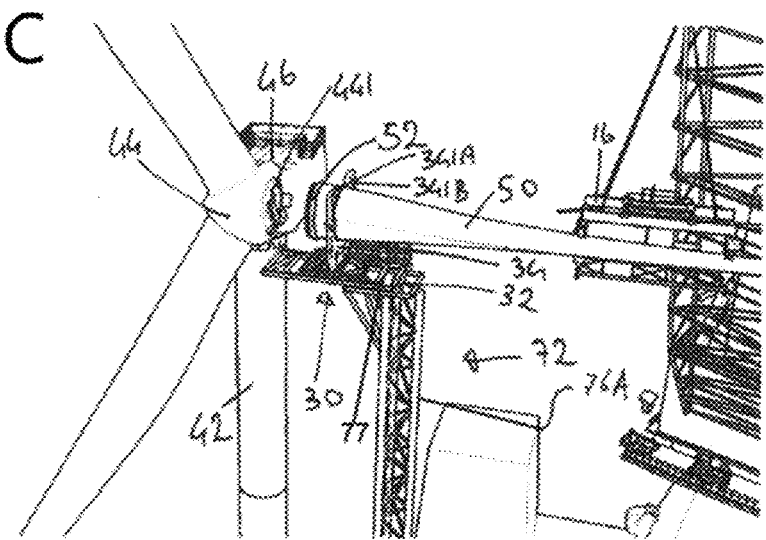

The lateral element 77 cantilevers outwardly over a horizontal distance from the elongated member 76A. A mast stop 74 is located under the moveable root end support base 32. In FIG. 17B, the moveable root end support base 32 has been laterally moved towards the mast 42 over the rails 108. In doing so, the mast stop 74 engages the mast. In FIG. 17C, the same situation is shown as in FIG. 17B, wherein there is no mast stop located under the moveable root end support base 32.

The lateral element 77 may be oriented substantially horizontally when the mast stop engages the mast, but may also be oriented inclined when the mast stop engages the mast 42.

The lateral element 77 defines the rails 25 which may extend in the X-direction, i.e. parallel to the intended longitudinal direction of the blade. The movable support base 32 travels over the rails 25. The root end support 34 connected to the movable support base and may comprise a carriage 110 which is similar to the carriage of FIGS. 3C and 3D. The carriage is capable of moving the root end 52 in the Y-direction and capable of accommodating a rotation of the root end about the Z-axis and about the Y-axis. In addition, the carriage may comprise Z-actuators for moving the root end 52 in the Z-direction for alignment.

Figure 18A:
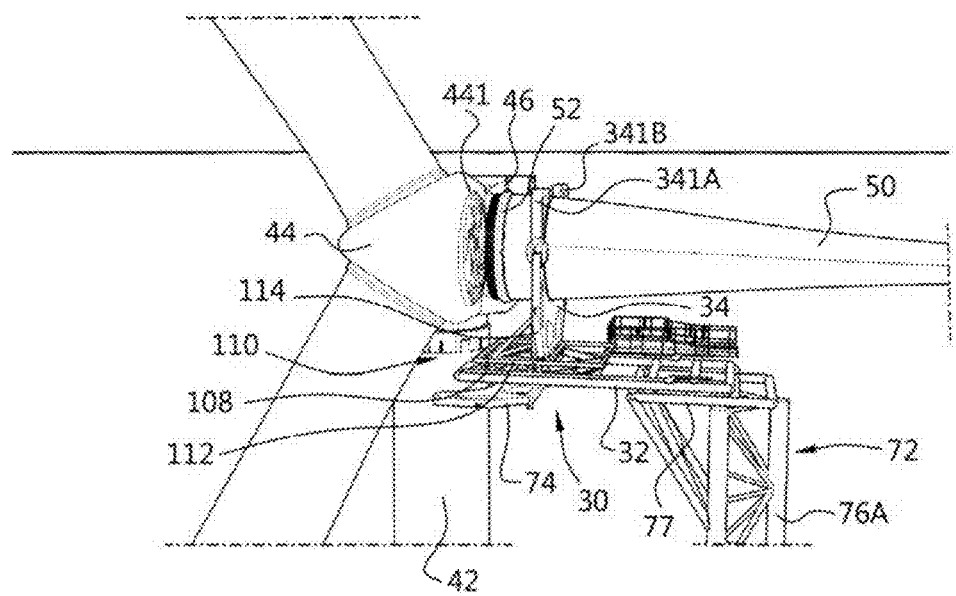
FIGS. 18A and 18B depict the top of the auxiliary support structure wherein the blade is in the installation position. The root end of the blade is moved to be connected to the hub.
Figure 18B:
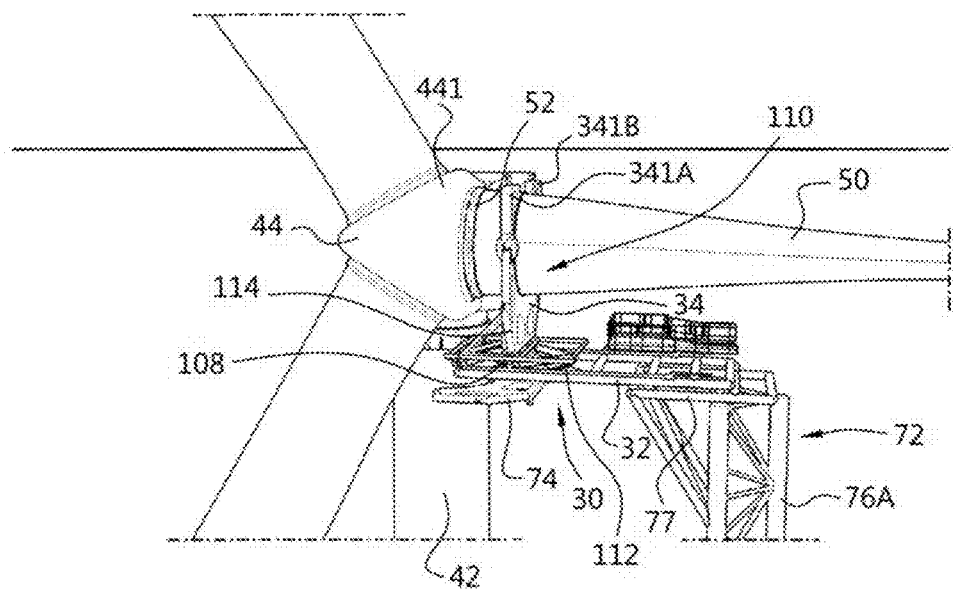

Turning to FIGS. 18A-18B, the embodiment shown in FIG. 17A-D is shown after the movement of the movable root end support base has caused the mast stop 74 to engage the mast 42. The root end 52 of the blade 50 is supported by the root end support 34 which is connected to the moveable root end support base 32. In FIG. 18B, the carriage base frame 112 has moved with respect to the movable root end support base 32 after the alignment of the root end 52 of the blade 52 with the root end connector 441 of the hub 44. In this position, the blade 50 can be fastened to the hub 44 of the nacelle 46.

By first engaging the mast stop 74 with the mast 42, the position of the root end moving assembly 30 is coupled to the position of the mast 42, and with that to the position of the hub 44. Because the top of the mast may move relative to the installation vessel, it is more effective to physically connect the root end moving assembly's movement to the mast rather than to try and control it with, for example, a feedback loop and actuators. Because the mast stop 74 couples the motion of the mast 42 to the motion of the root end moving assembly 30, the alignment of the root end 52 of the blade 50 can be achieved.

FIGS. 19A-19C depict the same movement as is shown in FIGS. 9A-C. Herein, seen in top view, the root end 52 of the blade is aligned in the Y-direction with the root end connector 441 of the hub 44.

Turning to FIGS. 20A-20C, the alignment of the root end 52 of the blade 50 with the root end connector 441 is shown in top view. In FIG. 20A, the blade 50 is shown in a position corresponding to the rotation direction about the vertical axis 117 depicted in FIG. 5. In FIG. 20B, the blade has been rotated over an angle β about the vertical axis 117 in a clockwise direction corresponding to the rotation in FIG. 5. In FIG. 20C, the root end 52 has been aligned with the root end connector 441 wherein the rotation corresponds to the rotation in FIG. 3. The rotation that is depicted is controlled by the operator of the lifting device by moving the blade 50 using the lifting device 14.

Figure 21A:
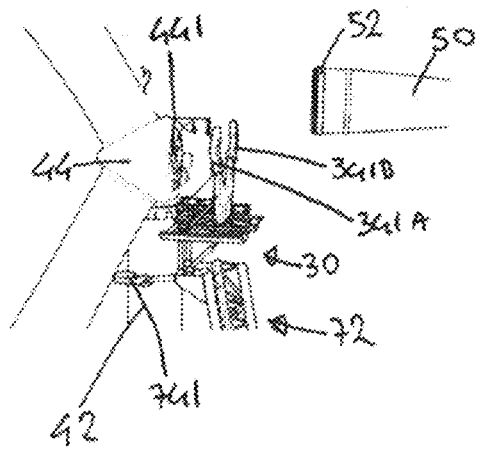
FIGS. 21A-21E depict an installation of a blade. The root end of the blade is shown between a remote position and a connected position.
Figure 21B:
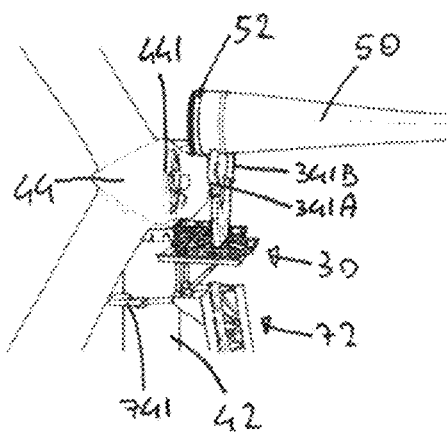

FIGS. 21A-21E shows the process of installing a blade 50 for the embodiment of FIG. 14. It will be understood that this process can also be applied to the embodiment of FIGS. 18A-18B and, for both embodiments, in the installation position 241 and the engagement position 242. In FIG. 21A, the mast gripper 741 has engaged the mast 42 and the projections 341A, 341B of the root end support 34 are in the open position ready to receive the root end 52 of the blade 50. The blade 50 is still relatively far away from the root end moving assembly 30. In FIG. 21B, the blade 50 has been positioned above the root end moving assembly 30 and is ready to be lowered to be engaged by the root end moving assembly 30.

Figure 21C:
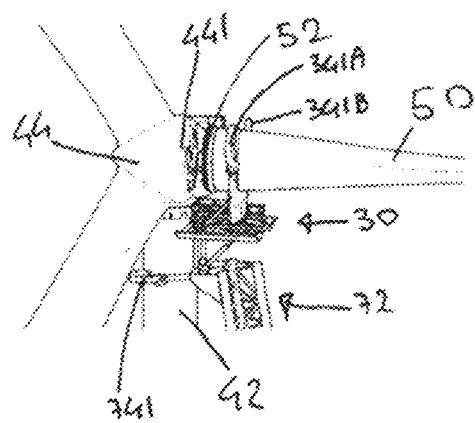
Figure 21D:
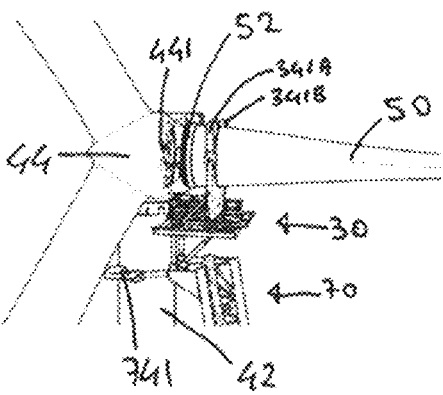
Figure 21E:
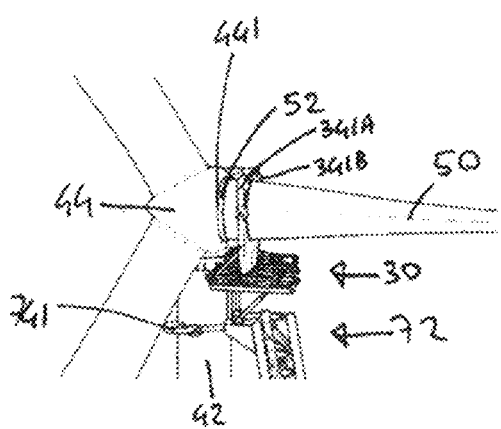

Moving to FIG. 21C, the root end 52 of the blade has been positioned on (or in) the root end support 34 and is still supported by the lifting device 14 through the lifting frame 16. Moving to FIG. 21D, the projections 341A, 341B have been closed and grip the root end 52 of the blade 50. In FIG. 21E, the root end moving assembly 30 has been used to align and to connect the root end 52 of the blade 50 to the hub 44.

In FIGS. 22A-22C, the root end moving assembly 30 is shown in top view. In FIG. 22A, the root end 52 of the blade 50 has been placed on the root end support 34, the root end support 34 being rotated away from the root end connector 441. This position increases the clearance 91 between the root end 52 of the blade 50 and the root end connector in order to increase workability and reduce the chances of damaging the wind turbine components. FIG. 22B depicts the blade 50 having been rotated from the position in FIG. 22A to the position in which the root end 52 of the blade 50 can be aligned with the root end connector 441. In FIG. 22C, the root end 52 of the blade 50 is connected to the root end connector 441.

Figure 23A:
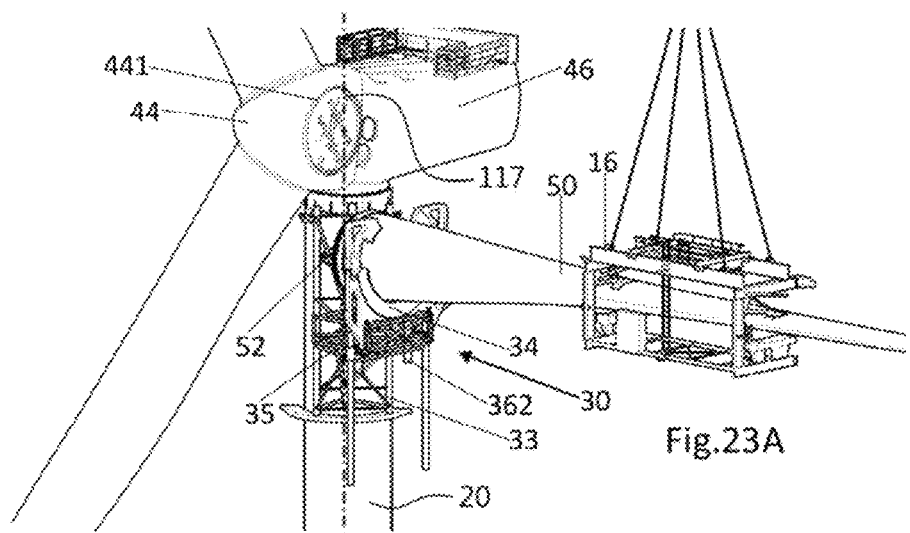
FIGS. 23A-23C depict a root end supported by a blade positioning system rotated around the vertical axis towards the nacelle, in a neutral position, and away from the nacelle.
Figure 23B:
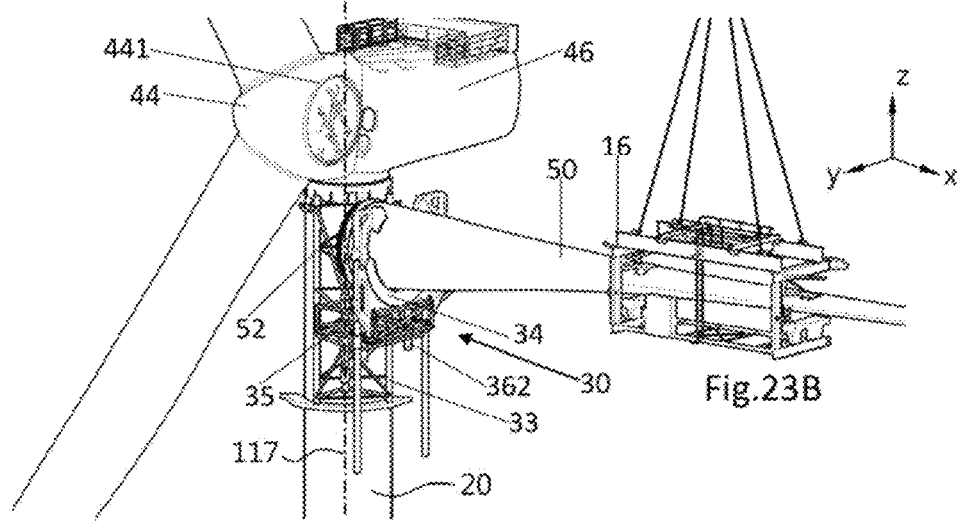
Figure 23C:
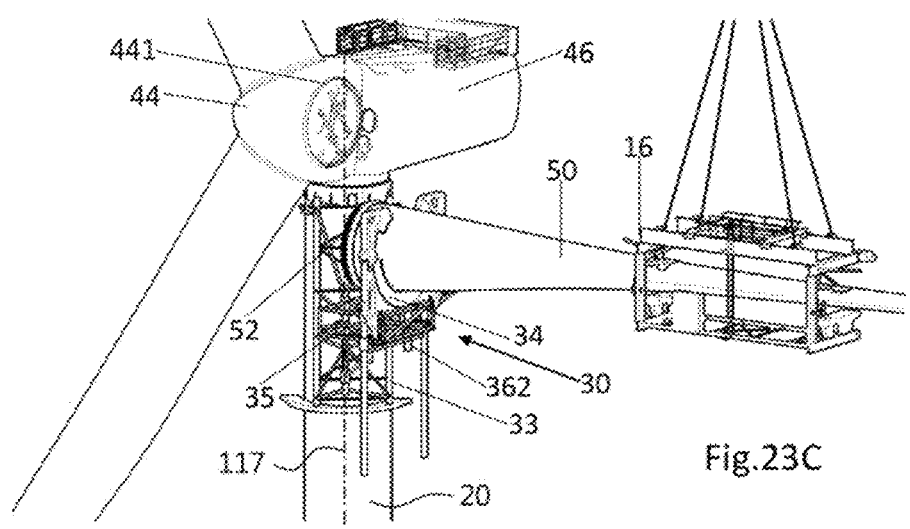

In FIGS. 23A-23C, a different embodiment is shown of the blade positioning system wherein the root end moving assembly 30 comprises a base frame 33. The base frame 33 has been lifted onto the mast or the auxiliary support tower 20 prior to the attachment of the installation of the blades 50 with the lifting device 14. The root end moving assembly 30 further comprises a movable root end support base 35 that is directly connected to the base frame. This connection allows the movable root end support base to rotate around the Z-axis 117, the Z-axis being offset over an offset distance from the root end support. The offset distance corresponds in particular substantially to the distance between the root end support and the root end connector of the hub, measured when the root end moving assembly supports the blade in the installation position. The control of this rotation is similar to that depicted in FIGS. 3-5. The root end moving assembly also comprises a root end support 34 that is connected to the movable root end support base 35. In order to be able to align the root end 52 of the blade 50 with the root end connector 441, the root end moving assembly 30 comprises an actuator 362 that is able to move the root end support 34 upwards in the Z-direction.

In FIG. 23A the root end support 34 is rotated about the Z-axis 117 away from the nacelle by the lateral movement of the lifting frame 16. In FIG. 23B, the root end support is in a neutral position. In FIG. 23C, the root end is rotated about the Z-axis towards the nacelle 46 by the lateral movement of the lifting frame 16.

Similar to FIGS. 6 and 7, rotation about the Y-axis may 117 be achieved by the freedom of rotation in the root end support.

Turning to FIGS. 24A-24C, the movement of the root end support 34 along a guide path 24' is depicted. In FIG. 24A, the root end support is at an engagement position 242. A set of guide rods 150 extends downward from the root end support 34 which are slideable through guides 152. The guides and rods define the guide path 24.

The engagement process of the blade and the root end support is similar to that depicted in FIG. 8. In FIG. 24B, the root end support has been moved along the guide path in the Z-direction through a joint operation of the actuator 362 of the root end moving assembly 30 and the lifting device 14. In FIG. 24C, the root end support has been moved even further along the guide path 24' in the Z-direction until the longitudinal axis of the blade is collinear with the centre axis of the root end connector 441 of the hub 44.

Turning to FIGS. 25A-25C, the movement of the root end support at the installation position is depicted. In FIG. 25A, the root end support has been positioned such that longitudinal axis of the blade is collinear with the centre axis of the root end connector 441 of the hub 44. In FIG. 25B, the root end of the blade has been moved along the X-axis towards the root end connector, wherein the X-axis is defined as the longitudinal axis of the blade. In FIG. 16C, the root end has been moved even further along the X-direction until the root end connector of the hub and the root end of the blade engage and can be connected. The movement along the X-direction can be achieved in several ways. An example of such a way is by the extension of an actuator that pushes the root end support 34 towards the root end connector 441. Another example is the use of a rack and pinion, wherein the movable root end support base 35 comprises a rack that can be engaged by a pinion driving the root end support 34 along the X-direction.

Figure 26A:
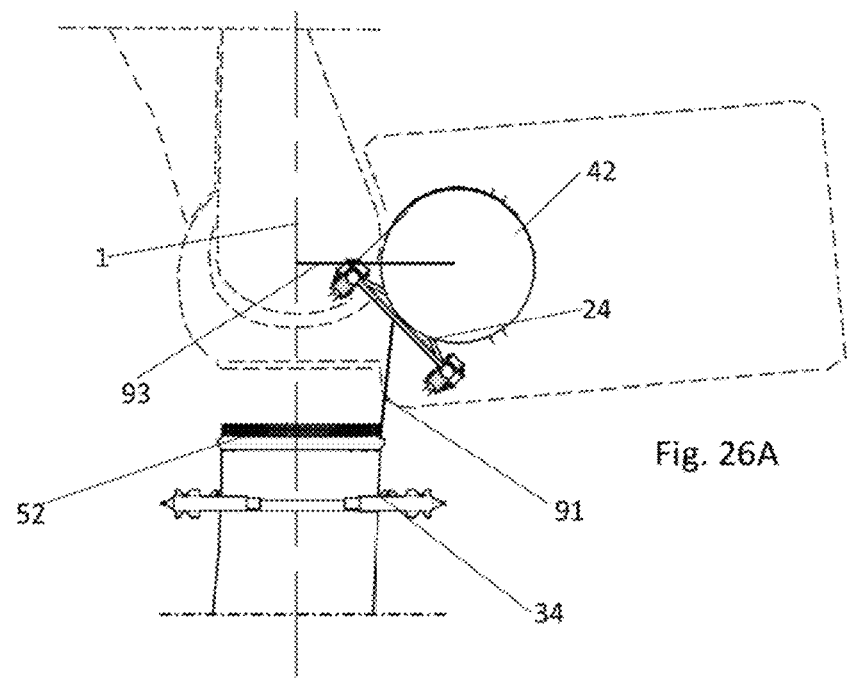
FIGS. 26A-26B depict two top views of the blade positioning system and shows the increased clearance when engaging the root end of the blade at the engagement position instead of the installation position.
Figure 26B:
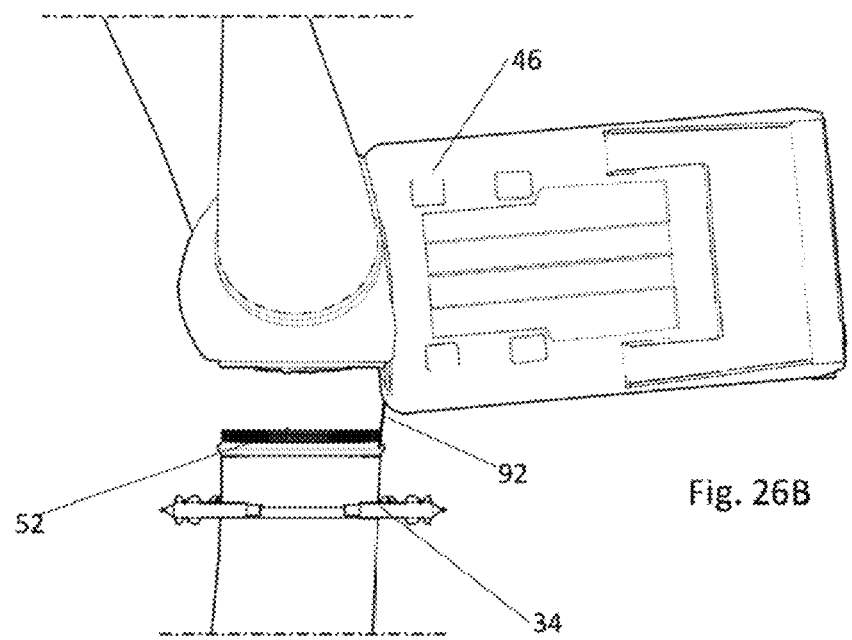

In FIGS. 26A and 26B, the top views of FIGS. 12B and 12C are shown depicting the increase in clearance when the root end of the blade would be engaged at a position lower than the installation position. For example, such an engagement may occur at 70% of the mast height of higher. In FIG. 26A, the root end 52 of a blade is shown while engaged in the engagement position. The distance (or clearance) 91 is the smallest distance along the longitudinal direction of the blade between the root end 52 of the blade and the closest object. In the engagement position, this object is the guide path 24 embodied by a rail. In FIG. 26B, a blade is shown while engaged in installation position. The distance (or clearance) 92 is the smallest distance along the longitudinal direction of the blade between the root end of the blade and the closest object. In the installation position, this object is the nacelle 46. It may be seen from FIGS. 26A-B that the smallest distance 91 is larger than the smallest distance 92; FIG. 26A thus shows a larger clearance, resulting in a smaller risk of collision during installation.

With respect to workability, the clearance of the root end of the blade is an important factor. By engaging the blade away from the installation position, the clearance increases. Additionally, the use of the engagement position is beneficial since a potential collision would only damage the blade and the guide path, instead of the blade and the nacelle when engaging the blade at the installation position.

Inclined Installation

In FIGS. 27A and 27B, two different embodiments are shown. FIG. 27A shows an embodiment of the invention at the top of an auxiliary support tower 20, and FIG. 27B shows the same embodiment at the top of a wind turbine mast 42 or alternatively to an auxiliary support tower 20 on an installation vessel. Both figures depict an embodiment wherein the moveable root end support 34 is connected under an angle γ to the horizontal to the guide path via the moveable root end support base 32. The blade 50 is oriented under the same angle γ. The opening 441 in the hub 44 is oriented at the same angle. The blade 50 can be engaged with the root end moving assembly 30 in the same angle, or be engaged in a different angle for instance horizontally, and subsequently rotated for instance by moving the root end moving assembly 30 upward along the track 25 and not raising the lifting frame 16 at the same time.

Two different coordinate systems may be used, a global coordinate system 160 and a local coordinate system 161. The guide path 24 extends in the Z-direction of the global coordinate system. The Z-actuators on the root end support move in the Z-direction of the local coordinate system.

By connecting the blade under an angle, the connecting point of the blade lifting arrangement is brought down. In particular, the lifting frame 16 does not need to be lifted as high as in previous embodiments. In doing so, the lifting device 14 used to lift the blade may be significantly smaller than a lifting device used for lifting the blade in a horizontal orientation.

Turning to FIGS. 28A, 28B, and 28C, the moveable root end support base 32 is shown in the installation position 241 at the top of an auxiliary support tower 20. In this embodiment, the root end support 34 is moveably connected to the movable root end support base 32. In FIG. 28A, the root end support 34 is located furthest away from the hub 44 of the nacelle 46 as possible. FIG. 28B shows the root end support having been moved away from the position in FIG. 28A towards the hub of the nacelle. FIG. 28C shows the root end support being moved towards the hub of the nacelle even further. In the position of FIG. 28C, the root end of the blade and the root end connector have been aligned and may be connected.

The root end moving assembly 30 may comprise the carriage 110 of FIGS. 3C and 3D. In particular, the connection between root end support 34 and the moveable root end support base 32 comprises at least an actuator configured to move root end support 34 in the X-direction: the longitudinal direction of the blade. Additionally, it may also comprise an actuator which is configured to move root end support 34 in the horizontal Y-direction that is orthogonal to the X-direction. Also, it may comprise an actuator which is configured to move root end support 34 in the Z-direction. The Z-direction will be the Z-direction of the global coordinate system because this movement is carried out by drive 320 which moves the root end moving assembly up and down along the guide path 24. The X- and Y direction will be those of the local coordinate system because of the inclination.

In the embodiment shown in FIGS. 27A-B and 28A-C, the plane spanned by the X and Y direction is oriented under an angle with respect to the vertical, wherein the angle under which this plane is oriented is normal to the face of the root end connector of the hub.

Figure 29A:
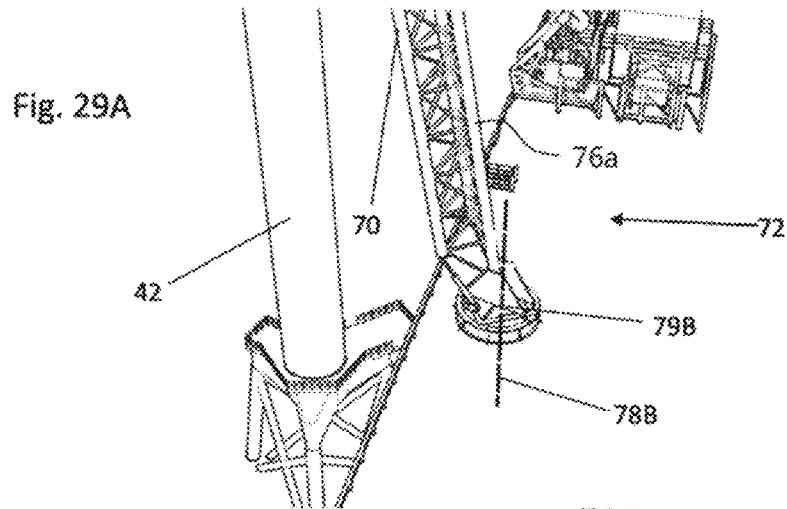
FIGS. 29A-29C and 30A-30D depict further assembly steps on the installation vessel.
Figure 29B:
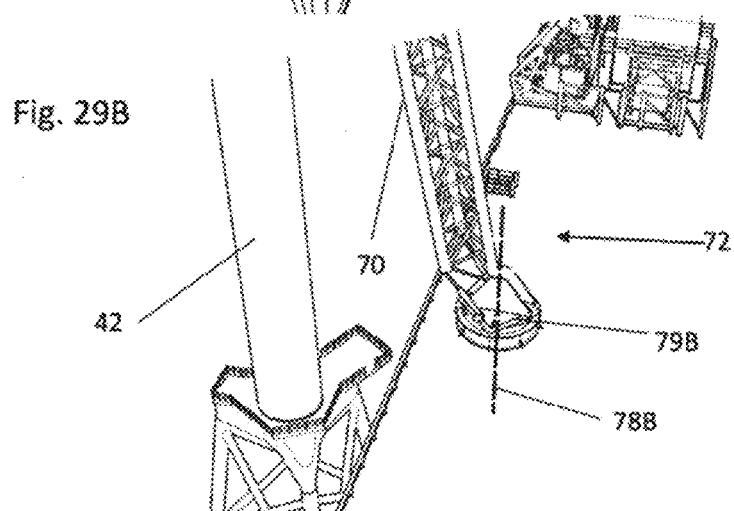
Figure 29C:
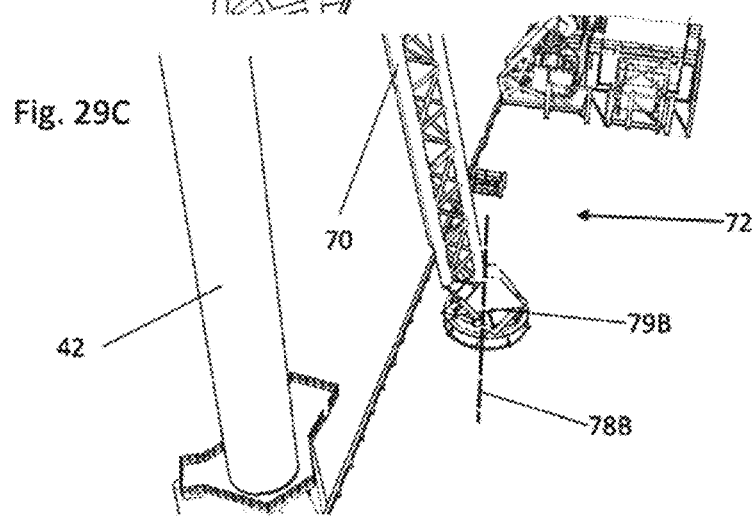

In FIGS. 29A-29C, the positioning assembly 70 of FIG. 15 is shown after the mast gripper 741 has engaged the mast 42 and may have gripped the mast. In the embodiment depicted in FIGS. 29A-29C, the installation vessel is a floating vessel that either makes use of a dynamical positioning system or of a mooring system in order to remain at substantially the same position.

However, because none of either systems can eliminate all the movements of the installation vessel, the movement of the mast gripper 741, the root end moving assembly 30, and the mast 42 may be able to be uncoupled from the movement of the installation vessel. In FIG. 29B, the installation vessel is in the position where the mast gripper has just engaged the mast 42. The elongated member 72 is connected to the installation vessel at least via a hinge 79B. This hinge 79B permits the rotation around a vertical axis 78B of the positioning assembly 70. The position of the installation vessel in this figure can be called the neutral position.

In FIG. 29A, while the vertical rotation axis 78B has not moved with respect to the mast 42, the installation vessel has rotated anti-clockwise around the axis 78B with respect to the neutral position. The positioning assembly 70 has also rotated around the axis 78B relative to the vessel via hinge 79B. In FIG. 29C, the vertical rotation axis 78B has still not moved with respect to the mast 42. The installation vessel has rotated clockwise around the vertical axis 78B relative to the neutral position. The positioning assembly 72 has rotated with respect to the installation vessel around the vertical axis 78B via hinge 79B. Because the positioning assembly 72 can create degrees of freedom by rotating with respect to the installation vessel, the movement of the mast gripper, the movement of the root end moving assembly and the mast can be uncoupled from the movement of the installation vessel.

Because the point of view in these figures is located on the installation vessel, it may seem that the mast 42 is moving relative to the installation vessel. However, this is not the case; the installation vessel moves with respect to the mast 42.

Figure 30A:
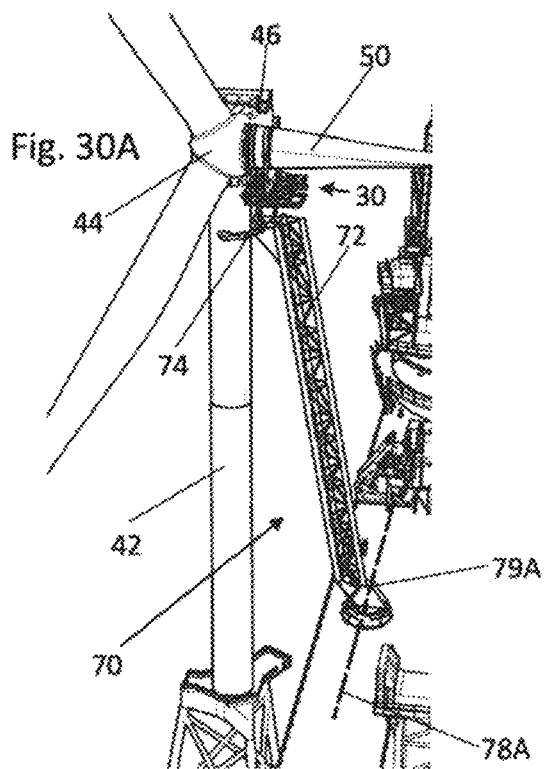
Figure 30B:
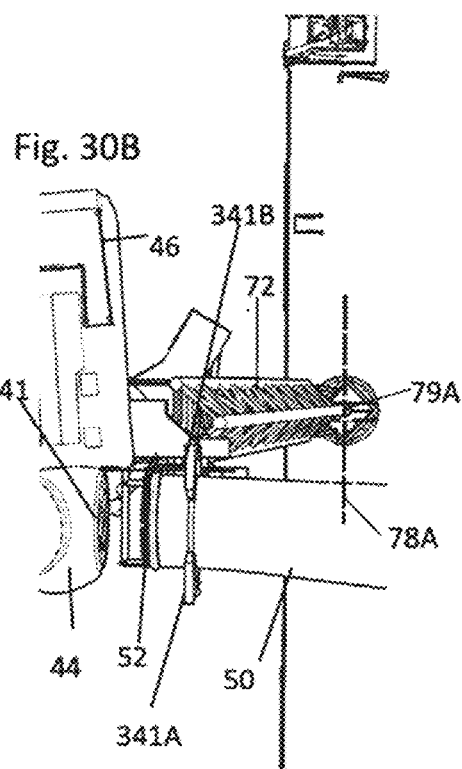

In FIGS. 30A-30D, the same positioning assembly 70 and installation vessel are shown as in FIG. 29. FIG. 30A depicts the situation wherein the mast stop 74 has just engaged the mast 42. Prior to the engagement of the mast 42 by the mast stop 74, the root end 52 of the blade 50 has been engaged with the root end moving assembly 30 in an engagement position and the elongated member has rotated about the horizontal axis 79A towards the installation position, bringing the root end 52 towards the root end connector 441. FIG. 30B shows the same situation but from a top view. Herein, the root end 52 of the blade 50 is gripped by the projections 341A, 341B of the root end support 34 of the root end moving assembly 30 and is ready to be aligned with the root end connector 441 of the hub 44 of the nacelle 46. The elongated member 72 of the positioning assembly 70 has rotated around the horizontal axis 78A via hinge 79A to allow the mast stop 74 to engage the mast 42.

Figure 30C:
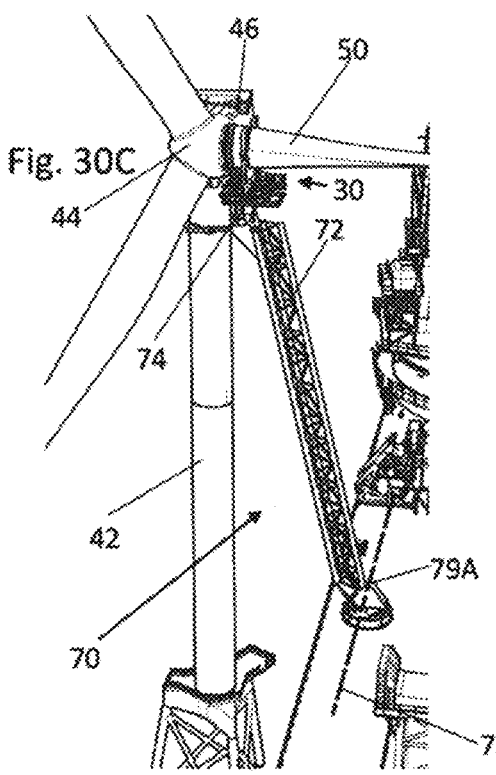
Figure 30D:
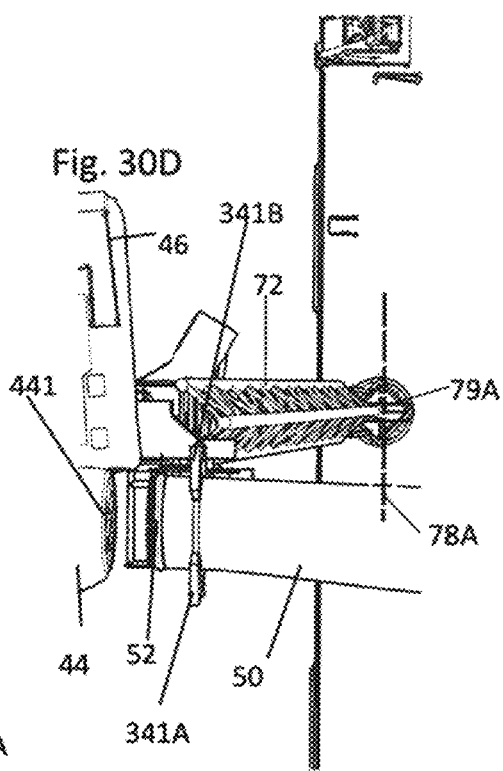

In FIG. 30D, the same situation as in FIG. 30C is shown in top view. In FIG. 30C, the installation vessel has remained in the same orientation with respect to the mast 42, but has translated away from the mast 42. To uncouple the movement of the installation vessel from the movement of the mast stop 74, root end moving assembly 30, and the mast 42, the positioning assembly creates degrees of freedom by combining its shortening and elongation with rotations and translations relative to the installation vessel. Adding to the degree of freedom in the direction 9, as is shown in FIG. 16C, the elongated member may also rotate around the horizontal axis 78A via hinge 79A after the mast stop 74 has engaged the mast 42. In doing so, the installation vessel can translate away and towards the mast 42 while its movement does not affect the movement of the mast stop 74, root end moving assembly 30, and the mast 42.

The skilled person will understand that the degrees of freedom shown in FIGS. 29 and 30 can be combined to uncouple the heave, sway, yaw, and roll of the installation vessel from the mast stop, root end moving assembly and mast. The surge and pitch of the installation vessel can also be uncoupled up to a certain range, for example from +10 to −10 degrees. For example, by adding a rotational degree of freedom around, for example, an axis orthogonal to the horizontal axis 79A and vertical axis 79B. In particular, this rotational degree of freedom can be located at the connection between the installation vessel and the positioning assembly and/or between the positioning assembly and the root end moving assembly.

The terms "a" or "an", as used herein, are defined as one or more than one. The term plurality, as used herein, is defined as two or more than two. The term another, as used herein, is defined as at least a second or more. The terms including and/or having, as used herein, are defined as comprising i.e., open language, not excluding other elements or steps.

Any reference signs in the claims should not be construed as limiting the scope of the claims or the invention. It will be recognized that a specific embodiment as claimed may not achieve all of the stated objects.

The mere fact that certain measures are recited in mutually different dependent claims does not indicate that a combination of these measures cannot be used to advantage.

White lines between text paragraphs in the text above indicate that the technical features presented in the paragraph may be considered independent from technical features discussed in a preceding paragraph or in a subsequent paragraph.

The invention claimed is:

1. A root end moving assembly for connecting a root end of a blade to a root end connector of a hub of nacelle of a wind turbine, the root end moving assembly comprising a movable root end support base and a root end support for supporting the root end, the root end support being connected to the movable root end support base,
    wherein the root end moving assembly is configured for moving the root end from an engagement position to an installation position of the blade at the root end connector,
    wherein the root end support is configured for engaging the root end of the blade in an engagement position thereof,
wherein:
    a) the root end moving assembly comprises a rail which defines a guide path, wherein the movable root end support base is connected to the rail, the root end moving assembly being configured for moving the movable root end support base along the rail from the engagement position to the installation position, or
    b) the root end moving assembly forms part of an auxiliary support structure connected to a hull or deck of the installation vessel, the auxiliary support structure comprising a positioning assembly which comprises an elongated member which extends upward from the hull or deck, wherein the root end moving assembly is connected to the positioning assembly, wherein the root end moving assembly further comprises a mast stop configured to engage the mast or the nacelle in the installation position and to connect an upper end of the auxiliary support structure to the mast, wherein the root end moving assembly comprises support base actuators which are provided between an upper end of the elongated member and the movable root end support base, wherein the support base actuators are configured to move the movable root end support base relative to the upper end of the elongated member from the engagement position to the installation position of the blade,
wherein the root end moving assembly further comprises one or more actuators which are configured to move the root end support relative to the movable root end support base in the X-direction, Y-direction or Z-direction for moving the root end toward the root end connector and aligning the root end with the root end connector, the X-direction being the longitudinal direction of the blade, the Y-direction being horizontal and orthogonal to the X-direction,
wherein the root end moving assembly further comprises a force limiting system configured to prevent the root end support from exerting forces on the root end which exceed a threshold force.

2. The root end moving assembly according to claim 1, wherein the root end support comprises a root end saddle comprising a recess which faces upwards and which is configured to engage and support the root end of a blade when the blade is in a horizontal or substantially horizontal position, wherein the root end saddle has five degrees of freedom relative to the root end connector and/or relative to the rail, a movement in X-direction, Y-direction and Z-direction, a rotation about the Y-axis and Z-axis.

3. The root end moving assembly according to claim 1, wherein the force limiting system comprises Y-springs and/or Z-springs, which are configured to maintain the root end saddle in a target position in the Y-direction and Z-direction relative to the upstanding carriage frame, wherein said springs are pretensioned and act against a stop with a pretension force, wherein the root end support, maintains stationary relative to the root end support base as long as a force exerted by the root end on the root end support remains lower than a threshold force which is defined by the pretension force, and wherein the wherein the root end support starts to move in the Y-direction and/or Z-direction once the force exceeds the threshold force, thereby limiting the forces exerted by the root end on the root end support.

4. A blade positioning system comprising the root end moving assembly according to claim 1, the blade positioning system further comprising a lifting device and a control unit, wherein the root end moving assembly and the lifting device are both connected to the control unit, wherein the control unit is configured to move the lifting device and the root end connector in tandem, wherein input data for the control unit comprises a vertical position of the root end support and a connection point where the lifting device is connected to the blade, such vertical position and connection point being obtained from one or more sensors, wherein the control unit calculates relative locations and/or speeds of the connection point of the lifting device and of the vertical position of the root end support and controls at least a winch of the lifting device and a drive of the root end moving assembly in order to keep the blade:
- horizontal, substantially horizontal or in an inclined orientation at a target angle relative to the horizontal, and/or
- at a target angle about the Z-axis.

5. A wind turbine mast assembly, comprising:
- a mast,
- a nacelle support at an upper end of the mast, and
- the root end moving assembly according to claim 1, wherein the root end moving assembly comprises the rail which defines the guide path, wherein the movable root end support base is connected to the rail, the root end moving assembly being configured for moving the movable root end support base along the rail from the engagement position to the installation position, wherein the root end moving assembly is connected to the mast.

6. An auxiliary support structure for connecting a wind turbine blade to a hub of a nacelle of a wind turbine located on a mast at or near an offshore target location, the auxiliary support structure comprising:
- a positioning assembly comprising an elongated member configured to extend upwardly from a hull or deck of an installation vessel, the positioning assembly comprising a hinge at a lower extremity of the elongated member, wherein the elongated member is configured to be connected to the hull or deck of the installation device via the hinge,
- a mast stop configured to connect an upper end of the auxiliary support structure to the mast by engaging the mast and/or gripping the mast,
- the root end moving assembly according to claim 1, positioned at an upper end of the elongated member, wherein the root end support is movable relative to the root end support base in the X-direction and Y-direction, and pivotable relative to the root end support base about the Z-axis and Y-axis,
- wherein the root end moving assembly comprises a Y-actuator and a X-actuator for moving the root end support relative to the root end support base in the Y-direction and X-direction.

7. A blade positioning system configured for positioning wind turbine blades at a hub of a nacelle of a wind turbine from an installation vessel at an offshore target location, wherein the blade positioning system comprises:
- the installation vessel comprising:
  - at least one lifting device configured for lifting wind turbine components, and
  - an auxiliary support tower extending upwardly from a hull or deck of the installation vessel, the auxiliary support tower comprising:
    - a nacelle support for supporting the nacelle,
    - a root end moving assembly according to claim 1, wherein the root end moving assembly comprises the rail which defines the guide path, wherein the movable root end support base is connected to the rail, the root end moving assembly being configured for moving the movable root end support base along the rail from the engagement position to the installation position,
- wherein the at least one lifting device is configured for lifting the nacelle onto the auxiliary support tower,
- wherein the at least one lifting device and the root end moving assembly are configured to jointly support a blade and jointly move the blade towards the hub, wherein during the movement from the engagement position to the installation position and during alignment of the root end with the root end connector with the one or more actuators, the root end is supported by the root end support of the root end moving assembly and the lifting device carries a majority of the vertical loads on the blade, wherein the lifting device supports the blade at or near a centre of gravity of the blade.

8. A method for connecting wind turbine blades to a hub of a nacelle of a wind turbine at or near an offshore target location using the blade positioning system of claim 7, the method comprising the steps:
- a) positioning the installation vessel at the target location,
- b) positioning a nacelle comprising a hub on the auxiliary support tower,
- c) engaging a blade with the root end support at the engagement position and moving the blade towards the hub from the engagement position to the installation position in a joint operation, from the engagement position to the installation position, of the root end moving assembly and the lifting device, wherein the lifting device supports the blade at or near a centre of gravity of the blade, wherein the root end is supported and guided by the root end support and the lifting device carries a majority of the vertical loads on the blade from the engagement position to the installation position,
- d) using the one or more actuators for aligning the root end of the blade with the root end connector of the hub while the lifting device carries a majority of the vertical loads on the blade and connecting the root end of the blade to the hub,
- e) repeating steps c) and d) for at least one subsequent blade, thereby forming either a complete rotor nacelle assembly (RNA) or a partial (RNA).

9. A blade positioning system configured for positioning wind turbine blades at a hub of a nacelle of a wind turbine from an installation vessel at an offshore target location, the nacelle being positioned on a wind turbine mast assembly comprising a mast and a nacelle support located at an upper end of the mast, the wind turbine mast assembly being positioned at the target location adjacent the installation vessel, wherein the blade positioning system comprises:
- the installation vessel comprising at least one lifting device configured for lifting wind turbine components, and
- a root end moving assembly according to claim 1, wherein the root end moving assembly comprises the rail which defines the guide path, wherein the movable root end support base is connected to the rail, the root end moving assembly being configured for moving the movable root end support base along the rail from the engagement position to the installation position, wherein the at least one lifting device is configured for lifting the nacelle onto the wind turbine mast, wherein the at least one lifting device and the root end moving assembly are configured to jointly support a blade and jointly move the blade towards the hub, wherein during the movement from the engagement position to the installation position and during alignment with the root end connector with the one or more actuators, the root end is supported by the root end support of the root end moving assembly and the lifting device carries a majority of the vertical loads on the blade, wherein the lifting device supports the blade at or near a centre of gravity of the blade.

10. A method for connecting wind turbine blades to a hub of a nacelle of a wind turbine at an offshore target location using the blade positioning system of claim 9, the method comprising the steps:
  a) positioning the installation vessel at a wind turbine mast assembly at the target location,
  the wind turbine mast assembly comprising:
    a mast, and
    a nacelle support at an upper end of the mast,
  b) positioning a nacelle comprising a hub on the mast,
  c) engaging a blade with the root end support of the root end moving assembly which is connected to the wind turbine mast assembly, the root end support being positioned at the engagement position, and moving the blade towards the hub from the engagement position to the installation position in a joint operation, from the engagement position to the installation position, of the root end moving assembly and the lifting device, wherein the lifting device supports the blade at or near a centre of gravity of the blade, wherein the root end is supported and guided by the root end support and the lifting device carries a majority of the vertical loads on the blade, from the engagement position to the installation position,
  d) using the one or more actuators for aligning the root end of the blade with the root end connector of the hub while the lifting device carries a majority of the vertical loads on the blade and connecting the root end of the blade to the hub,
  e) repeating steps c) and d) for at least one subsequent blade, thereby forming either a complete rotor nacelle assembly (RNA) or a partial (RNA).

11. A blade positioning system configured for positioning wind turbine blades at a hub of a nacelle of a wind turbine from an installation vessel at an offshore target location, wherein said wind turbine comprises a wind turbine mast assembly comprising:
  a mast,
  a nacelle support at an upper end of the mast,
and wherein the blade positioning system comprises:
  the installation vessel comprising:
    at least one lifting device configured for lifting wind turbine components, and
    an auxiliary support structure comprising:
      a positioning assembly comprising an elongated member,
      a root end moving assembly according to claim 1, wherein the root end moving assembly is positioned at an upper end of the elongated member and comprises a movable root end support base and a root end support configured for supporting and guiding the root end of the blade, the root end support being connected to the movable root end support base, the root end support being configured for engaging the root end of the blade in an engagement position thereof, the root end moving assembly being configured for moving the root end of the blade from the engagement position to an installation position of the blade, the root end moving assembly further comprising a mast stop configured to engage the mast or the nacelle in the installation position, wherein the at least one lifting device is configured for lifting the nacelle onto the wind turbine mast, and wherein the positioning assembly is configured to place the mast stop at the mast, and the movement of the mast stop and the root end moving assembly is uncoupled from the movement of the installation vessel, and wherein the at least one lifting device and the root end moving assembly are configured to jointly support a blade and jointly move the blade upwards towards the hub, wherein during the movement the root end is supported by the root end support of the root end moving assembly and the lifting device carries a majority of the vertical loads on the blade.

12. The blade positioning system according to claim 11, comprising a lateral element which is connected to an upper end of the elongated member, wherein the lateral element extends over a distance in the X-direction, wherein the X-direction is essentially orthogonal to the longitudinal direction of the elongated member, wherein the lateral element defines a guide path which comprises rails,
  wherein the movable root end assembly travels along said rails, the movable root end assembly comprising the root end support base and the root end support.

13. The blade positioning system according to claim 11, wherein the elongated member is pivotable from a first position to a second position, wherein the upper end of the elongated member comprises a mast stop configured to engage the mast of a wind turbine at a target position adjacent the installation vessel when the elongated member is in the second position, wherein the root end moving assembly is connected to an upper end of the elongated member and movable relative to the upper end of the elongated member by actuators in the X-direction, Y direction and Z-direction, the Y-direction being horizontal and orthogonal to an X-direction which corresponds to a longitudinal axis of the blade when the blade is in the installation position and the Z-direction being vertical.

14. The blade positioning system according to claim 11, wherein the root end moving assembly comprises a Y-hinge and/or a Z-hinge which makes the root end support rotatable relative to the auxiliary support tower or relative to the mast about the Y-axis and/or Z-axis, and allows a rotation of the supported blade about the Y-axis and/or Z-axis, wherein the root end support comprises a root end saddle comprising a recess which faces upwards and which is configured to engage and support the root end of a blade when the blade is in a horizontal or substantially horizontal position, wherein the root end support comprises a carriage which comprises a carriage base frame, an upstanding carriage frame and a root end saddle, wherein the root end saddle is movable relative to the upstanding carriage frame in a Y-direction and a Z-direction, the Y-direction being horizontal and orthogonal to an X-axis which corresponds to a longitudinal axis of the blade when the blade is in the installation position and the Z-direction being vertical.

15. A method for connecting wind turbine blades to a hub of a nacelle of a wind turbine at or near an offshore target location using the blade positioning system of claim 11, the method comprising the steps:
- a) positioning the installation vessel at a wind turbine mast assembly at the target location, the wind turbine mast assembly comprising:
  - a mast, and
  - a nacelle support at an upper end of the mast,
- b) positioning a nacelle comprising a hub on the mast,
- c) engaging a root end of the blade with the root end support at the engagement position and moving the blade towards the hub from the engagement position to the installation position in a joint operation of the auxiliary support structure and the lifting device, wherein the root end is supported and guided by the root end support and the lifting device carries a majority of the vertical loads on the blade,
- d) connecting the root end of the first blade to the hub,
- e) repeating steps c) and d) for at least one subsequent blade, thereby forming either a complete rotor nacelle assembly (RNA) or a partial (RNA).

16. The method according to claim 15, wherein the blade positioning system comprises a rail which extends along the guide path and wherein the movable root end support base comprises wheels or sliding members, wherein during step c) the movable root end support base rolls or slides along the rail, wherein the root end support is moveably connected to the movable root end support base, thereby allowing a rotation of the blade relative to the movable root end support base about the Z-axis and/or Y-axis, the Z-axis being vertical and the Y-axis being horizontal and orthogonal to an X-axis which corresponds to a longitudinal axis of the blade when the blade is in the installation position, wherein during the movement of the blade and the root end moving assembly along the guide path the blade rotates about the Z-axis and/or Y-axis as a result of a relative movement between the root end moving assembly and a lift position where the lifting device supports the blade.

* * * * *